(12) United States Patent
Yamada et al.

(10) Patent No.: US 11,114,909 B2
(45) Date of Patent: Sep. 7, 2021

(54) MOTOR

(71) Applicant: DENSO CORPORATION, Aichi-pref. (JP)

(72) Inventors: Yoji Yamada, Hamamatsu (JP); Koji Mikami, Kosai (JP); Akihisa Hattori, Toyohashi (JP); Seiya Yokoyama, Toyohashi (JP)

(73) Assignee: DENSO CORPORATION, Aichi-pref. (JP)

( * ) Notice: Subject to any disclaimer, the term of this patent is extended or adjusted under 35 U.S.C. 154(b) by 224 days.

(21) Appl. No.: 15/745,213

(22) PCT Filed: Jul. 19, 2016

(86) PCT No.: PCT/JP2016/071097
§ 371 (c)(1),
(2) Date: Jan. 16, 2018

(87) PCT Pub. No.: WO2017/014207
PCT Pub. Date: Jan. 26, 2017

(65) Prior Publication Data
US 2019/0036399 A1     Jan. 31, 2019

(30) Foreign Application Priority Data

Jul. 21, 2015    (JP) ................... 2015-144303
Jul. 21, 2015    (JP) ................... 2015-144304
(Continued)

(51) Int. Cl.
*H02K 1/27*      (2006.01)
*H02K 3/28*      (2006.01)
(Continued)

(52) U.S. Cl.
CPC ............... *H02K 1/276* (2013.01); *H02K 1/24* (2013.01); *H02K 1/2706* (2013.01); *H02K 1/278* (2013.01);
(Continued)

(58) Field of Classification Search
CPC .......... H02K 1/27; H02K 1/24; H02K 1/2706; H02K 21/16; H02K 1/276; H02K 1/278;
(Continued)

(56) References Cited

U.S. PATENT DOCUMENTS 6,211,593 B1   4/2001   Nashiki
6,271,616 B1   8/2001   Akemakou
(Continued)

FOREIGN PATENT DOCUMENTS

CN    101507084 A    8/2009
CN    103259353 A    8/2013
(Continued)

OTHER PUBLICATIONS

International Search Report corresponding to PCT/JP2016/071097, dated Oct. 4, 2016, one page.
(Continued)

*Primary Examiner* — Naishadh N Desai
(74) *Attorney, Agent, or Firm* — Kilpatrick Townsend & Stockton LLP

(57) ABSTRACT

A motor includes a stator having a winding, and a rotor. The rotor rotates by receiving a rotational magnetic field generated by drive current supplied to the winding. The winding includes a first winding and a second winding, the first and second windings both being excited at the same timing by the drive current. The first winding and the second winding are connected in series. The rotor includes a first pole section and a second pole section. The second pole section faces the second winding at the rotation position of the rotor at which
(Continued)

the first pole section faces the first winding. The magnetic force exerted on the stator by the second pole section is weaker than that exerted by the first pole section.

7 Claims, 31 Drawing Sheets

(30) Foreign Application Priority Data

| Jul. 21, 2015 | (JP) | ................................. 2015-144305 |
| Dec. 24, 2015 | (JP) | ................................. 2015-251816 |
| Dec. 24, 2015 | (JP) | ............................. JP2015-251817 |
| Mar. 14, 2016 | (JP) | ................................. 2016-050076 |

(51) Int. Cl.
  *H02K 21/16* (2006.01)
  *H02P 25/024* (2016.01)
  *H02K 1/24* (2006.01)
  *H02K 1/14* (2006.01)
  *H02K 1/18* (2006.01)
  *H02K 15/14* (2006.01)

(52) U.S. Cl.
  CPC .............. *H02K 1/2773* (2013.01); *H02K 3/28* (2013.01); *H02K 21/16* (2013.01); *H02P 25/024* (2016.02); *H02K 1/148* (2013.01); *H02K 1/185* (2013.01); *H02K 1/272* (2013.01); *H02K 1/2713* (2013.01); *H02K 15/14* (2013.01); *H02K 2213/03* (2013.01); *H02P 2207/05* (2013.01)

(58) Field of Classification Search
  CPC ........ H02K 1/2773; H02K 3/28; H02K 1/185; H02K 15/14; H02K 2213/03; H02K 1/2713; H02K 1/272; H02K 1/148; H02P 25/024; H02P 2207/05
  See application file for complete search history.

(56) References Cited

U.S. PATENT DOCUMENTS

| 6,342,745 | B1* | 1/2002 | Sakai | ..................... H02K 1/246 |
| | | | | 310/156.56 |
| 2009/0236923 | A1 | 9/2009 | Sakai et al. | |
| 2012/0001509 | A1 | 1/2012 | Yamada et al. | |
| 2013/0020896 | A1* | 1/2013 | Zhou | ....................... H02K 29/03 |
| | | | | 310/156.01 |
| 2013/0207502 | A1 | 8/2013 | Yamada et al. | |
| 2014/0062249 | A1 | 3/2014 | Nagao et al. | |
| 2014/0246939 | A1 | 9/2014 | Murakami et al. | |
| 2014/0246940 | A1* | 9/2014 | Murakami | ............. H02K 29/12 |
| | | | | 310/156.49 |
| 2014/0265703 | A1 | 9/2014 | Yamada et al. | |
| 2015/0333580 | A1 | 11/2015 | Yamada | |

FOREIGN PATENT DOCUMENTS

| JP | 2002209349 A | 7/2002 |
| JP | 2002534047 A | 10/2002 |
| JP | 2005065415 A | 3/2005 |
| JP | 2010094001 A | 4/2010 |
| JP | 2011083066 A | 4/2011 |
| JP | 2011101544 A | 5/2011 |
| JP | 20111011544 A | 5/2011 |
| JP | 2012034520 A | 2/2012 |
| JP | 2014135852 A | 7/2014 |
| JP | 2014143858 A | 8/2014 |
| JP | 2015095999 A | 5/2015 |
| WO | WO2013/073263 A1 | 5/2013 |

OTHER PUBLICATIONS

Translation of International Preliminary Report on Patentability corresponding to PCT/JP2016/071097, dated Jan. 23, 2018, five pages.

* cited by examiner

MOTOR

TECHNICAL FIELD

The present invention relates to a motor.

BACKGROUND ART

In the prior art, as described in, for example, patent document 1, a permanent magnet motor such as a brushless motor includes a stator, which is formed by windings wound around a stator core, and a rotor, which uses permanent magnets opposing the stator, as poles. The windings of the stator are supplied with drive currents to generate a rotational magnetic field that rotates the rotor.

PATENT DOCUMENT

Patent Document 1: Japanese Laid-Open Patent Publication No. 2014-135852

SUMMARY OF THE INVENTION

Problems that are to be Solved by the Invention

In a permanent magnet motor such as that described above, when the rotor is driven to rotate at a higher speed, an increase in flux linkage resulting from the permanent magnets of the rotor increases the induced voltage at the windings of the stator. The induced voltage lowers the motor output and hinders rotation of the rotor at a higher speed. If the magnetic force of the pole of the rotor is reduced by reducing the size of the permanent magnet of the rotor, it may be possible to reduce the induced voltage during high-speed rotation of the rotor. However, this would reduce the obtained torque. In this regard, there is still room for improvement.

It is an object of the present invention to provide a motor that allows for rotation at a higher speed.

Means for Solving the Problem

To achieve the above object, a motor according to one aspect of the present invention includes a stator including windings, and a rotor. The rotor is rotated by a rotational magnet field generated when drive currents are supplied to the windings. The windings include a first winding and a second winding. The first winding and the second winding are synchronously excited by a drive current and connected in series. The rotor includes first pole, and second pole. The second pole opposes the second winding at a rotation position of the rotor where the first pole opposes the first winding. The second pole applies a weaker magnetic force to the stator than the first pole.

EMBODIMENTS OF THE INVENTION

A first embodiment of a motor will now be described.

Figure 1:
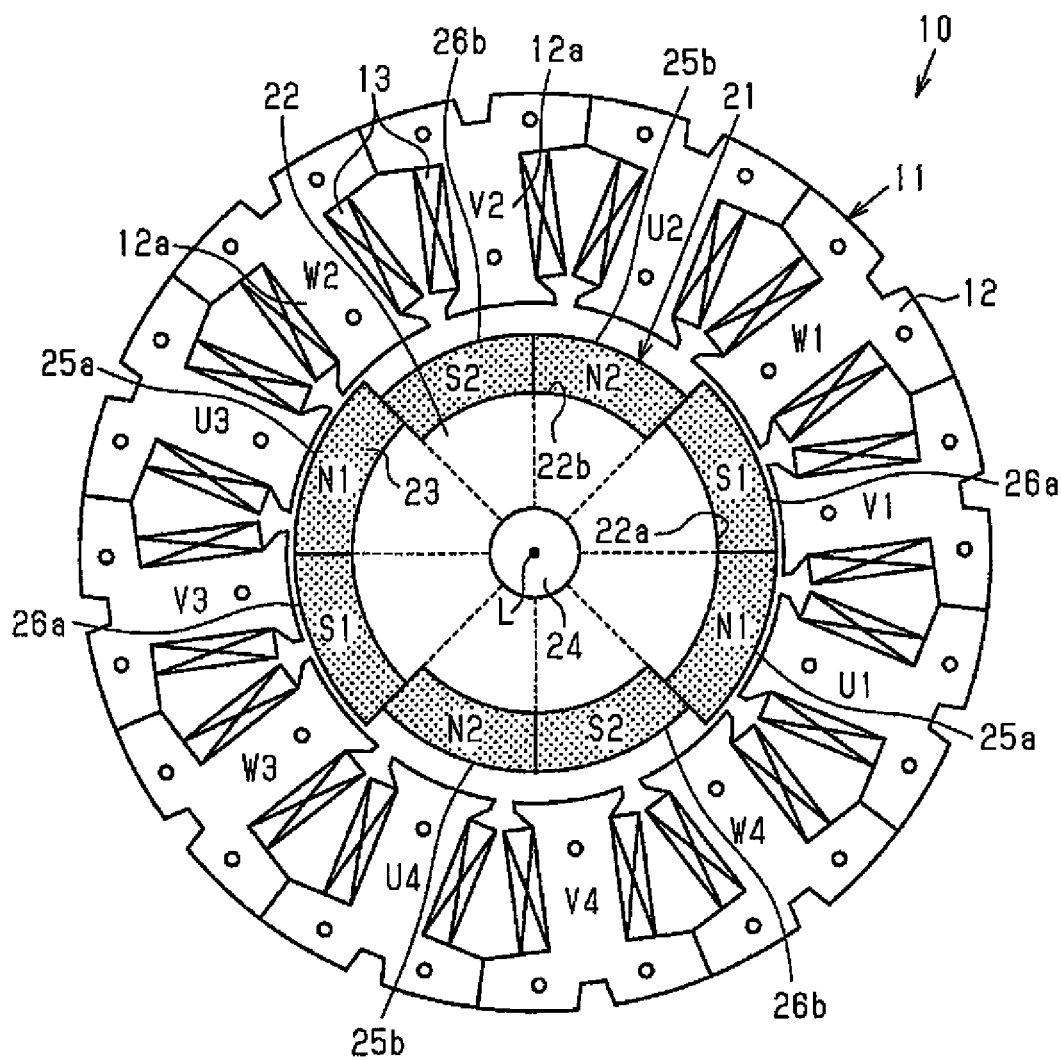
FIG. 1 is a plan view of a motor according to a first embodiment of the present invention.

As shown in FIG. 1, a motor 10 according to the present embodiment is configured as a brushless motor and includes an annular stator 11 and a rotor 21 arranged at an inner side of the stator 11.

Structure of Stator

The stator 11 includes a stator core 12 and windings 13 wound around the stator core 12. The stator core 12 is substantially ring-shaped and formed from a magnetic metal. The stator core 12 includes twelve teeth 12a extending inward in the radial direction at equal angular intervals in the circumferential direction.

There are twelve windings 13, the number of which is the same as the teeth 12a. The windings 13 are wound as concentrated windings in the same direction around the teeth 12a, respectively. That is, the twelve windings 13 are arranged in the circumferential direction at equal angular intervals (thirty-degree intervals). The windings 13 are classified into three phases in accordance with the supplied drive currents of three phases (U-phase, V-phase, and W-phase) and indicated in order in the counterclockwise direction as U1, V1, W1, U2, V2, W2, U3, V3, W3, U4, V4, and W4 in FIG. 1A.

With regard to each phase, the U-phase windings U1 to U4 are arranged in the circumferential direction at equal angular intervals (ninety-degree intervals). In the same manner, the V-phase windings V1 to V4 are arranged in the circumferential direction at equal angular intervals (ninety-degree intervals). The W-phase windings W1 to W4 are also arranged in the circumferential direction at equal angular intervals (ninety-degree intervals).

Figure 2:
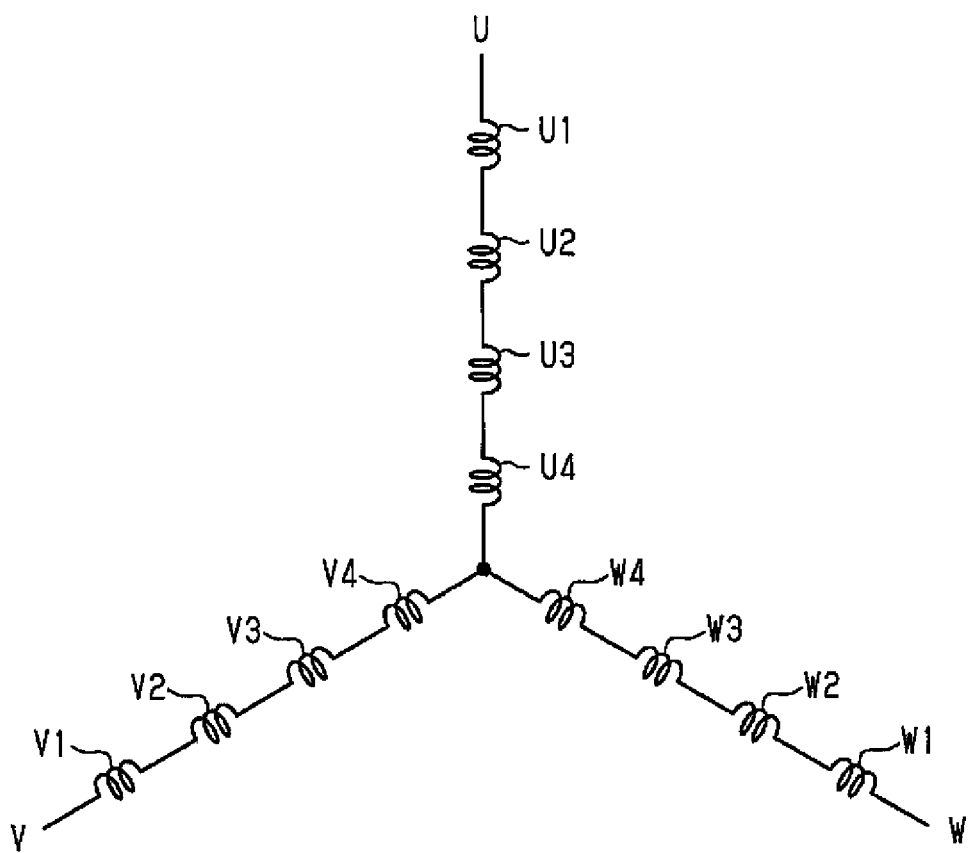
FIG. 2 is an electrical circuit diagram showing the connection state of windings shown in FIG. 1.

As shown in FIG. 2, the windings 13 in each phase are connected in series. That is, the U-phase windings U1 to U4, the V-phase windings V1 to V4, and the W-phase windings W1 to W4 respectively form series circuits. In the present embodiment, the series circuit of the U-phase windings U1 to U4, the series circuit of the V-phase windings V1 to V4, and the series circuit of the W-phase windings W1 to W4 are in a star connection.

Structure of Rotor

As shown in FIG. 1, the rotor 21, which is accommodated in a space at a radially inner side of the stator 11 (teeth 12a), includes a rotor core 22 and eight permanent magnets 23 fixed to an outer circumferential surface of the rotor core 22. The permanent magnet 23 is, for example, an anisotropic sintered magnet and is made of, for example, a neodymium magnet, a samarium-cobalt (SmCo) magnet, a SmFeN magnet, a ferrite magnet, or an Al—Ni—Co magnet.

The rotor core 22 is made of a magnetic metal in a substantially cylindrical shape and includes a rotation shaft 24 fixed to the center portion. A pair of first magnet fixing surfaces 22a and a pair of second magnet fixing surfaces 22b are formed on the outer circumferential surface of the rotor core 22, and each of the first and second magnet fixing surfaces 22a and 22b forms an arc about an axis L as viewed in a direction of the axial L of the rotation shaft 24. The first magnet fixing surface 22a and the second magnet fixing surface 22b are alternately formed in the circumferential direction and the circumferential width (open angle about axis L) of the first magnet fixing surface 22a is equal to that of the second magnet fixing surface 22b (that is, 90°). In addition, the outer diameter of one of the paired first magnet fixing surfaces 22a is equal to that of the other, and the outer diameter of one of the paired second magnet fixing surfaces 22b is also equal to the other. The outer diameter of the second magnet fixing surface 22b is formed to be smaller than the outer diameter of the first magnet fixing surface 22a.

Two permanent magnets 23 are fixed on each of the magnet fixing surfaces 22a and 22b, and thus eight permanent magnets 23 in total are provided on the outer circumferential surface of the rotor core 22. The permanent magnets 23 are made of the same material in the same shape, and an outer circumferential surface of each permanent magnet 23 forms an arc about the axis L as viewed in the direction of the axis L of the rotation shaft 24. The open angle about the axis L (circumferential width) for each permanent magnet 23 is formed to be 45°. In addition, the permanent magnets 23 are formed so that the magnetic orientation of the permanent magnets 23 is directed in the radial direction and so that poles appearing on an outer circumferential side are alternately differ in the circumferential direction. These permanent magnets 23 thus form poles of the rotor 21. That is, the rotor 21 is configured as an eight-pole rotor in which an N-pole and an S-pole are alternately set at circumferentially equal intervals (45° intervals).

In the rotor 21, four N-poles 25a and 25b each of which is formed by an N-pole permanent magnet 23 on the outer circumferential side are arranged at circumferentially equal intervals (90° intervals). These N-poles 25a and 25b are classified into two first N-poles 25a each of which is formed by the N-pole permanent magnet 23 (in FIG. 1, a permanent magnet N1) on the first magnet fixing surface 22a and two second N-poles 25b each of which is formed by the N-pole permanent magnet 23 (in FIG. 1, a permanent magnet N2) on the second magnet fixing surface 22b, which is located radially inward from the permanent magnet N1.

The outer circumferential surface of the second N-pole 25b (outer circumferential surface of permanent magnet N2) is located radially inward from the outer circumferential surface of the first N-pole 25a (outer circumferential surface of permanent magnet N1). Paired first N-poles 25a are opposed to each other at 180° in the circumferential direction. In the same manner, paired second N-poles 25b are also opposed to each other at 180° in the circumferential direction. That is, these first N-poles 25a and second N-poles 25b are alternately provided in a manner that circumferential center positions thereof are arranged at equal angular intervals (90° intervals).

The configuration of the S-pole of the rotor 21 is identical to that of the N-pole. That is, four S-poles 26a and 26b each of which is formed by an S-pole permanent magnet 23 on the outer circumferential side are arranged at circumferentially equal intervals (90° intervals). These S-poles 26a and 26b are classified into two first S-poles 26a each of which is formed by the S-pole permanent magnet 23 (in FIG. 1, a permanent magnet S1) on the first magnet fixing surface 22a and two second S-poles 26b each of which is formed by the S-pole permanent magnet 23 (in FIG. 1, a permanent magnet S2) on the second magnet fixing surface 22b, which is located radially inward from the permanent magnet S1.

The outer circumferential surface of the second S-pole 26b (outer circumferential surface of permanent magnet S2) is located radially inward from the outer circumferential surface of the first S-pole 26a (outer circumferential surface of permanent magnet S1). Paired first S-poles 26a are opposed to each other at 180° in the circumferential direction. In the same manner, paired second S-poles 26b are also opposed to each other at 180° in the circumferential direction. That is, these first S-poles 26a and second S-poles 26b are alternately provided in a manner that circumferential center positions thereof are arranged at equal angular intervals (90° intervals).

The rotor 21 includes the first N-pole 25a and the first S-pole 26a functioning as a first pole and the second N-pole 25b and the second S-pole 26b functioning as a second pole.

The operation of the present embodiment will now be described.

When three-phase drive currents (AC) with a phase difference of 120° are supplied from a drive circuit (not shown) to the U-phase windings U1 to U4, the V-phase windings V1 to V4, and the W-phase windings W1 to W4, the windings U1 to W4 are excited at the same timing for each phase, a rotational magnet field is generated in the stator 11, and the rotor 21 is rotated by the rotational magnet field. At this time, poles formed in the stator 11 by supplying a three-phase drive current to the stator 11 are the same in the windings U1 to W4 for each phase.

The number of pole pairs of the rotor 21 (that is, the number of the N-poles 25a and 25b or the number of the S-poles 26a and 26b) is set to be equal to the number of the windings U1 to W4 of each phase ("4" in the present embodiment). In rotation of the rotor 21, for example, when one of the N-poles 25a and 25b radially opposes the U-phase winding U1, other N-poles 25a and 25b radially oppose the U-phase windings U2 to U4, respectively (see FIG. 1).

At this time, the outer circumferential surface of the second N-pole 25b (surface that opposes stator 11) is located radially inward from outer circumferential surface of the first N-pole 25a. Thus, the radial air gap between the stator 11 and the second N-pole 25b is larger than the radial air gap between the stator 11 and the first N-pole 25a. As a result, with the magnetic forces applied by the N-poles 25a and 25b of the rotor 21 to the stator 11 (for example, U-phase windings U1 to U4), the magnetic force of the second N-pole 25b is weaker than that of the first N-pole 25a. The same holds true for the S-poles 26a and 26b of the rotor 21.

For example, at rotation positions where the N-poles 25a and 25b of the rotor 21 oppose the U-phase windings U1 to U4, respectively as shown in FIG. 1, the flux linkage that links the U-phase windings U2 and U4 opposing the second N-poles 25b is smaller than the flux linkage that links the U-phase windings U1 and U3 opposing the first N-poles 25a. Consequently, the induced voltage at the U-phase windings U2 and U4 opposing the second N-poles 25b is lower than the induced voltage at the U-phase windings U1 and U3 opposing the first N-poles 25a.

Figure 3A:
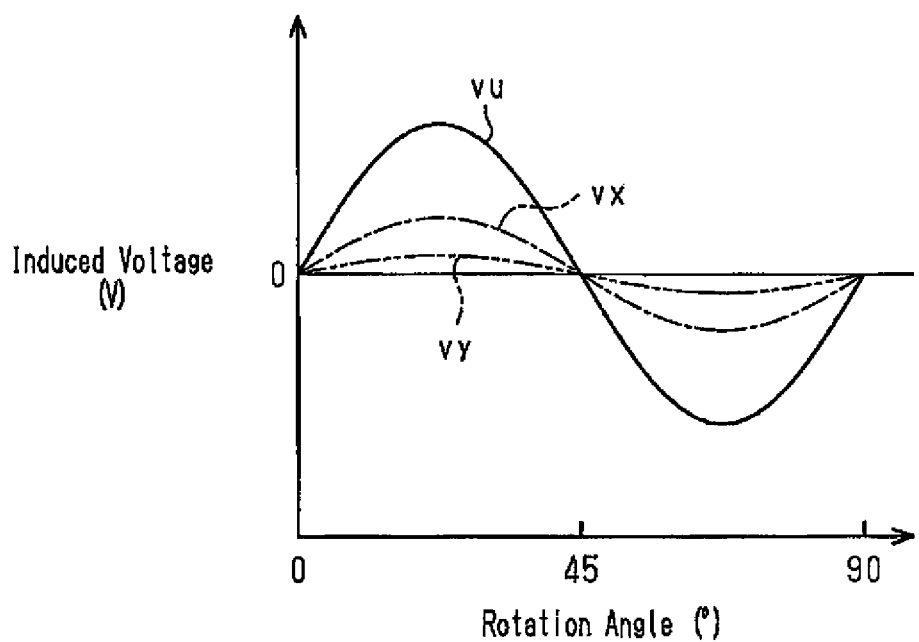
FIG. 3A is a graph illustrating changes in the induced voltage at a U-phase winding during rotation of the rotor shown in FIG. 1.
Figure 3B:
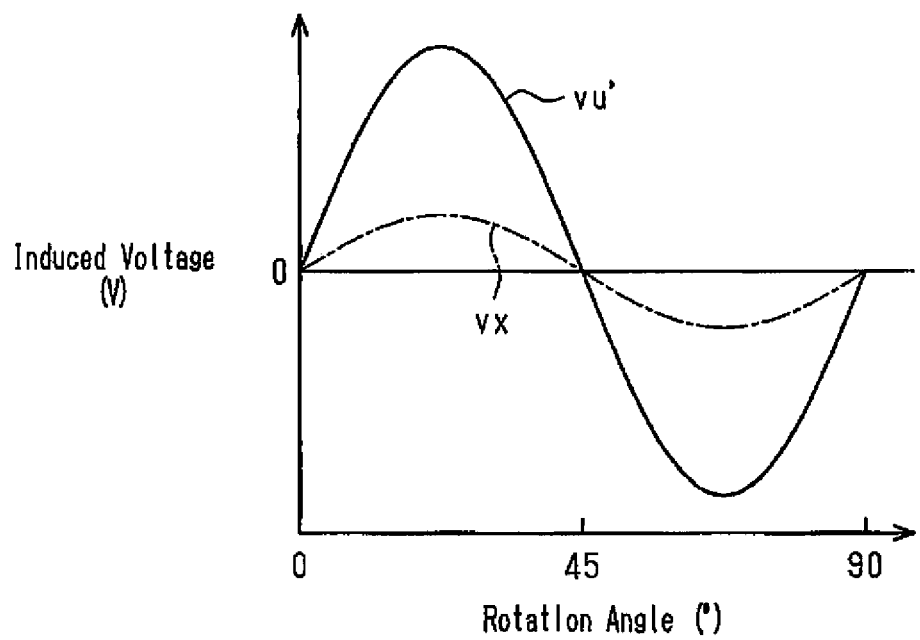
FIG. 3B is a graph illustrating changes in the induced voltage at a U-phase winding during rotation of a rotor in a conventional structure.

FIG. 3A shows a change in the induced voltage at the U-phase windings U1 to U4 within a predetermined rotation range (90°) during the rotation of the rotor according to the present embodiment. FIG. 3B shows a change in the induced voltage at the U-phase windings U1 to U4 within a predetermined rotation range (90°) during the rotation of a rotor in a conventional case. In the conventional case, poles of the rotor are uniform, that is, the rotor core 22 is formed in a cylindrical shape and radial positions of the permanent magnets N2 and S2 are the same as those of the permanent magnets N1 and S1.

The poles of the rotor are uniform in the conventional case, and thus a uniform change in the flux linkage of each of the U-phase windings U1 to U4 is obtained. Consequently, as shown in FIG. 3B, the same induced voltage vx is generated in the U-phase windings U1 to U4 during the rotation of the rotor 21. When the U-phase windings U1 to U4 are connected in series, a combined induced voltage vu' obtained by combining the induced voltages vx of the U-phase windings U1 to U4 is the sum of the induced voltages vx of the U-phase windings U1 to U4 (that is, four times higher than the induced voltage vx).

Meanwhile, as shown in FIG. 3A, the magnetic force applied by the second N-pole 25b or the second S-pole 26b to the stator 11 (U-phase windings U1 to U4) is set to be less than the magnetic force applied by the first N-pole 25a or the first S-pole 26a to the stator 11 in the present embodiment. An induced voltage vy at the U-phase windings U1 to U4 opposing the second N-pole 25b and the second S-pole 26b (for example, U-phase windings U2 and U4) is thus lower than the induced voltage vx at the U-phase windings U1 to U4 opposing the first N-pole 25a and the first S-pole 26a (for example, U-phase windings U1 and U3). A combined induced voltage vu (vu'=vx×2+vy×2) obtained by combining the induced voltages of the U-phase windings U1 to U4 is reduced by a reduction in the induced voltage vy at a pair of U-phase windings opposing the second N-poles 25b or the second S-poles 26b and thus is lower than the combined induced voltage vu' shown in FIG. 3B in the conventional case. While the combined induced voltage vu of the U-phase windings U1 to U4 is described as an example, the combined induced voltage is also reduced in the V-phase windings V1 to V4 and the W-phase windings W1 to W4 by the second N-pole 25b and the second S-pole 26b.

The advantages of the present embodiment will now be described.

(1) The windings 13 of the stator 11 are formed by four U-phase windings U1 to U4, four V-phase windings V1 to V4, and four W-phase windings W1 to W4 according to a three-phase drive current to be supplied, and four windings of each phase are connected in series. That is, the windings 13 of the stator 11 include at least two series-connected windings (first winding and second winding) in each phase.

The N-pole of the rotor 21 includes the first N-pole 25a having the permanent magnet N1 and the second N-pole 25b. At the rotation position of the rotor 21 where the first N-pole 25a opposes the first winding of any of the U, V, and W phases (for example, U-phase windings U1 and U3), the second N-pole 25b opposes the second winding of the same phase (for example, U-phase windings U2 and U4). The second N-pole 25*b* is configured to apply weaker magnetic force to the stator 11 than the first N-pole 25*a*. In the same manner, the S-pole of the rotor 21 includes the first S-pole 26*a* having the permanent magnet S1 and the second S-pole 26*b*. At the rotation position of the rotor 21 where the first S-pole 26*a* opposes the first winding of any of the U, V, and W phases (for example, U-phase windings U1 and U3), the second S-pole 26*b* opposes the second winding of the same phase (for example, U-phase windings U2 and U4). The second S-pole 26*b* is configured to apply weaker magnetic force to the stator 11 than the first S-pole 26*a*.

As described above, according to the present embodiment, the magnetic force (magnetic force applied to stator 11) of all N-poles (or all S-poles) of the rotor 21 opposing the windings 13 of the same phase is not reduced. Instead, the magnetic force of part of the poles (second N-pole 25*b* and second S-pole 26*b*) is reduced. It is thus possible to reduce the combined induced voltage (for example, U-phase combined induced voltage vu) at the windings 13 of the same phase by the poles of the rotor 21, while preventing a reduction in torque. As a result, it is possible to achieve high-speed rotation of the motor 10.

In the connection state of windings where the windings 13 are connected in series in each phase as in the present embodiment, the combined induced voltage is the sum of induced voltages at the windings of the phases, and thus the combined induced voltage tends to be high. As the magnetic force of the second N-pole 25*b* and the second S-pole 26*b* is reduced in the configuration in which the windings 13 are connected in series in each phase as described above, it is possible to more surely obtain an effect of reducing the combined induced voltage by the second N-pole 25*b* and the second S-pole 26*b* having reduced magnetic force, which is more appropriate for high-speed rotation of the motor 10.

(2) The number of the U-phase windings U1 to U4, the V-phase windings V1 to V4, or the W-phase windings W1 to W4 is 2n (n is an integer of 2 or more and n=2 in the present embodiment), and the number of the first N-poles 25*a* or the second N-poles 25*b* (first S-poles 26*a* or second S-poles 26*b*) of the rotor 21 is n (that is, 2). That is, according to this configuration, the number of windings of each phase (number of U-phase windings U1 to U4, V-phase windings V1 to V4, or W-phase windings W1 to W4) is an even number of 4 or more. In addition, the number of the first N-poles 25*a* (first S-poles 26*a*) of the rotor 21 is equal to the number of the second N-poles 25*b* (second S-poles 26*b*) (half of number of windings of each phase).

The first and second N-poles 25*a* and 25*b* (first and second S-poles 26*a* and 26*b*) of the rotor 21 can thus be alternately provided at circumferentially equal intervals. As a result, the first and second N-poles 25*a* and 25*b* (first and second S-poles 26*a* and 26*b*) with different magnetic forces and masses are circumferentially arranged in a balanced manner and thus the rotor 21 can be configured in a magnetically and mechanically balanced manner.

(3) The first and second N-poles 25*a* and 25*b* (first and second S-poles 26*a* and 26*b*) have the permanent magnets N1 and N2 (permanent magnets S1 and S2), respectively, and the outer circumferential surface of the second N-pole 25*b* (second S-pole 26*b*) is located radially inward from the outer circumferential surface of the first N-pole 25*a* (second S-pole 26*b*). According to this configuration, although the permanent magnets N1 and N2 (permanent magnets S1 and S2) are identical magnets (magnets of the same material and same shape), the second N-pole 25*b* (second S-pole 26*b*) applies a weaker magnetic force from the rotor 21 to the stator 11 than the first N-pole 25*a* (first S-pole 26*a*). This is advantageous for parts management.

The above embodiment may be modified as follows.

Although not particularly described in the above embodiment, field weakening control may be executed during high-speed rotation of the rotor 21. In the above embodiment, as the rotor 21 includes the second N-pole 25*b* (second S-pole 26*b*), a field weakening current supplied to the winding 13 can be reduced. The field weakening current can be reduced, and thus the permanent magnets N1, N2, S1, and S2 hardly demagnetize during the field weakening control and the copper loss of the winding 13 can be also reduced. That is to say, the amount of flux linkage that can be reduced by the same amount of the field weakening current is increased, and thus it is possible to achieve more effectively high-speed rotation by the field weakening control.

In the above embodiment, the permanent magnets N1 and N2 (permanent magnets S1 and S2) are identical magnets. The permanent magnet N2 (permanent magnet S2) is arranged radially inward from the permanent magnet N1 (permanent magnet S1) so that the second N-pole 25*b* (second S-pole 26*b*) applies a weaker magnetic force to the stator 11 than the first N-pole 25*a* (first S-pole 26*a*). However, any configuration may be employed so that the second N-pole 25*b* (second S-pole 26*b*) applies a weaker magnetic force to the stator 11 than the first N-pole 25*a* (first S-pole 26*a*).

Figure 4:
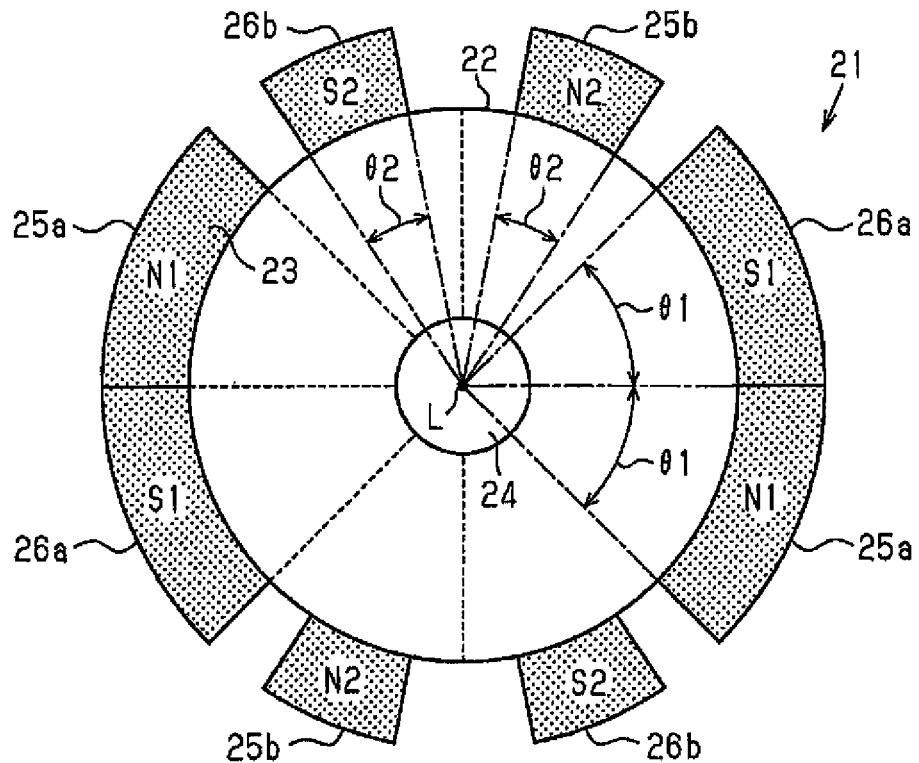
FIG. 4 is a plan view of a rotor according to another example of a first embodiment.

For example, as shown in FIG. 4, an open angle θ2 (open angle about axis L of rotation shaft 24) of each of the permanent magnets N2 and S2 of the second N-pole 25*b* and the second S-pole 26*b* may be set to be smaller than an open angle θ1 of each of the permanent magnets N1 and S1 of the first N-pole 25*a* and the first S-pole 26*a*. According to such a configuration, only by simply changing the shape of the permanent magnets N2 and S2, the magnetic force applied by the second N-pole 25*b* (second S-pole 26*b*) of the rotor 21 to the stator 11 can be weaker than the magnetic force applied by the first N-pole 25*a* (first S-pole 26*a*) of the rotor 21 to the stator 11. As a result, the induced voltage at the winding 13 can be reduced. In addition, it is possible to achieve a simple configuration in which the outer circumferential surface of the rotor core 22 is circular as viewed in an axial direction (that is, a configuration in which the outer circumferential surface of the rotor core 22 does not include any steps formed by the first and second magnet fixing surfaces 22*a* and 22*b*).

Figure 5:
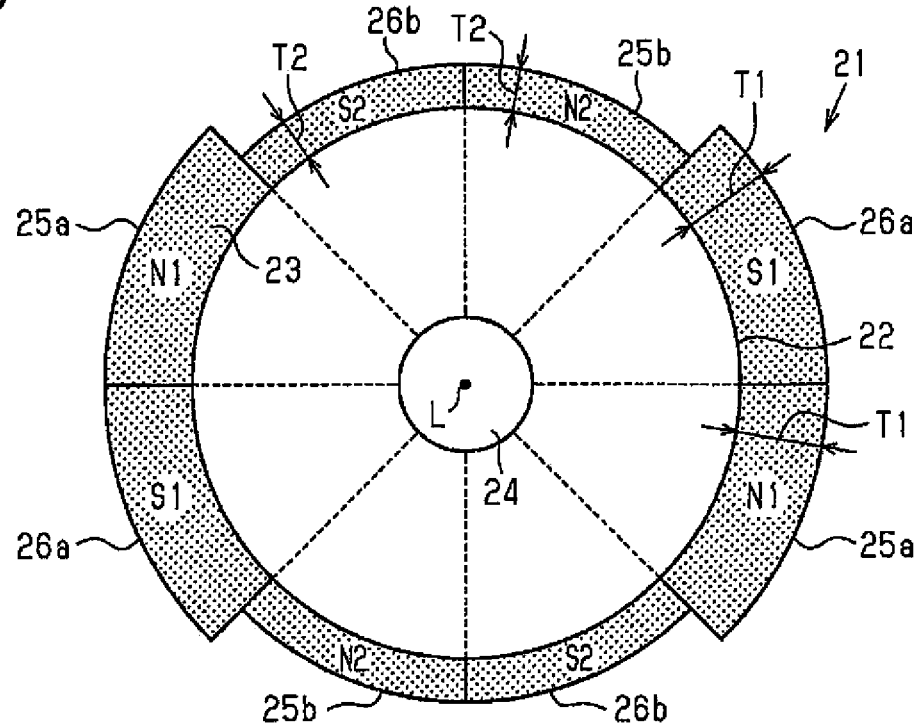
FIG. 5 is a plan view of a rotor according to a further example of the first embodiment.

For example, as shown in FIG. 5, by reducing the radial thickness T2 of the permanent magnet N2 (permanent magnet S2) compared to the radial thickness T1 of the permanent magnet N1 (permanent magnet S1), the magnetic force applied by the second N-pole 25*b* (second S-pole 26*b*) of the rotor 21 to the stator 11 may be weaker than the magnetic force applied by the first N-pole 25*a* (first S-pole 26*a*) of the rotor 21 to the stator 11. According to such a configuration, only by simply changing the shape of the permanent magnets N1 and N2, the magnetic force applied by the second N-pole 25*b* (second S-pole 26*b*) of the rotor 21 to the stator 11 can be weaker than the magnetic force applied by the first N-pole 25*a* (first S-pole 26*a*) of the rotor 21 to the stator 11. As a result, the induced voltage at the winding 13 can be reduced.

While the magnetic force applied by the second N-pole 25*b* (second S-pole 26*b*) of the rotor 21 to the stator 11 is weakened compared to the magnetic force applied by the first N-pole 25*a* (first S-pole 26*a*) of the rotor 21 to the stator 11 by simply changing the shape of the permanent magnets N1 and N2 in the examples of FIGS. 4 and 5, the present invention is not limited thereto. For example, by setting the residual magnetic flux density of the permanent magnet N2 (permanent magnet S2) to be lower than the residual magnetic flux density of the permanent magnet N1 (permanent magnet S1), the magnetic force applied by the second N-pole 25b (second S-pole 26b) of the rotor 21 to the stator 11 can be weaker than the magnetic force applied by the first N-pole 25a (first S-pole 26a) of the rotor 21 to the stator 11. Such a configuration enables the outer circumferential surface of the rotor core 22 to be circular as viewed in an axial direction. In addition, according to such a configuration, the permanent magnets N1, N2, S1, and S2 have the same shape.

In the above embodiment, the first N-poles 25a of the rotor 21 are opposed to each other at 180° in the circumferential direction. In the same manner, the second N-poles 25b of the rotor 21 are opposed to each other at 180° in the circumferential direction. The same holds true for the S-pole. That is, the first S-poles 26a or the second S-poles 26b of the rotor 21 are opposed to each other at 180° in the circumferential direction. That is, the first N-pole 25a and the second N-pole 25b are alternately arranged in the circumferential direction and the first S-pole 26a and the second S-pole 26b are also alternately arranged in the circumferential direction. The present invention is not particularly limited thereto.

Figure 6:
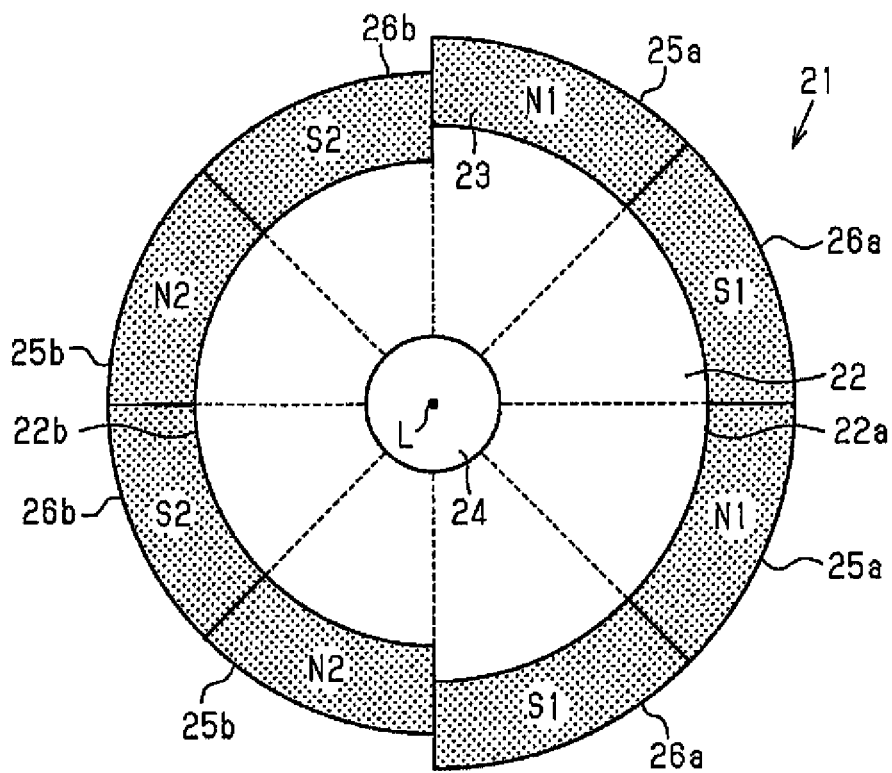
FIG. 6 is a plan view of a rotor according to a further example of the first embodiment.

For example, as shown in FIG. 6, the second N-pole 25b may be opposed to the first N-pole 25a at 180° and the second S-pole 26b may be opposed to the first S-pole 26a at 180°. In the example of FIG. 6, the first magnet fixing surface 22a is formed on one-half of the outer circumference of the rotor core 22 and the second magnet fixing surface 22b is formed on another half of the outer circumference of the rotor core 22. The first N-pole 25a and the first S-pole 26a are alternately provided on one-half of the outer circumference of the rotor core 22 (first magnet fixing surface 22a) and the second N-pole 25b and the second S-pole 26b are alternately provided on another half thereof (second magnet fixing surface 22b). Also in this configuration, the induced voltage at the winding 13 can be reduced and high-speed rotation of the motor 10 can be achieved.

While in the N-pole of the rotor 21, for example, the number of the first N-poles 25a is equal to the number of the second N-poles 25b (half of the number of windings 13 of each phase, namely, two) in the above embodiment, these numbers do not need to be equal. For example, three first N-poles 25a (or first N-pole 25a) may be provided and a second N-pole 25b (or three second N-poles 25b) may be provided. Such a modification is possible in the S-pole of the rotor (first and second S-poles 26a and 26b).

While the second N-pole 25b and the second S-pole 26b with reduced magnetic force are included in the N-pole and the S pole of the rotor 21, respectively in the above embodiment, the present invention is not particularly limited thereto. That is, a pole with reduced magnetic force (second N-pole 25b or the second S-pole 26b) may be provided in only one of the poles of the rotor 21 and identical poles (first N-poles 25a or the first S-poles 26a) may be provided in the other one of the poles.

While windings of each phase, that is, the U-phase windings U1 to U4, the V-phase windings V1 to V4, or the W-phase windings W1 to W4 are connected in series in the above embodiment, the present invention is not particularly limited thereto, and the connection state of windings may be appropriately changed.

Figure 7:
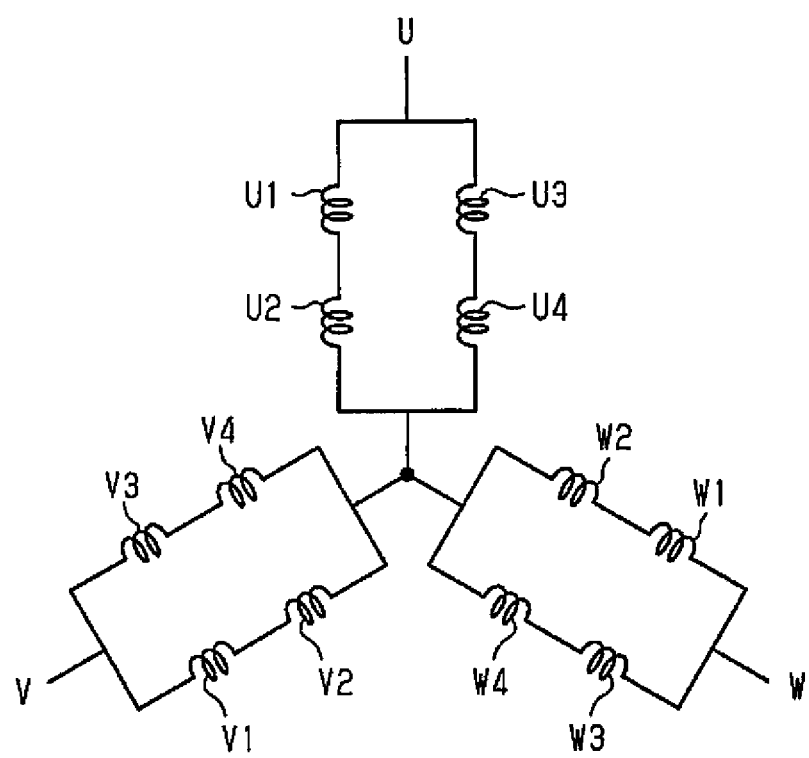
FIG. 7 is an electrical circuit diagram showing the connection state of the windings according to another example of the first embodiment.

In an example of FIG. 7, in the U-phase, the windings U1 and U2 are connected in series, the windings U3 and U4 are connected in series, and a series-connected pair of the windings U1 and U2 is connected in parallel to a series-connected pair of the windings U3 and U4. In the same manner, in the V-phase, the windings V1 and V2 are connected in series, the windings V3 and V4 are connected in series, and a series-connected pair of the windings V1 and V2 is connected in parallel to a series-connected pair of the windings V3 and V4. In addition, also in the W-phase, the windings W1 and W2 are connected in series, the windings W3 and W4 are connected in series, and a series-connected pair of the windings W1 and W2 is connected in parallel to a series-connected pair of the windings W3 and W4.

If the connection state of windings shown in FIG. 7 is applied to the configuration of the rotor 21 according to the above embodiment (see FIG. 1), for example in the U-phase, the induced voltage (induced voltage vx) at the winding U1 is equal to the induced voltage at the winding U3, and the induced voltage (induced voltage vy) at the winding U2 is equal to the induced voltage at the winding U4. The combined induced voltage at the series-connected pair of the windings U1 and U2 is substantially equal to the combined induced voltage at the series-connected pair of the windings U3 and U4 (vx+vy). Consequently, there is always a reduction in the induced voltage because of the arrangement of the second N-pole 25b (second S-pole 26b) having a weaker magnetic force than the first N-pole 25a (first S-pole 26a) in both of the series-connected pair of the windings U1 and U2 and the series-connected pair of the windings U3 and U4. The series-connected pair of the windings U1 and U2 is connected in parallel to the series-connected pair of the windings U3 and U4, and thus the combined induced voltage vu at the overall U-phase windings is substantially equal to the combined induced voltage at the series-connected pair of the windings U1 and U2 (or combined induced voltage at series-connected pair of windings U3 and U4) (vx+vy). The combined induced voltage vu can thus be reduced effectively.

It is assumed that the winding U2 is replaced by the winding U3 in the example of FIG. 7, that is, the windings U1 and U3 with the same induced voltage are connected in series and the windings U2 and U4 with the same induced voltage are connected in series. In this case, there is a reduction in the induced voltage because of the second N-pole 25b (second S-pole 26b) having a weaker magnetic force than the first N-pole 25a (first S-pole 26a) in only one of the series-connected pair of the windings U2 and U4 and the series-connected pair of the windings U1 and U3, and there is no reduction in the induced voltage in the other series-connected pair. In addition, the series-connected pair of the windings U1 and U3 is connected in parallel to the series-connected pair of the windings U2 and U4, and thus it is disadvantage in effectively reducing the combined induced voltage at the overall U-phase windings. Also in a case where the U-phase windings U1 to U4 are connected in parallel, it is disadvantage in effectively reducing the combined induced voltage at the overall U-phase windings.

As described above, when windings are connected in series in each phase, a winding that opposes the first N-pole 25a (or first S-pole 26a) is connected in series to a winding that opposes the second N-pole 25b (or second S-pole 26b) (for example, U-phase winding U1 is connected in series to U-phase winding U2) at a predetermined rotation position of the rotor 21. The combined induced voltage is thus obtained by adding a weak induced voltage at windings of the same phase to a strong induced voltage at windings of the same phase, and the combined induced voltage of each phase can be effectively reduced.

While the windings U1 and U2 form a series-connected pair and the windings U3 and U4 form a series-connected pair in the U-phase in the example of FIG. 7, similar effects can be obtained if the windings U1 and U4 form a series-connected pair and the windings U2 and U3 form a series-connected pair. Such a modification can also be made in the V-phase and the W-phase.

While the series-connected pair of the windings U1 and U2 is connected in parallel to the series-connected pair of the windings U3 and U4 in the U-phase in the example of FIG. 7, the present invention is not particularly limited thereto. The series-connected pair of the windings U1 and U2 and the series-connected pair of the windings U3 and U4 may be separated from each other and paired inverters may be provided in the separated series-connected pairs, for the purpose of supplying a U-phase drive current to the separated series-connected pairs. Such a configuration also achieves similar effects. Such a modification can also be made in the V-phase and the W-phase.

While the connection state of windings is star connection in the above embodiment (see FIG. 2) and the example of FIG. 7, the present invention is not limited thereto and for example, delta connection may be employed.

While the rotor 21 has 8 poles and the number of the windings 13 of the stator 11 is 12 (that is, an eight-pole-twelve-slot motor) in the above embodiment, the number of poles of the rotor 21 and the number of the windings 13 can be appropriately changed according to the configuration. For example, the number of poles of the rotor 21 and the number of the windings 13 may be appropriately changed so that the relationship between the number of poles of the rotor 21 and the number of the windings 13 is represented by 2n:3n (n is an integer of 2 or more).

In a case of a six-pole nine-slot configuration or a ten-pole fifteen-slot configuration (in a case where the greatest common divisor n of the number of poles of the rotor 21 and the number of the winding 13 is an odd number), the number of pole pairs of the rotor 21 is an odd number, that is, the number of N-poles and the number of S-poles are an odd number. Consequently, the number of the first N-poles 25a (first S-poles 26a) is not equal to the number of the second N-poles 25b (second S-pole 26b), so that a magnetically unbalanced configuration may be obtained. In contrast thereto, when the greatest common divisor n of the number of poles of the rotor 21 and the number of the windings 13 is an even number as in the above embodiment, the number of the first N-poles 25a (first S-poles 26a) is equal to the number of the second N-poles 25b (second S-poles 26b), so that a magnetically balanced configuration is obtained.

The relationship between the number of poles of the rotor 21 and the number of the windings 13 does not need to be 2n:3n (n is an integer of 2 or more), and for example, a ten-pole-twelve-slot configuration or a fourteen-pole-twelve-slot configuration may be employed.

Figure 8:
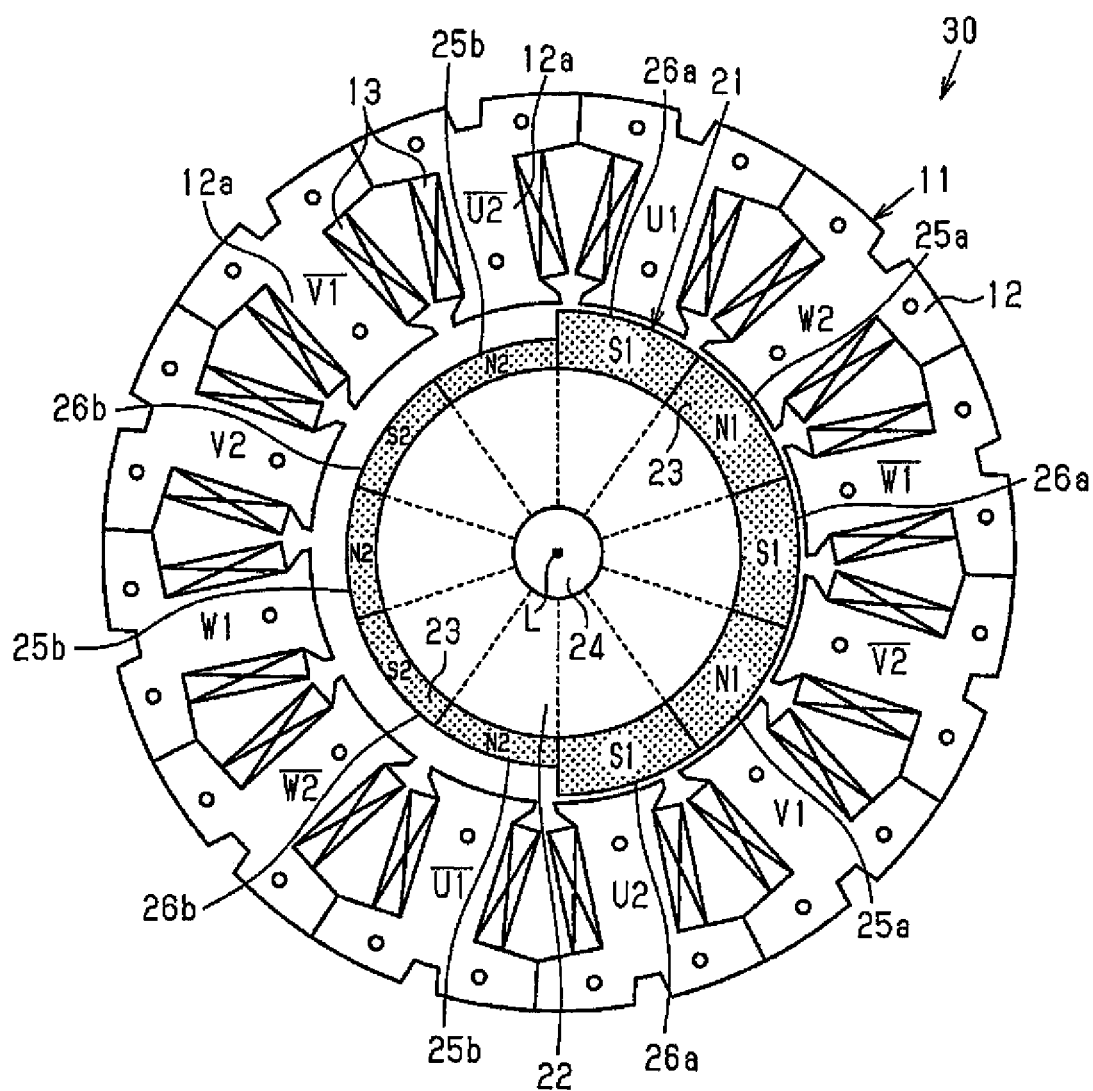
FIG. 8 is a plan view of a motor according to another example of the first embodiment.

FIG. 8 shows an example of a motor 30, which is a ten-pole 12-slot motor. In the example of FIG. 8, same configurations as in the above embodiment are denoted by the same reference numerals, detailed descriptions thereof are omitted, and only different portions are described in detail.

In the motor 30 shown in FIG. 8, twelve windings 13 of the stator 11 are classified according to three-phase drive currents (U-phase, V-phase, and W-phase) to be supplied. In FIG. 8, U1, bar U2, bar V1, V2, W1, bar W2, bar U1, V1, bar V2, bar W1, and W2 are shown counterclockwise in this order. The U-phase windings U1 and U2, the V-phase windings V1 and V2, and the W-phase windings W1 and W2 are normally wound, whereas the U-phase windings bar U1 and bar U2, the V-phase windings bar V1 and bar V2, and the W-phase windings bar W1 and bar W2 are reversely wound. The U-phase winding U1 is opposed to the U-phase winding bar U1 at 180°. In the same manner, the U-phase winding U2 is also opposed to the U-phase winding bar U2 at 180°. The same holds true for other phases (V-phase and W-phase).

The U-phase windings U1, U2, bar U1, and bar U2 are connected in series. In the same manner, the V-phase windings V1, V2, bar V1, and bar V2 are also connected in series, and the W-phase windings W1, W2, bar W1, and bar W2 are also connected in series. A U-phase drive current is supplied to the U-phase windings U1, U2, bar U1, and bar U2. The reversely wound U-phase windings bar U1 and bar U2 are always excited with the reversed polarity (opposite phase) to the normally wound U-phase windings U1 and U2, but these U-phase windings are excited at the same timing. The same holds true for other phases (V-phase and W-phase).

The rotor 21 of the motor 30 is a ten-pole rotor in which an N-pole and an S-pole are alternately set at circumferentially equal intervals (36° intervals), and is of the same type as the rotor 21 shown in FIG. 5. That is, the rotor 21 includes the first N-pole 25a formed by the permanent magnet N1, the second N-pole 25b formed by the permanent magnet N2, the first S-pole 26a formed by the permanent magnet S1, and the second S-pole 26b formed by the permanent magnet S2. The permanent magnets N2 and S2 are configured to be radially thinner than the permanent magnets N1 and S1.

The first N-pole 25a and the first S-pole 26a (permanent magnets N1 and S1) are alternately provided on one-half of the circumference of the rotor 21 (right half circumference in FIG. 8), and the second N-pole 25b and the second S-pole 26b (permanent magnets N2 and S2) are alternately provided on the outer one-half of the circumference of the rotor 21 (left half circumference in FIG. 8). The second S-pole 26b is arranged to be opposite to the first N-pole 25a in the circumferential direction (opposed to each other at 180°) and the second N-pole 25b is arranged to be opposite to the first S-pole 26a in the circumferential direction (opposed to each other at 180°).

While the ten-pole rotor shown in FIG. 8 is formed by two first N-poles 25a, three first S-poles 26a, three second N-poles 25b, and two second S-poles 26b, the present invention is not limited thereto. The rotor shown in FIG. 8 may be formed by three first N-poles 25a, two first S-poles 26a, two second N-poles 25b, and three second S-poles 26b. While the rotor 21 shown in FIG. 8 is of the same type as the rotor 21 shown in FIG. 5, the rotor 21 shown FIG. 8 may be of the same type as the rotor 21 according to the above embodiment or the rotor 21 shown in FIG. 4.

According to such a configuration, for example, when the first S-pole 26a radially opposes the U-phase winding U1 during rotation of the rotor 21, the second N-pole 25b that is opposite to the first S-pole 26a in the circumferential direction radially opposes the U-phase winding bar U1 (see FIG. 8). The permanent magnet N2 that forms the second N-pole 25b is radially thinner than the permanent magnet S1 that forms the first S-pole 26a, and thus the magnetic force applied by the second N-pole 25b to the stator 11 is weaker than the magnetic force applied by the first S-pole 26a to the stator 11.

As described above, poles with different polarities (for example, first S-pole 26a and second N-pole 25b) that oppose the windings 13 (for example, U-phase windings U1 and bar U1) that are excited with opposite phases (at same timing) have different magnetic forces (that is, one magnetic force is less than other magnetic force). It is thus possible to reduce the combined induced voltage at the windings 13 with the opposite phases by the poles of the rotor 21 (for example, combined induced voltage of U-phase windings U1 and bar U1) while preventing a reduction in torque. As a result, high-speed rotation of the motor 30 can be achieved.

In the example of the rotor 21 shown in FIG. 8, the first N-pole 25*a* and the first S-pole 26*a* are provided on one-half of the circumference of the rotor 21 and the second N-pole 25*b* and the second S-pole 26*b* are provided on the outer one-half of the circumference of the rotor 21. However, the arrangement of poles of the rotor 21 is not particularly limited thereto and may be appropriately changed as long as the second S-pole 26*b* is arranged to be opposite to the first N-pole 25*a* in the circumferential direction and the second N-pole 25*b* is arranged to be opposite to the first S-pole 26*a* in the circumferential direction.

In the stator 11, all U-phase windings U1, U2, bar U1, and bar U2 do not need to be connected in series, and the windings U1 and bar U1 may form a series-connected pair and the windings U2 and bar U2 may form a series-connected pair. Such a modification can also be made in the V-phase and the W-phase.

While FIG. 8 shows a ten-pole-twelve-slot configuration, the present invention may be applied to a fourteen-pole-twelve-slot configuration. In addition, the present invention may be applied to configurations in which the number of poles of the rotor and the number of slots in the ten-pole-twelve-slot configuration (or in a fourteen-pole-twelve-slot configuration) are equally multiplied.

Figure 9:
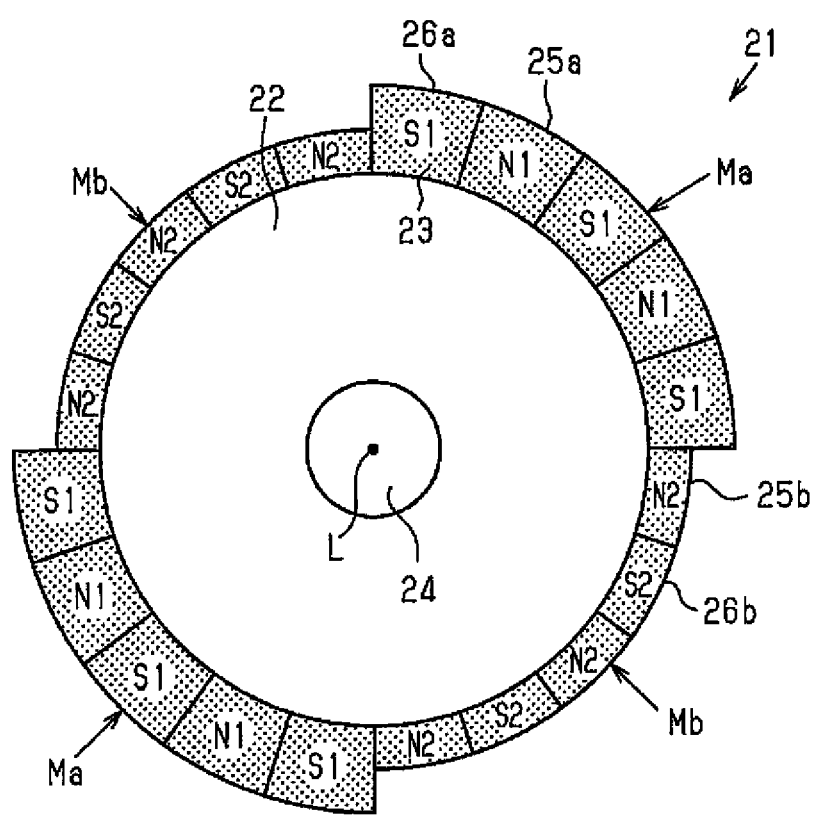
FIG. 9 is a plan view of a rotor according to a further example.

FIG. 9 shows an example of the rotor 21 with a twenty-pole-twenty-four-slot configuration. In the example of FIG. 9, a strong pole group Ma in which the first N-pole 25*a* and the first S-pole 26*a* are alternately arranged in the circumferential direction and a weak pole group Mb in which the second N-pole 25*b* and the second S-pole 26*b* are alternately arranged in the circumferential direction are alternately arranged at an occupying angle of 90° in the circumferential direction of the rotor 21. As the strong pole group Ma and the weak pole group Mb are circumferentially arranged in a balanced manner, the rotor 21 can be configured in a magnetically and mechanically balanced manner.

While, for example, the N-pole of the rotor 21 is formed by only the first N-pole 25*a* and the second N-pole 25*b* in the above embodiment, in addition to these N-poles, for example, a third N-pole with weaker magnetic force applied to the stator 11 than the second N-pole 25*b* may be provided.

While the permanent magnet 23 is a sintered magnet in the above embodiment, the permanent magnet 23 may be, for example, a bonded magnet.

While the present invention is embodied in the inner rotor motor 10 in which the rotor 21 is arranged on the inner circumferential side of the stator 11 in the above embodiment, the present invention is not particularly limited thereto. The present invention may be embodied in an outer rotor motor in which a rotor is arranged on the outer circumferential side of a stator.

While the present invention is embodied in the radial gap motor 10 in which the stator 11 radially opposes the rotor 21 in the above embodiment, the present invention is not particularly limited thereto. The present invention may be applied to an axial gap motor in which a stator axially opposes a rotor.

The above embodiment and the modifications may be appropriately combined.

A second embodiment of a motor will now be described.

Figure 10:
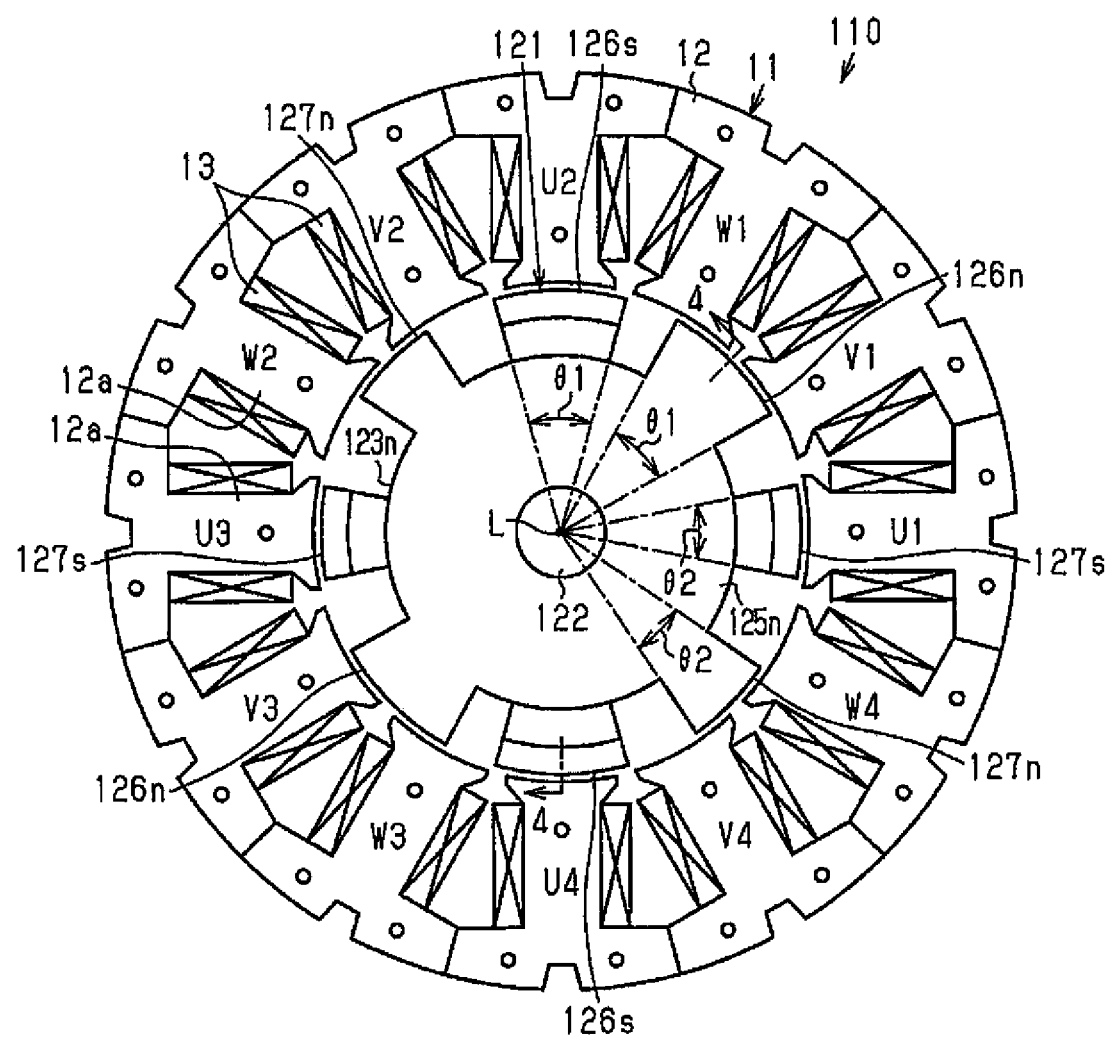
FIG. 10 is a plan view of a motor according to a second embodiment of the present invention.

As shown in FIG. 10, a motor 110 according to the present embodiment is configured as a brushless motor in which a rotor 121 is arranged inside an annular stator 11. The configuration of the stator 11 is identical to that of the stator 11 according to the first embodiment, and thus detailed descriptions thereof are omitted. The configuration of windings 13 of the stator 11 is also identical to that of the windings 13 according to the first embodiment shown in FIG. 2.

Structure of Rotor

Figure 11:
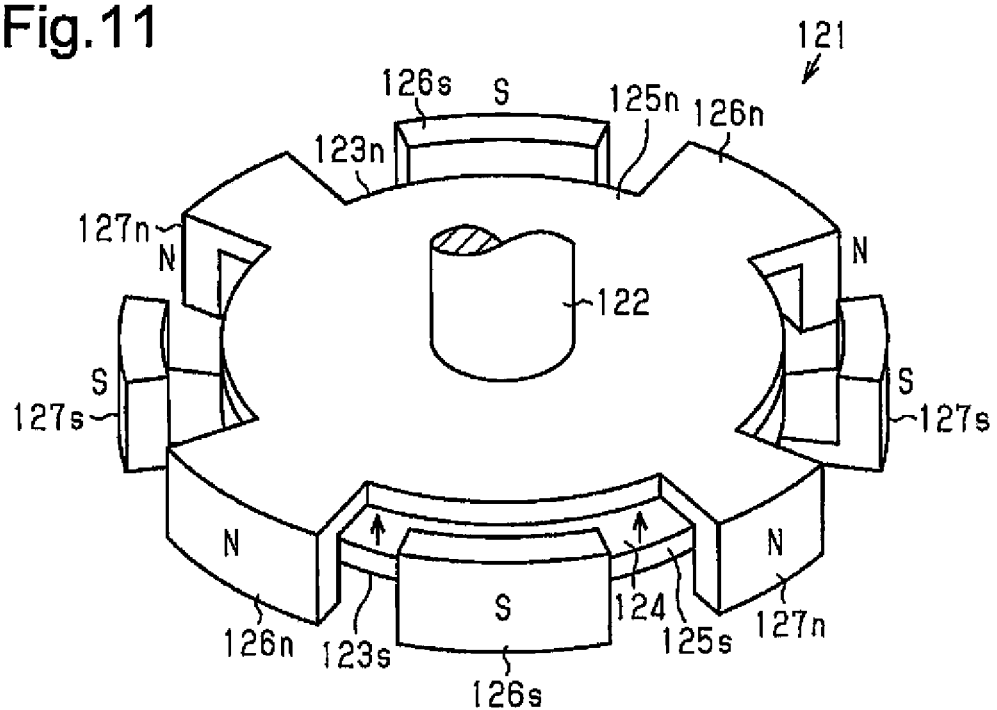
FIG. 11 is a perspective view of the rotor shown in FIG. 10.
Figure 12:
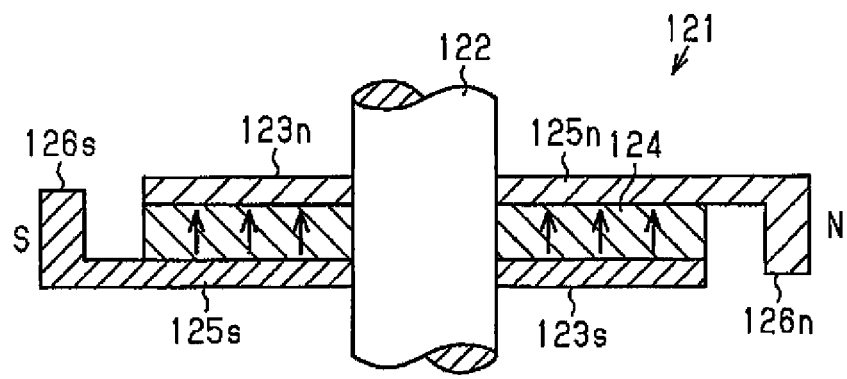
FIG. 12 is a cross-sectional view taken along line 4-4 in FIG. 10.

As shown in FIGS. 10, 11, and 12, the rotor 121 includes a rotation shaft 122, paired rotor cores 123*n* and 123*s* with the same shape, and a permanent magnet 124 arranged between the paired rotor cores 123*n* and 123*s* in the axial direction. The rotor cores 123*n* and 123*s* are made of a magnetic metal. In the following description, a rotor core that abuts against an N-pole-side end surface of the axially magnetized permanent magnet 124 is referred to as the N-pole rotor core 123*n*, whereas a rotor core that abuts against an S-pole-side end surface of the permanent magnet 124 is referred to as the S-pole rotor core 123*s*.

The N-pole rotor core 123*n* includes a disc-shaped core base 125*n*, and the rotation shaft 122 is inserted into the center portion of the core base 125*n* and fixed thereto. At the outer circumferential portion of the core base 125*n*, a plurality of (four in the present embodiment) N-claw-poles 126*n* and 127*n* are formed to project radially outward and axially extend. These N-claw-poles 126*n* and 127*n* axially extend in the same direction.

The four N-claw-poles 126*n* and 127*n* are formed by paired first N-claw-poles 126*n* (first poles) with an open angle θ1 (open angle about axis L of rotation shaft 122) and paired second N-claw-poles 127*n* (second poles) with an open angle θ2 smaller than the open angle θ1. That is, a radially outer surface of the first N-claw-pole 126*n* (surface that opposes stator 11) is wider than a radially outer surface of the second N-claw-pole 127*n* in the circumferential direction. The radially outer surfaces of the N-claw-poles 126*n* and 127*n* are formed in an arc on the same circle about the axis L of the rotation shaft 122 as viewed in the axial direction. The thicknesses (axial thicknesses of radially extending portions and radial thicknesses of axially extending portions) of the N-claw-poles 126*n* and 127*n* are the same.

The first N-claw-pole 126*n* and the second N-claw-pole 127*n* are alternately provided in a manner that circumferential center positions thereof are arranged at equal angular intervals (90° intervals). That is, the paired N-claw-poles 126*n* are opposed to each other at 180° in the circumferential direction. In the same manner, the paired second N-claw-poles 127*n* are also opposed to each other at 180° in the circumferential direction.

The S-pole rotor core 123*s* has the same shape as the N-pole rotor core 123*n*, and includes a core base 125*s*, a first S-claw-pole 126*s* (first pole), and a second S-claw-pole 127*s* (second pole) corresponding to the core base 125*n*, the first N-claw-pole 126*n*, and the second N-claw-pole 127*n* of the N-pole rotor core 123*n*, respectively. That is, the open angle θ2 of the second S-claw-pole 127*s* is set to be smaller than the open angle θ1 of the first S-claw-pole 126*s*.

The S-pole rotor core 123*s* is attached to the N-pole rotor core 123*n* so that each of the S-claw-poles 126*s* and 127*s* is arranged between the N-claw-poles 126*n* and 127*n* (between the first N-claw-pole 126*n* and the second N-claw-pole 127*n*). More specifically, the claw-poles 126*n*, 127*n*, 126*s*, and 127*s* are arranged in a manner that circumferential center positions thereof are arranged at equal angular intervals (45° intervals). The N-claw-poles 126n and 127n and the S-claw-poles 126s and 127s are alternately arranged in the circumferential direction.

The permanent magnet 124 is arranged between the core base 125n of the N-pole rotor core 123n and the core base 125s of the S-pole rotor core 123s in the axial direction. The permanent magnet 124 is formed in an annular shape and the rotation shaft 122 passes through the center portion of the permanent magnet 124. Each axial end surface of the permanent magnet 124 is a flat surface that is vertical to the axis L of the rotation shaft 122 and tightly contacts each of inner end surfaces of the core bases 125n and 125s. In the present embodiment, the outer diameter of the permanent magnet 124 is equal to the outer diameter of each of the core bases 125n and 125s. The permanent magnet 124 is, for example, an anisotropic sintered magnet and is made of, for example, a neodymium magnet, a samarium-cobalt (SmCo) magnet, a SmFeN magnet, a ferrite magnet, or an Al—Ni—Co magnet.

The N-claw-poles 126n and 127n are radially spaced apart from the outer circumferential surface of the core base 125s of the S-pole rotor core 123s and the outer circumferential surface of the permanent magnet 124. An axial distal end surface of each of the N-claw-poles 126n and 127n is at the same position as the outer end surface of the core base 125s in the axial direction.

Similarly, the S-claw-poles 126s and 127s are radially spaced apart from the outer circumferential surface of the core base 125n of the N-pole rotor core 123n and the outer circumferential surface of the permanent magnet 124. An axial distal end surface of each of the S-claw-poles 126s and 127s is at the same position as the outer end surface of the core base 125n in the axial direction.

The permanent magnet 124 is axially magnetized so that the side of the core base 125n is the N-pole and the side of the core base 125s is the S-pole. With the magnetic field of the permanent magnet 124, the N-claw-poles 126n and 127n function as the N-pole and the S-claw-poles 126s and 127s function as the S-pole.

As described above, the rotor 121 according to the present embodiment is configured as a so-called Lundell type rotor that uses the permanent magnet 124 and has eight poles (four N-claw-poles 126n and 127n and four S-claw-poles 126s and 127s).

That is, in the motor 110 according to the present embodiment, the number of poles of the rotor 121 is set to 2n (n is an integer of 2 or more) and the number of the windings 13 of the stator 11 is set to 3n. Specifically, the number of poles of the rotor 121 is set to "8" and the number of the windings 13 of the stator 11 is set to "12".

The operation of the present embodiment will now be described.

When three-phase drive currents (AC) with a phase difference of 120° are supplied from a drive circuit (not shown) to the U-phase windings U1 to U4, the V-phase windings V1 to V4, and the W-phase windings W1 to W4, the windings U1 to W4 are excited at the same timing for each phase, a rotational magnet field is generated in the stator 11, and the rotor 121 is rotated by the rotational magnet field. At this time, poles formed in the stator 11 by supplying a three-phase drive current to the stator 11 are the same in the windings U1 to W4 for each phase.

The number of pole pairs of the rotor 121 (that is, the number of the N-claw-poles 126n and 127n or the number of the S-claw-poles 126s and 127s) is set to be equal to the number of the windings U1 to W4 of each phase ("4" in the present embodiment). In rotation of the rotor 121, for example, when one of the S-claw-poles 126s and 127s radially opposes the U-phase winding U1, other S-claw-poles 126s and 127s radially oppose the U-phase windings U2 to U4, respectively (see FIG. 10).

At this time, the open angle of the second S-claw-pole 127s is smaller than the open angle of the first S-claw-pole 126s (open angle θ2<open angle θ1 as described above). Consequently, regarding the magnetic force applied by the S-poles of the rotor 121 to the stator 11 (for example, U-phase windings U1 to U4), the magnetic force of the second S-claw-pole 127s is weaker than that of the first S-claw-pole 126s. The same holds true for the N-poles of the rotor 121 (N-claw-poles 126n and 127n).

For example, at rotation positions where the N-poles of the rotor 121 oppose the U-phase windings U1 to U4, respectively as shown in FIG. 10, the flux linkage that links the U-phase windings U2 and U4 opposing the second N-claw-pole 127n is smaller than the flux linkage that links the U-phase windings U1 and U3 opposing the first N-claw-pole 126n. Consequently, the induced voltage at the U-phase windings U2 and U4 opposing the second N-claw-pole 127n is lower than the induced voltage at the U-phase windings U1 and U3 opposing the first N-claw-pole 126n.

Figure 13A:
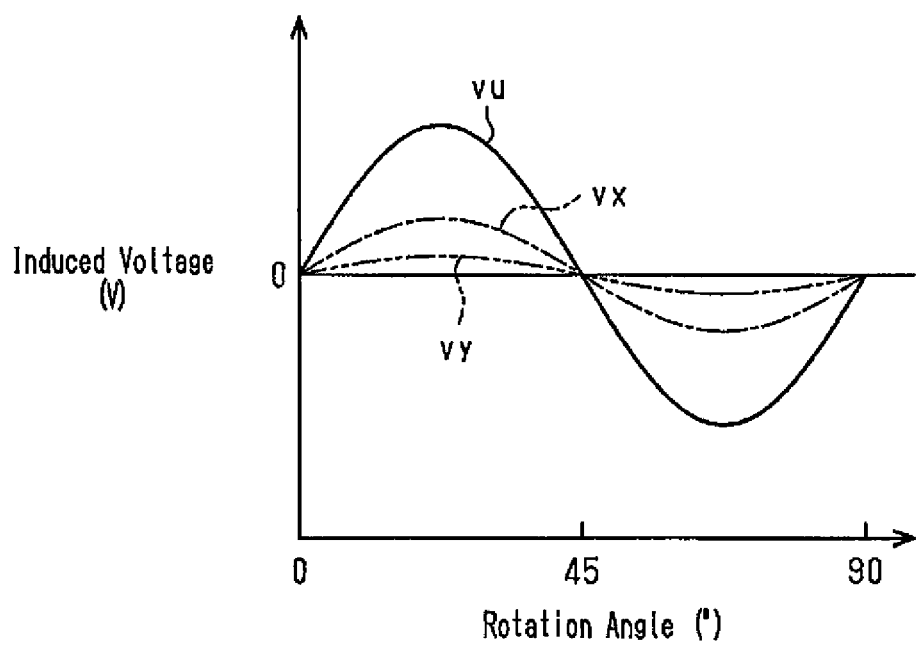
FIG. 13A is a graph illustrating changes in the induced voltage at a U-phase winding during rotation of the rotor shown in FIG. 10.
Figure 13B:
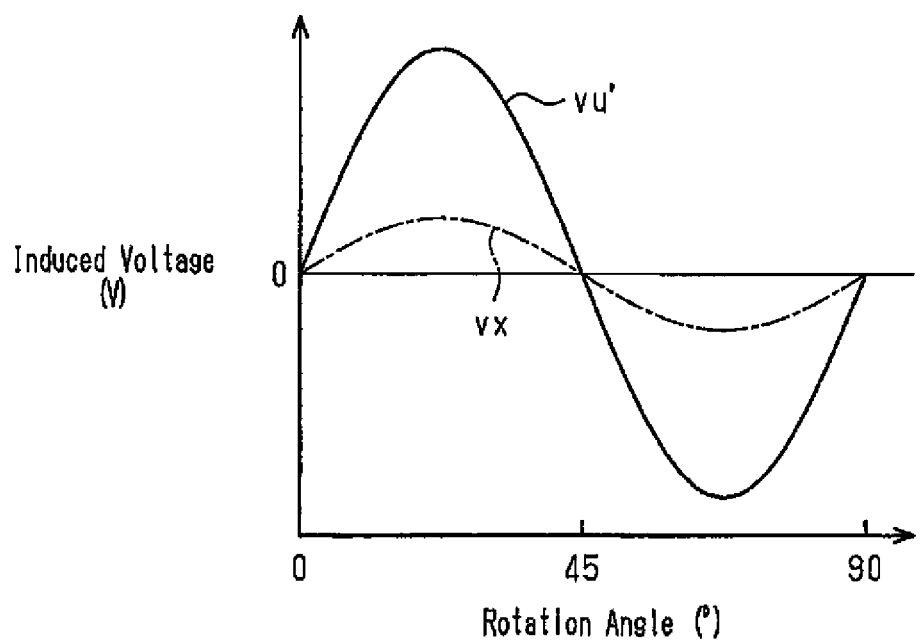
FIG. 13B is a graph illustrating changes in the induced voltage at a U-phase winding during rotation of a rotor in a conventional structure.

FIG. 13A shows a change in the induced voltage at the U-phase windings U1 to U4 within a predetermined rotation range (90°) during the rotation of the rotor according to the present embodiment. FIG. 13B shows a change in the induced voltage at the U-phase windings U1 to U4 within a predetermined rotation range (90°) during the rotation of a rotor in a conventional case. In the conventional case, poles of the rotor are uniform, that is, the claw-poles 126n, 127n, 126s, and 127s of the rotor 121 have the same shape (same open angle).

The poles of the rotor are uniform in the conventional case, and thus a uniform change in the flux linkage of each of the U-phase windings U1 to U4 is obtained. Consequently, as shown in FIG. 13B, the same induced voltage vx is generated in the U-phase windings U1 to U4 during the rotation of the rotor 121. When the U-phase windings U1 to U4 are connected in series, a combined induced voltage vu' obtained by combining the induced voltages vx of the U-phase windings U1 to U4 is the sum of the induced voltages vx of the U-phase windings U1 to U4 (that is, four times higher than the induced voltage vx).

Meanwhile, as shown in FIG. 13A, the magnetic force applied by the second S-claw-pole 127s or the second N-claw-pole 127n to the stator 11 (U-phase windings U1 to U4) is set to be less than the magnetic force applied by the first S-claw-pole 126s or the first N-claw-pole 126n to the stator 11 in the present embodiment. An induced voltage vy at the U-phase windings U1 to U4 opposing the second S-claw-pole 127s and the second N-claw-pole 127n (for example, U-phase windings U1 and U3) is thus lower than the induced voltage vx at the U-phase windings U1 to U4 opposing the first S-claw-pole 126s and the first N-claw-pole 126n (for example, U-phase windings U2 and U4). A combined induced voltage vu (vu=vx×2+vy×2) obtained by combining the induced voltages of the U-phase windings U1 to U4 is reduced by a reduction in the induced voltage vy at a pair of U-phase windings opposing the second S-claw-poles 127s or the second N-claw-poles 127n and thus is lower than the combined induced voltage vu' shown in FIG. 13B in the conventional case. While the combined induced voltage vu of the U-phase windings U1 to U4 is described as an example, the combined flux linkage is also reduced in the V-phase windings V1 to V4 and the W-phase windings W1 to W4 because the open angle of the second S-claw-pole 127s and the second N-claw-pole 127n is small.

The advantages of the present embodiment will now be described.

(4) The windings 13 of the stator 11 are formed by four U-phase windings U1 to U4, four V-phase windings V1 to V4, and four W-phase windings W1 to W4 according to a three-phase drive current to be supplied, and four windings of each phase are connected in series. That is, the windings 13 of the stator 11 include at least two series-connected windings (first winding and second winding) in each phase.

The N-pole of the rotor 121 includes first N-claw-pole 126n and the second N-claw-pole 127n. At the rotation position of the rotor 121 where the first N-claw-pole 126n opposes the first winding of any of the U, V, and W phases (for example, U-phase windings U1 and U3), the second N-claw-pole 127n opposes the second winding of the same phase (for example, U-phase windings U2 and U4). The shape (open angle) of the second N-claw-pole 127n is set in a manner that the magnetic force applied by the second N-claw-pole 127n to the stator 11 is weaker than the magnetic force applied by the first N-claw-pole 126n to the stator 11. In the same manner, the S-pole of the rotor 121 includes the first S-claw-pole 126s and the second S-claw-pole 127s. At the rotation position of the rotor 121 where the first S-claw-pole 126s opposes the first winding of any of the U, V, and W phases (for example, U-phase windings U1 and U3), the second S-claw-pole 127s opposes the second winding of the same phase (for example, U-phase windings U2 and U4). The shape (open angle) of the second S-claw-pole 127s is set in a manner that the magnetic force applied by the second S-claw-pole 127s to the stator 11 is weaker than the magnetic force applied by the first S-claw-pole 126s to the stator 11.

As described above, according to the present embodiment, the magnetic force (magnetic force applied to stator) of all of the N-poles (or all S-poles) of the rotor 121 is not weakened. Instead, the magnetic force of some of the poles (second N-claw-pole 127n and second S-claw-pole 127s) is weakened it is thus possible to reduce the combined induced voltage (for example, U-phase combined induced voltage vu) at the windings 13 of the same phase by the poles of the rotor 121, while preventing a reduction in torque. As a result, it is possible to achieve high-speed rotation of the motor 110.

In the connection state of windings where the windings 13 are connected in series in each phase as in the present embodiment, the combined induced voltage is the sum of induced voltages at the windings of the phases, and thus the combined induced voltage tends to be high. As the magnetic force of the second N-claw-pole 127n and the second S-claw-pole 127s is reduced in the configuration in which the windings 13 are connected in series in each phase as described above, it is possible to more surely obtain an effect of reducing the combined induced voltage, which is more appropriate for high-speed rotation of the motor.

(5) The number of the U-phase windings U1 to U4, the V-phase windings V1 to V4, or the W-phase windings W1 to W4 is 2n (n is an integer of 2 or more and n=2 in the present embodiment), and the number of the first N-claw-poles 126n or the second N-claw-poles 127n (first S-claw-poles 126s or second S-claw-poles 127s) of the rotor 121 is n (that is, 2). That is, according to this configuration, the number of windings of each phase (number of the U-phase windings U1 to U4, V-phase windings V1 to V4, or W-phase windings W1 to W4) is an even number of 4 or more. In addition, the number of the first N-claw-poles 126n (first S-claw-poles 126s) of the rotor 121 is equal to the number of the second N-claw-poles 127n (second S-claw-poles 127s) of the rotor 121 (half of number of windings of each phase).

The first and second N-claw-poles 126n and 127n (first and second S-claw-poles 126s and 127s) of the rotor 121 can thus be alternately provided at circumferentially equal intervals. As a result, the first and second N-claw-poles 126n and 127n (first and second S-claw-poles 126s and 127s) with different magnetic forces and masses are circumferentially arranged in a balanced manner and thus the rotor 121 can be configured in a magnetically and mechanically balanced manner.

The above embodiment may be modified as follows.

Although not particularly described in the above embodiment, field weakening control may be executed during high-speed rotation of the rotor 121. In the above embodiment, as the rotor 121 includes the second N-claw-pole 127n (second S-claw-pole 127s), a field weakening current supplied to the winding 13 can be reduced and an effect of reducing the copper loss of the winding 13 can be also obtained. That is to say, the amount of flux linkage that can be reduced by the same amount of the field weakening current is increased, and thus it is possible to achieve more effectively high-speed rotation by the field weakening control.

In the above embodiment, for example, by setting the open angle $\theta2$ of the second N-claw-pole 127n of the N-pole rotor core 123n to be smaller than the open angle $\theta1$ of the first N-claw-pole 126n of the N-pole rotor core 123n, the magnetic force applied by the second N-claw-pole 127n to the stator 11 is weaker than the magnetic force applied by the first N-claw-pole 126n to the stator 11. However, this may be achieved by changing the shape of the second N-claw-pole 127n. For example, by setting the thicknesses (radial thickness of an axially extending portion and axial thickness of radially extending portion) of the second N-claw-pole 127n to be less than the thickness of the first N-claw-pole 126n, the magnetic force applied by the second N-claw-pole 127n to the stator 11 may be weaker than the magnetic force applied by the first N-claw-pole 126n to the stator 11. Such a modification can be made in the S-pole rotor core 123s.

For example, by changing the shape of some of four claw-poles formed on the N-pole rotor core 123n (second N-claw-pole 127n), the magnetic force applied by the second N-claw-pole 127n to the stator 11 is weaker than the magnetic force applied by the first N-claw-pole 126n to the stator 11 in the above embodiment. The same holds true for the S-pole rotor core 123s. However, the configuration of relatively weakening the magnetic force of the second N-claw-pole 127n or the second S-claw-pole 127s is not limited to the above embodiment.

Figure 14:
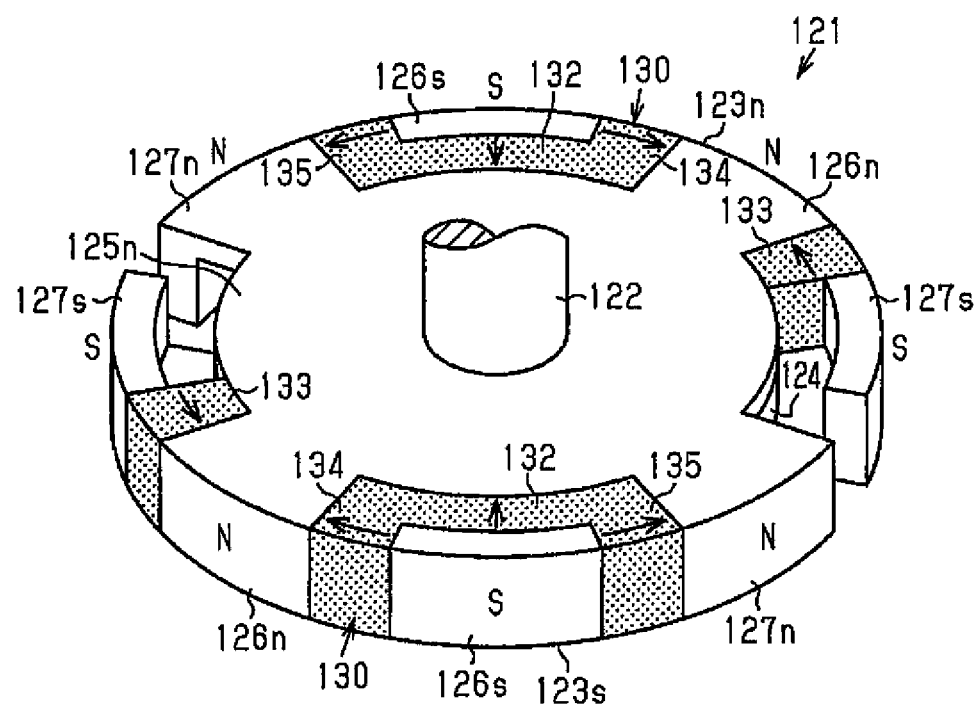
FIG. 14 is a perspective view of a rotor according to another example of the second embodiment.
Figure 15:
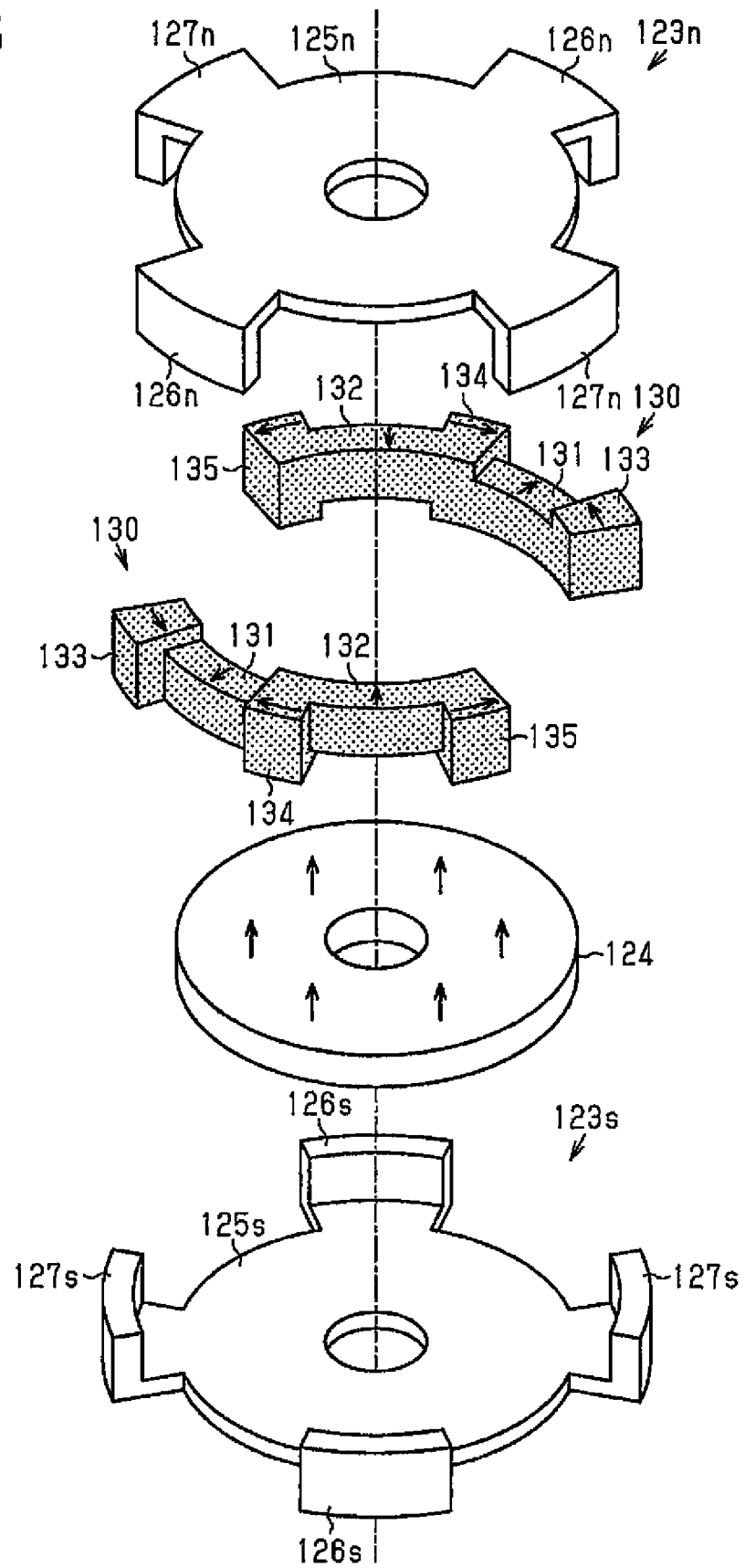
FIG. 15 is an exploded perspective view of the rotor according to another example shown in FIG. 14.

For example, as shown in FIGS. 14 and 15, the rotor 121 may include a magnetic force adjusting magnet 130 that weakens the magnetic force of the second N-claw-pole 127n or the second S-claw-pole 127s relative to the magnetic force of the first N-claw-pole 126n and the first S-claw-pole 126s.

In the configuration shown in FIGS. 14 and 15, the open angle of the first N-claw-pole 126n is formed to be equal to the open angle of the second S-claw-pole 127s. In the same manner, the open angle of the first S-claw-pole 126s is also formed to be equal to the open angle of the second S-claw-pole 127s.

The magnetic force adjusting magnet 130 is provided in a pair. Each magnetic force adjusting magnet 130 includes a first back surface magnet 131 (see FIG. 15) that is arranged on the back side (radially inward) of an axially extending portion of the first N-claw-pole 126n and a second back surface magnet 132 that is arranged on the back side (radially inward) of the axially extending portion of the first S-claw-pole 126s.

Each magnetic force adjusting magnet 130 includes a first inter-pole magnet 133 that is arranged in the circumferential direction between the first N-claw-pole 126n and the adjacent second S-claw-pole 127s. In addition, each magnetic force adjusting magnet 130 includes a second inter-pole magnet 134 that is arranged in the circumferential direction between the first N-claw-pole 126n and the first S-claw-pole 126s. Each magnetic force adjusting magnet 130 also includes a third inter-pole magnet 135 that is arranged in the circumferential direction between the first S-claw-pole 126s and the adjacent second N-claw-pole 127n.

In this example, each of the paired magnetic force adjusting magnet 130 is configured as a component obtained by integrally forming the magnets 131 to 135. The magnetic force adjusting magnet 130 is preferably made of a bonded magnet composed of a rare earth magnet such as a neodymium magnet (plastic magnet, rubber magnet, or the like).

The first back surface magnet 131 abuts against the first N-claw-pole 126n on the radially outside, and abuts against the outer circumferential surfaces of the permanent magnet 124 and the core base 125s on the radially inside. The second back surface magnet 132 abuts against the first S-claw-pole 126s on the radially outside, and abuts against the outer circumferential surfaces of the permanent magnet 124 and the core base 125n on the radially inside.

In FIGS. 14 and 15, solid arrows indicate the magnetization direction (from an S-pole to an N-pole) of the magnets 131 to 135 of the magnetic force adjusting magnet 130. The first back surface magnet 131 is magnetized toward the radially outside for the purpose of reducing leakage flux from the first N-claw-pole 126n to the back side (radially inside). That is, the first back surface magnet 131 is radially magnetized so that the radially outer surface thereof is the N-pole that is the same pole as the first N-claw-pole 126n.

Similarly, the second back surface magnet 132 is magnetized toward the radially outside for the purpose of reducing leakage flux from the first S-claw-pole 126s to the back side (radially inside). That is, the second back surface magnet 132 is radially magnetized so that the radially outer surface thereof is the S-pole that is the same pole as the first S-claw-pole 126s.

The first inter-pole magnet 133 is circumferentially magnetized for the purpose of reducing leakage flux of the first N-claw-pole 126n in the circumferential direction. The first inter-pole magnet 133 is circumferentially magnetized so that the circumferential surface on the side of the first N-claw-pole 126n is the N-pole and the circumferential surface on the side of the second S-claw-pole 127s is the S-pole.

The second inter-pole magnet 134 is circumferentially magnetized for the purpose of reducing leakage flux of the first N-claw-pole 126n and the first S-claw-pole 126s in the circumferential direction. The second inter-pole magnet 134 is circumferentially magnetized so that the circumferential surface on the side of the first N-claw-pole 126n is the N-pole and the circumferential surface on the side of the first S-claw-pole 126s is the S-pole.

The third inter-pole magnet 135 is circumferentially magnetized for the purpose of reducing leakage flux of the first S-claw-pole 126s in the circumferential direction. The third inter-pole magnet 135 is circumferentially magnetized so that the circumferential surface on the side of the second N-claw-pole 127n is the N-pole and the circumferential surface on the side of the first S-claw-pole 126s is the S-pole.

With such a configuration, the leakage flux of the first N-claw-pole 126n and the first S-claw-pole 126s can be reduced by the magnets 131 to 135 of the magnetic force adjusting magnet 130. Consequently, the magnetic force applied by the first N-claw-pole 126n to the stator 11 is stronger than the magnetic force applied by the second N-claw-pole 127n to the stator 11, and the magnetic force applied by the first S-claw-pole 126s to the stator 11 is stronger than the magnetic force applied by the second S-claw-pole 127s to the stator 11 (that is, the magnetic forces applied by the second N-claw-pole 127n and the second S-claw-pole 127s are relatively reduced). Similarly to the above embodiment, it is possible to reduce the combined flux linkage (for example, U-phase combined flux linkage φu) of the windings 13 of the same phase because of the poles of the rotor 121 while preventing a reduction in torque. As the combined flux linkage of the windings 13 of the same phase is reduced, the induced voltage at the windings 13 can be reduced, thus achieving high-speed rotation of the motor 110.

In addition, the magnetic forces of the second N-claw-pole 127n and the second S-claw-pole 127s are relatively reduced not by reducing the open angles of the second N-claw-pole 127n and the second S-claw-pole 127s but by adding the magnetic force adjusting magnet 130. This is a more effective configuration in surely obtaining torque.

Figure 16:
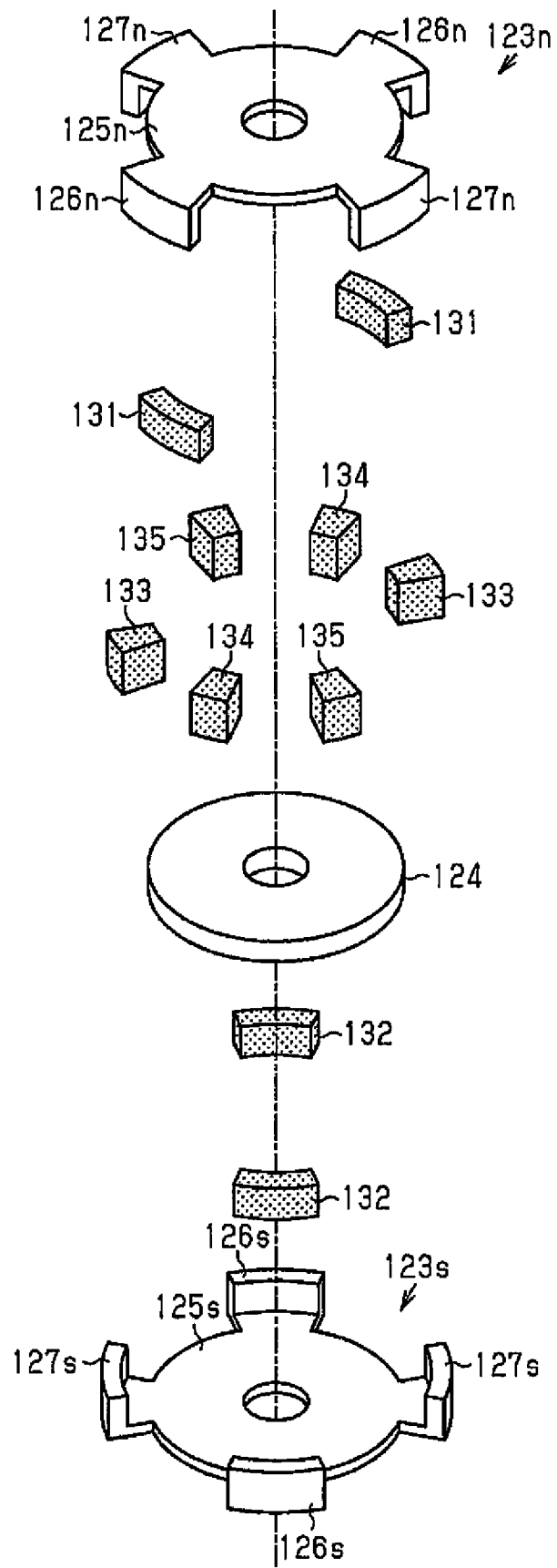
FIG. 16 is an exploded perspective view of the rotor according to another example of the second embodiment.

While the magnets 131 to 135 are integrally formed in the example shown in FIGS. 14 and 15, the magnets 131 to 135 may be separated parts as shown in, for example, FIG. 16. In addition, in the magnetic force adjusting magnet 130 shown in FIGS. 14 and 15, one or a plurality of the magnets 131 to 135 may be omitted. In the example shown in FIGS. 14 and 15, the magnetic force adjusting magnet 130 may be magnetized in a polar anisotropic orientation.

In the example shown in FIGS. 14 and 15, for example, a back surface magnet with a magnetic force less than that of the first back surface magnet 131 may be arranged on the back side (radially inward) of an axially extending portion of the second N-claw-pole 127n, for the purpose of reducing leakage flux flowing from the second N-claw-pole 127n to the back side by the back surface magnet. In the same manner, an inter-pole magnet with a magnetic force less than that of the inter-pole magnets 133 to 135 may be arranged on a side of the second N-claw-pole 127n in the circumferential direction, for the purpose of reducing leakage flux circumferentially flowing from the second N-claw-pole 127n by the inter-pole magnets. Such a modification can be made in the S-pole side.

While a single first N-claw-pole 126n and a single first S-claw-pole 126s form a first pole, and a single second N-claw-pole 127n and a single second S-claw-pole 127s form a second pole with a magnetic force less than the first pole in the above embodiment, the present invention is not particularly limited thereto.

Figure 18:
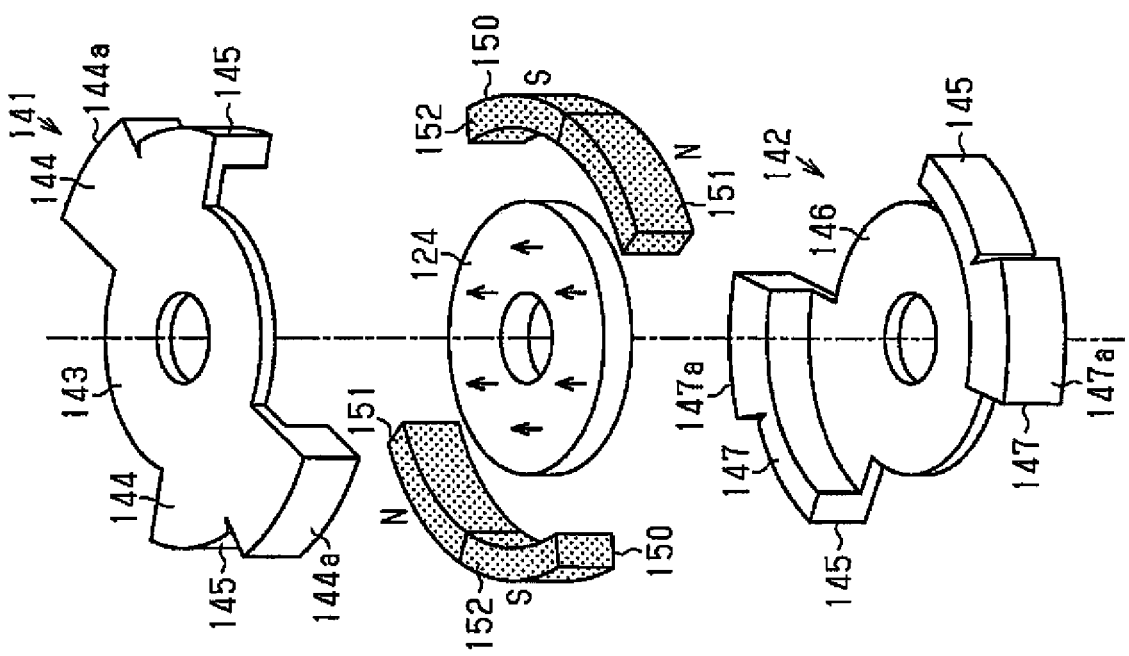
FIG. 18 is an exploded perspective view of the rotor according to another example of the second embodiment.
Figure 17:
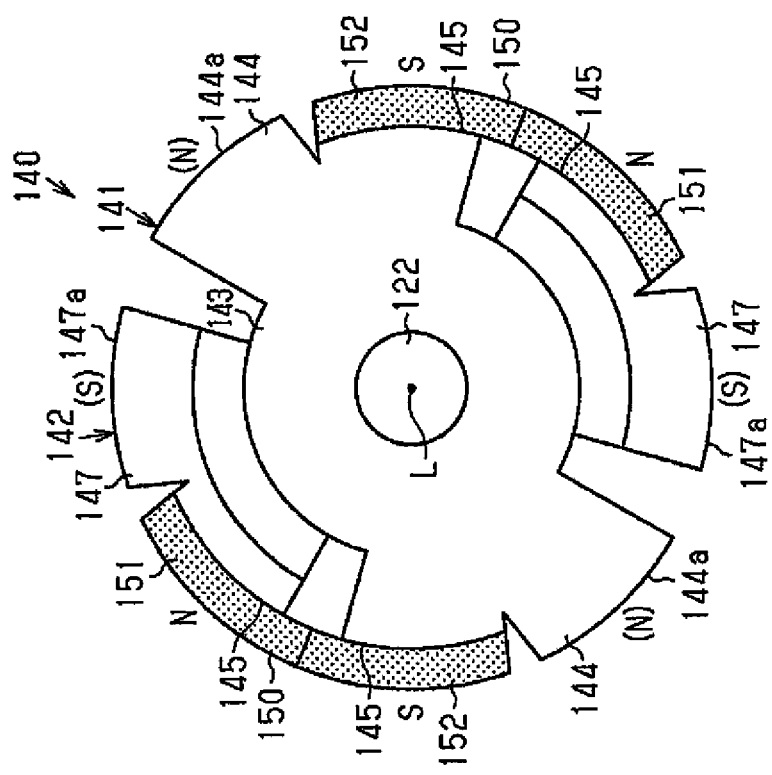
FIG. 17 is a plan view of a rotor according to another example.

For example, a rotor 140 shown in FIGS. 17 and 18 includes a first rotor core 141 and a second rotor core 142 with the same shape, the permanent magnet 124 arranged in the axial direction between the first and second rotor cores 141 and 142, and a pair of outer circumferential magnets 150 (magnetic force adjusting magnets).

The first rotor core 141 includes a disc-shaped core base 143 and a pair of first claw-poles 144 extending from the outer circumferential surface of the core base 143. The paired first claw-poles 144 are opposed to each other at 180° in the circumferential direction. Each first claw-pole 144 is formed to project radially outward from the outer circumferential surface of the core base 143 and axially extend (in the same direction). A magnet fixing surface 145 for fixing the outer circumferential magnet 150 thereon is formed on a circumferential half of the outer circumferential surface (radially outer surface) of the first claw-pole 144. A first salient pole portion 144a extending further radially outward than the magnet fixing surface 145 is formed on the other circumferential half.

The second rotor core 142 has the same shape as the first rotor core 141, and includes a core base 146 and a second claw-pole 147 (second salient pole portion 147a) corresponding to the core base 143 and the first claw-pole 144 (first salient pole portion 144a) of the first rotor core 141, respectively.

The second rotor core 142 is attached to the rotor core 141 so that each second claw-pole 147 is arranged between the corresponding first claw-poles 144. More specifically, the claw-poles 144 and 147 are arranged in a manner that circumferential center positions thereof are arranged at equal angular intervals (90° intervals). In addition, the first claw-pole 144 and the second claw-pole 147 are alternately arranged in the circumferential direction.

The permanent magnet 124 is arranged in axial direction between the core base 143 of the first rotor core 141 and the core base 146 of the second rotor core 142. The permanent magnet 124 is axially magnetized so that the surface on the side of the first rotor core 141 (core base 143) is the N-pole and the surface on the second rotor core 142 (core base 146) is the S-pole. The configuration of the permanent magnet 124 is substantially identical to that of the permanent magnet 124 according to the above embodiment, and thus detailed descriptions thereof are omitted.

Each first claw-pole 144 is radially spaced apart from the outer circumferential surface of the core base 146 of the second rotor core 142 and the outer circumferential surface of the permanent magnet 124. In the same manner, the second claw-pole 147 is radially spaced apart from the outer circumferential surface of the core base 143 of the first rotor core 141 and the outer circumferential surface of the permanent magnet 124.

The outer circumferential magnet 150 extends across the magnet fixing surface 145 of the first claw-pole 144 and the magnet fixing surface 145 of the second claw-pole 147. Specifically, the outer circumferential magnet 150 includes an N-pole 151 that is magnetized in a manner that the N-pole appears on the outer circumferential surface and an S-pole 152 that is magnetized in a manner that the N-pole appears on the outer circumferential, and the S-pole 152 is fixed to the magnet fixing surface 145 of the first claw-pole 144 and the N-pole 151 is fixed to the magnet fixing surface 145 of the second claw-pole 147. That is, a magnet (S-pole 152) having the opposite polarity to the pole (N-pole) of the first claw-pole 144 by the magnetic field of the permanent magnet 124 is fixed to the magnet fixing surface 145 of the first claw-pole 144. A magnet (N-pole 151) having the opposite polarity to the pole (S-pole) of the second claw-pole 147 by the magnetic field of the permanent magnet 124 is fixed to the magnet fixing surface 145 of the second claw-pole 147. In this example, the N-pole 151 and the S-pole 152 of each outer circumferential magnet 150 (second pole) and the first and second salient pole portions 144a and 147a (first pole) are arranged in a manner that outer circumferential surfaces thereof are on the same circle about the axis L of the rotation shaft 122 as viewed in the axial direction.

In the rotor 140 with the configuration described above, the first salient pole portion 144a of the first claw-pole 144 functions as the N-pole by the magnetic field of the permanent magnet 124 and the magnetic field of the S-pole 152 of the outer circumferential magnet 150. In the same manner, the second salient pole portion 147a of the second claw-pole 147 functions as the S-pole by the magnetic field of the permanent magnet 124 and the magnetic field of the N-pole 151 of the outer circumferential magnet 150. The N-pole 151 of each outer circumferential magnet 150 forms part of the N-pole of the rotor 140, and the S-pole 152 of each outer circumferential magnet 150 forms part of the S-pole of the rotor 140. That is, in the rotor 140, the N-pole is formed by two first salient pole portions 144a and two N-poles 151 and the S-pole is formed by two second salient pole portions 147a and two S-poles 152. Thus, the rotor 140 has 8 poles as a whole.

In this example, the arrangement of the poles of the rotor 140 (first and second salient pole portions 144a and 147a, N-pole 151, and S-pole 152) is identical to the arrangement of the poles of the rotor 121 according to the above embodiment. That is, the first salient pole portion 144a corresponds to the first N-claw-pole 126n according to the above embodiment, the N-pole 151 corresponds to the second N-claw-pole 127n according to the above embodiment, the second salient pole portion 147a corresponds to the first S-claw-pole 126s according to the above embodiment, and the S-pole 152 corresponds to the second S-claw-pole 127s according to the above embodiment.

With such a configuration, in the N-pole of the rotor 140, the magnetic force applied by the N-pole 151 to the stator 11 can be weakened from the magnetic force applied by the first salient pole portion 144a to the stator 11. In the S-pole of the rotor 140, the magnetic force applied by the S-pole 152 to the stator 11 is weaker than the magnetic force applied by the second salient pole portion 147a to the stator 11. Similarly to the above embodiment, it is thus possible to reduce the combined flux linkage (for example, U-phase combined flux linkage φu) of the windings 13 of the same phase because of the poles of the rotor 140 while preventing a reduction in torque. As the combined flux linkage of the windings 13 of the same phase is reduced, the induced voltage at the windings 13 can be reduced, thus achieving high-speed rotation of the motor 110.

In the example shown in FIGS. 17 and 18, the magnetic force applied by the first salient pole portion 144a (second salient pole portion 147a) to the stator 11 can be weaker than the magnetic force applied by the N-pole 151 (S-pole 152) to the stator 11 by setting magnetic characteristics of the permanent magnet 124 and the outer circumferential magnet 150 (N-pole 151 and the S-pole 152).

While the outer circumferential magnet 150 that integrally includes the N-pole 151 and the S-pole 152 is used in the example shown in FIGS. 17 and 18, the present invention is not limited thereto, and magnets that respectively include separated N-pole 151 and S-pole 152 may be used. In addition, the back surface magnet and the inter-pole magnet described in the examples of FIGS. 14 and 15 may be provided in the example shown in FIGS. 17 and 18.

While in the N-pole rotor core 123n, for example, the number of the first N-claw-poles 126n is equal to the number of the second N-claw-pole 127n (half of the number of windings 13 of each phase, namely, two) in the above embodiment, these numbers do not need to be equal. For example, three first N-claw-poles 126n (or first N-claw-pole 126n) may be provided and a second N-claw-pole 127n (or three second N-claw-poles 127n) may be provided. Such a modification is possible in the S-pole rotor core 123s.

While the second N-claw-pole 127n with relatively less magnetic force is provided in the N-pole rotor core 123n of the rotor 121 and the second S-claw-pole 127s with relatively less magnetic force is provided in the S-pole rotor core 123s of the rotor 121 in the above embodiment, the present invention is not particularly limited thereto. For example, in the S-pole rotor core 123s, the second S-claw-pole 127s may be replaced by the first S-claw-pole 126s (that is, all claw-poles provided in the S-pole rotor core 123s have the same shape).

While windings of each phase, that is, the U-phase windings U1 to U4, the V-phase windings V1 to V4, or the W-phase windings W1 to W4 are connected in series in the above embodiment, the present invention is not particularly limited thereto, and the connection state of windings may be appropriately changed.

Figure 19:
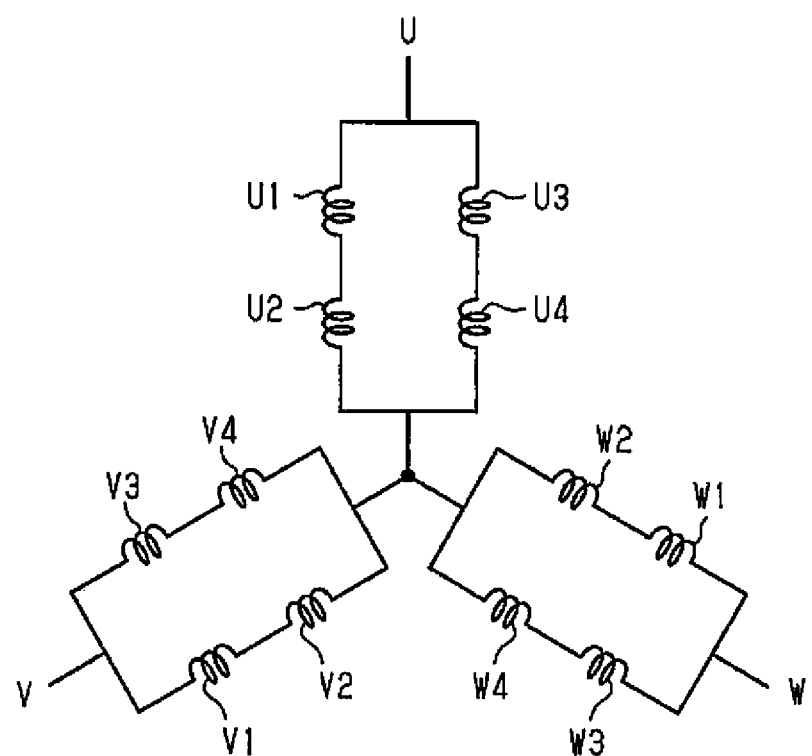
FIG. 19 is an electrical circuit diagram showing the connection state of windings according to another example of the second embodiment.

In an example of FIG. 19, in the U-phase, the windings U1 and U2 are connected in series, the windings U3 and U4 are connected in series, and a series-connected pair of the windings U1 and U2 is connected in parallel to a series-connected pair of the windings U3 and U4. In the same manner, in the V-phase, the windings V1 and V2 are connected in series, the windings V3 and V4 are connected in series, and a series-connected pair of the windings V1 and V2 is connected in parallel to a series-connected pair of the windings V3 and V4. In addition, in the W-phase, the windings W1 and W2 are connected in series, the windings W3 and W4 are connected in series, and a series-connected pair of the windings W1 and W2 is connected in parallel to a series-connected pair of the windings W3 and W4.

If the connection state of windings shown in FIG. 19 is applied to the configuration of the rotor 121 according to the above embodiment (see FIG. 10), for example in the U-phase, the induced voltage (induced voltage vx) at the winding U1 is equal to the induced voltage at the winding U3, and the induced voltage (induced voltage vy) at the winding U2 is equal to the induced voltage at the winding U4. The combined induced voltage at the series-connected pair of the windings U1 and U2 is thus substantially equal to the combined induced voltage at the series-connected pair of the windings U3 and U4 (vx+vy). Consequently, there is always a reduction in the induced voltage because of the second N-claw-pole 127n and the second S-claw-pole 127s having a weak magnetic force in both the series-connected pair of the windings U1 and U2 and the series-connected pair of the windings U3 and U4. The series-connected pair of the windings U1 and U2 is connected in parallel to the series-connected pair of the windings U3 and U4, and thus the combined induced voltage vu at the overall U-phase windings is substantially equal to the combined induced voltage at the series-connected pair of the windings U1 and U2 (or combined induced voltage at series-connected pair of windings U3 and U4) (vx+vy). The combined induced voltage vu can thus be reduced effectively.

It is assumed that the winding U2 is replaced by the winding U3 in the example of FIG. 19, that is, the windings U1 and U3 with the same induced voltage are connected in series and the windings U2 and U4 with the same induced voltage are connected in series. In this case, there is a reduction in the induced voltage because the second N-claw-pole 127n and the second S-claw-pole 127s has a weak magnetic force in only one of the series-connected pair of the windings U2 and U4 and the series-connected pair of the windings U1 and U3, and there is no reduction in the induced voltage in the other series-connected pair. In addition, the series-connected pair of the windings U1 and U3 is connected in parallel to the series-connected pair of the windings U2 and U4, and thus it is disadvantage in effectively reducing the combined induced voltage at the overall U-phase windings. Also in a case where the U-phase windings U1 to U4 are connected in parallel, it is disadvantage in effectively reducing the combined induced voltage at the overall U-phase windings.

As described above, when windings are connected in series in each phase, a winding that opposes the first N-claw-pole 126n (or first S-claw-pole 126s) is connected in series to a winding that opposes the second N-claw-pole 127n (or second S-claw-pole 127s) (for example, U-phase winding U1 is connected in series to the U-phase winding U2) at a predetermined rotation position of the rotor 121. The combined induced voltage is thus obtained by adding a weak induced voltage at windings of the same phase to a strong induced voltage at windings of the same phase, and the combined induced voltage of each phase can be effectively reduced.

While the windings U1 and U2 form a series-connected pair and the windings U3 and U4 form a series-connected pair in the U-phase in the example of FIG. 19, similar effects can be obtained if the windings U1 and U4 form a series-connected pair and the windings U2 and U3 form a series-connected pair. Such a modification can also be made in the V-phase and the W-phase.

While the series-connected pair of the windings U1 and U2 is connected in parallel to the series-connected pair of the windings U3 and U4 in the U-phase in the example of FIG. 19, the present invention is not particularly limited thereto. The series-connected pair of the windings U1 and U2 and the series-connected pair of the windings U3 and U4 may be separated from each other and paired inverters may be provided in the separated series-connected pairs, for the purpose of supplying a U-phase drive current to the separated series-connected pairs. Such a configuration also achieves similar effects. Such a modification can also be made in the V-phase and the W-phase.

While the connection state of windings is star connection in the above embodiment (see FIG. 2) and the example of FIG. 19, the present invention is not limited thereto and for example, delta connection may be employed.

While the rotor 121 has 8 poles and the number of the windings 13 of the stator 11 is 12 (that is, an eight-pole-twelve-slot motor) in the above embodiment, the number of poles of the rotor 121 and the number of the windings 13 can be appropriately changed according to the configuration. For example, the number of poles of the rotor 121 and the number of the windings 13 may be appropriately changed so that the relationship between the number of poles of the rotor 121 and the number of the windings 13 is represented by 2n:3n (n is an integer of 2 or more).

In a case of a six-pole-nine-slot configuration or a ten-pole-fifteen-slot configuration (in a case where the greatest common divisor n of the number of poles of the rotor 121 and the number of the windings 13 is an odd number), the number of pole pairs of the rotor 121 is an odd number, that is, the number of N-poles and the number of S-poles are an odd number. Consequently, the number of the first N-claw-poles 126n is not equal to the number of the second N-claw-poles 127n, so that a magnetically unbalanced configuration may be obtained. In contrast thereto, when the greatest common divisor n of the number of poles of the rotor 121 and the number of the windings 13 is an even number as in the above embodiment, the number of the first N-claw-poles 126n is equal to the number of the second N-claw-poles 127n, so that a magnetically balanced configuration is obtained.

The relationship between the number of poles of the rotor 121 and the number of the windings 13 does not need to be 2n:3n (n is an integer of 2 or more), and for example, a ten-pole-twelve-slot configuration or a fourteen-pole-twelve-slot configuration may be employed.

Figure 20:
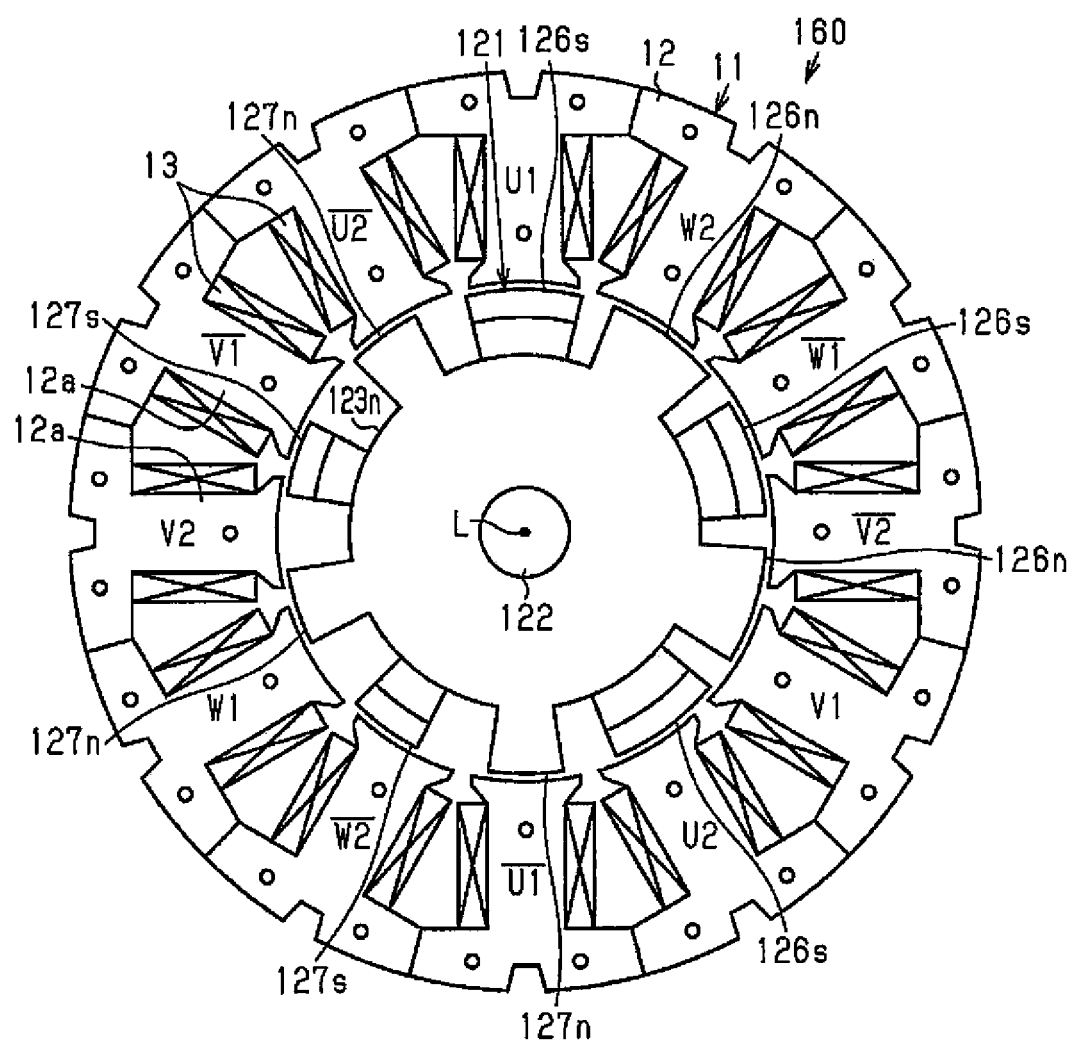
FIG. 20 is a plan view of a motor according to another example of the second embodiment.

FIG. 20 shows an example of a motor 160, which is a ten-pole-twelve-slot motor. In the example of FIG. 20, same configurations as in the above embodiment are denoted by the same reference numerals, detailed descriptions thereof are omitted, and only different portions are described in detail.

In the motor 160 shown in FIG. 20, twelve windings 13 of the stator 11 are classified according to three-phase drive currents (U-phase, V-phase, and W-phase) to be supplied. In FIG. 20, U1, bar U2, bar V1, V2, W1, bar W2, bar U1, U2, V1, bar V2, bar W1, and W2 are shown counterclockwise in this order. The U-phase windings U1 and U2, the V-phase windings V1 and V2, and the W-phase windings W1 and W2 are normally wound, whereas the U-phase windings bar U1 and bar U2, the V-phase windings bar V1 and bar V2, and the W-phase windings bar W1 and bar W2 are reversely wound. The U-phase winding U1 is opposed to the U-phase winding bar U1 at 180°. In the same manner, the U-phase winding U2 is also opposed to the U-phase winding bar U2 at 180°. The same holds true for other phases (V-phase and W-phase).

The U-phase windings U1, U2, bar U1, and bar U2 are connected in series. In the same manner, the V-phase windings V1, V2, bar V1, and bar V2 are also connected in series, and the W-phase windings W1, W2, bar W1, and bar W2 are also connected in series. A U-phase drive current is supplied to the U-phase windings U1, U2, bar U1, and bar U2. The reversely wound U-phase windings bar U1 and bar U2 are always excited with the reversed polarity (opposite phase) to the normally wound U-phase windings U1 and U2, but these U-phase windings are excited at the same timing. The same holds true for other phases (V-phase and the W-phase).

The rotor 121 of the motor 160 is a ten-pole rotor in which an N-pole and an S-pole are alternately set at circumferentially equal intervals (36° intervals), and includes two first N-claw-poles 126n, three first S-claw-poles 126s, three second N-claw-poles 127n, and two second S-claw-poles 127s. The first N-claw-pole 126n and the first S-claw-pole 126s are alternately provided on one-half of the circumference of the rotor 121, and the second N-claw-pole 127n and the second S-claw-pole 127s are alternately provided on the other one-half of the circumference of the rotor 121. The second S-claw-pole 127s is arranged to be opposite to the first N-claw-pole 126n in the circumferential direction (opposed to each other at 180°) and the second N-claw-pole 127n is arranged to be opposite to the first S-claw-pole 126s in the circumferential direction (opposed to each other at) 180°.

The number of the first and second N-claw-poles 126n and 127n and the number of the first and second S-claw-poles 126s and 127s are not limited to the numbers in the example of the ten-pole rotor shown in FIG. 20. For example, the rotor 121 may include three first N-claw-poles 126n, two first S-claw-poles 126s, two second N-claw-poles 127n, and three second S-claw-poles 127s.

According to the above configuration, for example, when the first S-claw-pole 126s radially opposes the U-phase winding U1 during rotation of the rotor 121, the second N-claw-pole 127n that is opposite to the first S-claw-pole 126s in the circumferential direction radially opposes the U-phase winding bar U1 (see FIG. 20). That is, poles with different polarities (for example, first S-claw-pole 126s and the second N-claw-pole 127n) that oppose the windings 13 (for example, U-phase windings U1 and bar U1) that are excited with opposite phases (at same timing) have different magnetic forces (that is, one magnetic force is less than other magnetic force). It is thus possible to reduce the combined induced voltage at the windings 13 with the opposite phases by the poles of the rotor 121 (for example, combined induced voltage of U-phase windings U1 and bar U1) while preventing a reduction in torque. As a result, high-speed rotation of the motor 160 can be achieved.

In the example of the rotor 121 shown in FIG. 20, the first N-claw-pole 126n and the first S-claw-pole 126s are provided on one-half of the circumference of the rotor 121 and the second N-claw-pole 127n and the second S-claw-pole 127s are provided on the outer one-half of the circumference of the rotor 121. However, the arrangement of claw-poles of the rotor 121 is not particularly limited thereto and may be appropriately changed as long as the second S-claw-pole 127s is arranged to be opposite to the first N-claw-pole 126n in the circumferential direction and the second N-claw-pole 127n is arranged to be opposite to the first S-claw-pole 126s in the circumferential direction.

In the stator 11, all of the U-phase windings U1, U2, bar U1, and bar U2 do not need to be connected in series. Further, the windings U1 and bar U1 may form a series-connected pair and the windings U2 and bar U2 may form a series-connected pair. Such a modification can also be made in the V-phase and the W-phase.

While FIG. 20 shows a ten-pole-twelve-slot configuration, the present invention may be applied to a fourteen-pole-twelve-slot configuration. In addition, the present invention may be applied to configurations in which the number of poles of the rotor and the number of slots in the ten-pole-twelve-slot configuration (or in a fourteen-pole-twelve-slot configuration) are equally multiplied. In the configuration in which the number of poles of the rotor and the number of slots in the ten-pole-twelve-slot configuration (or in a fourteen-pole-twelve-slot configuration) are equally multiplied, it is preferable that a strong pole group in which the first N-claw-pole 126n and the first S-claw-pole 126s are alternately arranged in the circumferential direction and a weak pole group in which the second N-claw-pole 127n and the second S-claw-pole 127s are alternately arranged in the circumferential direction are alternately arranged in the circumferential direction. As the strong pole group and the weak pole group are circumferentially arranged in a balanced manner according to this configuration, the rotor 121 can be configured in a magnetically and mechanically balanced manner.

Claw-poles of, for example, the N-pole rotor core 123n of the rotor 121 are formed by only the first N-claw-pole 126n, which functions as a first pole, and the second N-claw-pole 127n, which functions as a second pole, in the above embodiment. However, in addition to these claw-poles, for example, a third N-claw-pole (third pole) that applies a weaker magnetic force to the stator 11 than the second N-claw-pole 127n may be provided on the N-pole rotor core 123n.

While the present invention is embodied in the inner rotor motor 110 in which the rotor 121 is arranged on the inner circumferential side of the stator 11 in the above embodiment, the present invention is not particularly limited thereto. The present invention may be embodied in an outer rotor motor in which a rotor is arranged on the outer circumferential side of a stator.

While the present invention is embodied in the radial gap motor 110 in which the stator 11 radially opposes the rotor 121 in the above embodiment, the present invention is not particularly limited thereto. The present invention may be applied to an axial gap motor in which a stator axially opposes a rotor.

The above embodiment and the modifications may be appropriately combined.

A third embodiment of a motor will now be described.

Figure 21A:
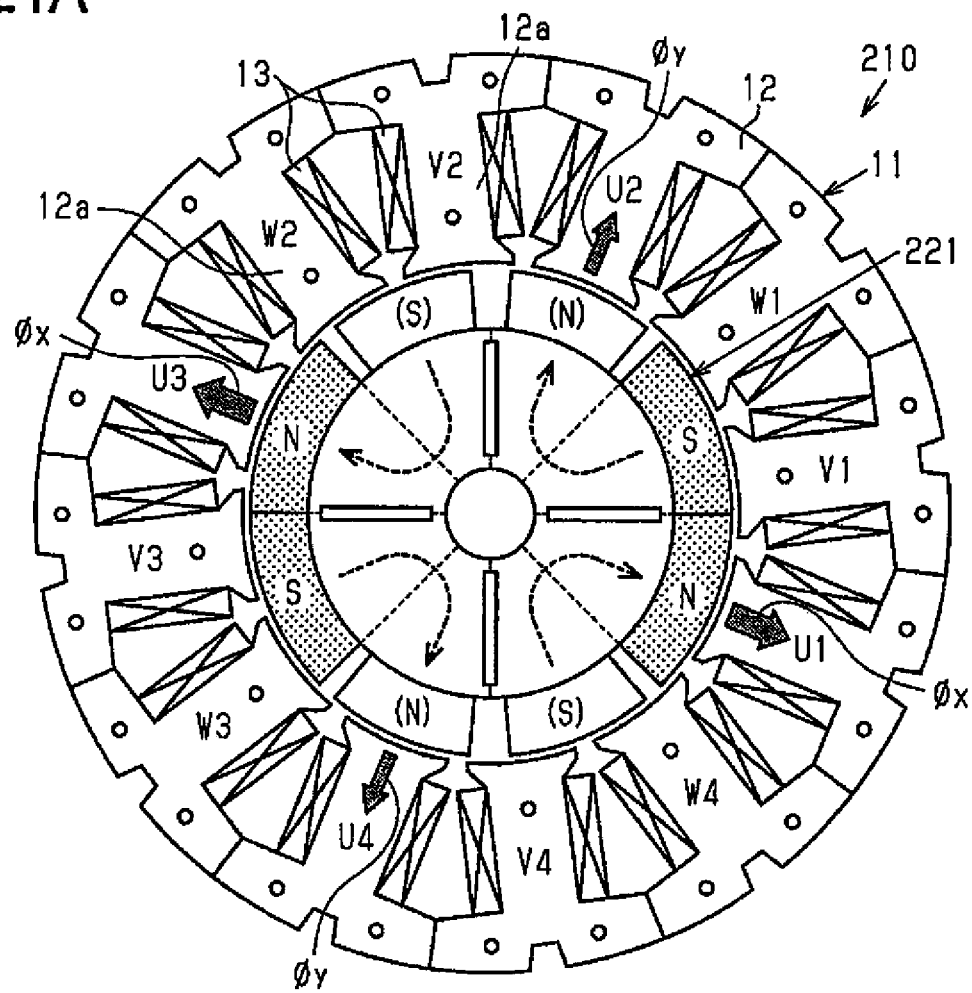
FIG. 21A is a plan view of a motor according to a third embodiment of the present invention.

As shown in FIG. 21A, a motor 210 according to the present embodiment is configured as a brushless motor in which a rotor 221 is arranged inside an annular stator 11. The configuration of the stator 11 is identical to that of the stator 11 according to the first embodiment, and thus detailed descriptions thereof are omitted. The configuration of windings 13 of the stator 11 is also identical to that of the windings 13 according to the first embodiment shown in FIG. 2.

Structure of Rotor

Figure 21B:
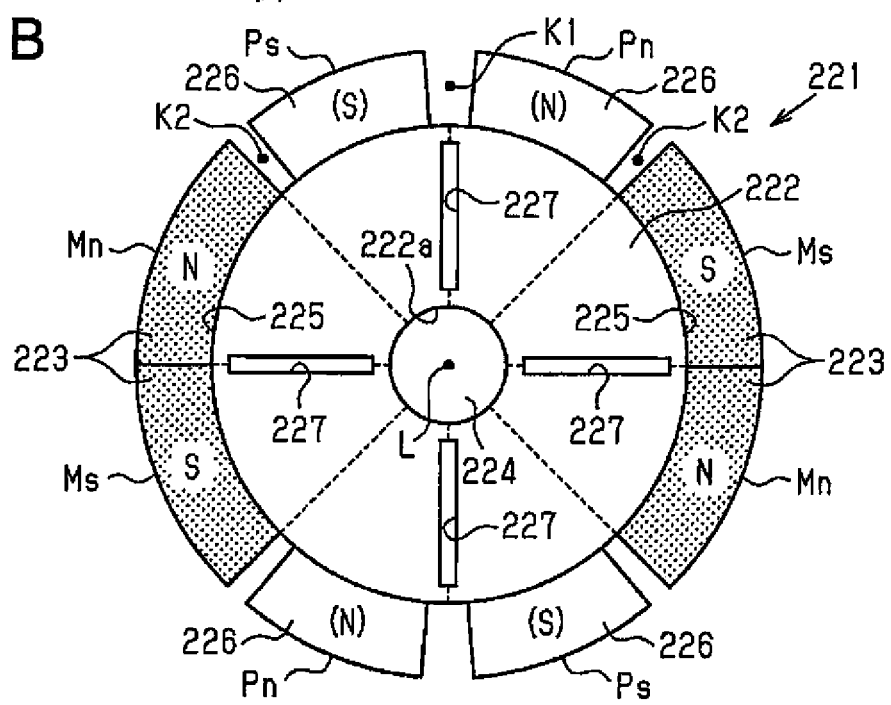
FIG. 21B is a plan view of a rotor according to the third embodiment.

As shown in FIG. 21B, the rotor 221 includes a rotor core 222 and permanent magnets 223. The rotor core 222 is made of a magnetic metal in a substantially disc shape, and a rotation shaft 224 is fixed to the center portion. Two magnet fixing portions 225 and four projections 226 are formed on the outer circumferential part of the rotor core 222.

The magnet fixing portions 225 are opposed to each other at 180° in the circumferential direction. Two permanent magnets 223 are fixed to each of the magnet fixing portions 225, and thus four permanent magnets 223 in total are provided on the outer circumferential part of the rotor core 222.

The permanent magnets 223 have the same shape and an outer circumferential surface of each permanent magnet 223 forms an arc about an axis L as viewed in the direction of the axis L of the rotation shaft 224. The open angle about the axis L (circumferential width) for each permanent magnet 223 is formed to be 45°. The permanent magnet 223 is, for example, an anisotropic sintered magnet and is made of, for example, a neodymium magnet, a samarium-cobalt (SmCo) magnet, a SmFeN magnet, a ferrite magnet, or an Al—Ni—Co magnet.

Each permanent magnet 223 is formed in a manner that the magnetic orientation thereof aligns with a radial direction. Two permanent magnets 223 on each magnet fixing portion 225 are arranged in a manner that poles appearing on an outer circumferential side are different from each other. The permanent magnets 223 with the same polarity are opposed to each other at 180° in the circumferential direction. These permanent magnets 223 form part of poles of the rotor 221. Specifically, the permanent magnet 223 having the N-pole appeared on the outer circumferential side forms an N magnet pole Mn and the permanent magnet 223 having the S-pole appeared on the outer circumferential side forms an S magnet pole Ms.

Two projections 226 of the rotor core 222 that are adjacent to each other in the circumferential direction are arranged in the circumferential direction between the magnet fixing portions 225. A gap K1 is formed between the paired adjacent projections 226 in the circumferential direction. One of the paired adjacent projections 226 is adjacent to the N magnet pole Mn (permanent magnet 223 having the N-pole on outer circumferential side) in the circumferential direction, and functions as an S pole (salient pole Ps functioning as core pole) by the magnetic field of the N-pole permanent magnet 223. In the same manner, the other one of the paired adjacent projection 226 is adjacent to the S magnet pole Ms (permanent magnet 223 having S-pole on outer circumferential side), and functions as an N pole (salient pole Pn functioning as core pole) by the magnetic field of the S-pole permanent magnet 223. Paired N salient poles Pn are opposed to each other at 180° in the circumferential direction, and paired S salient poles Ps are also opposed to each other at 180° in the circumferential direction. The outer circumferential surface of each projection 226 is formed in an arc on the same circle as the outer circumferential surface of each permanent magnet 223 (on the same circle about the axis L of the rotation shaft 224) as viewed in the axial direction. The open angle of each projection 226 is set to be smaller than the open angle of each permanent magnet 223. In addition, a gap K2 is formed between the salient poles Pn and Ps (projections 226) with different polarities and the magnet poles Mn and Ms (permanent magnets 223) with different polarities. That is, the gap K2 is formed between the N salient pole Pn and the S magnet pole Ms and between the S salient pole Ps and the N magnet pole Mn.

The rotor 221 with the above configuration is configured as an eight-pole rotor in which the N-pole and the S-pole are alternately set on the outer circumferential surface (that is, the surface that opposes the stator 11) at circumferentially equal intervals (45° intervals). Specifically, poles on the outer circumferential surface of the rotor 221 (that is, the surface that opposes the stator 11) are arranged in a manner that the N magnet pole Mn, the S salient pole Ps, the N pole Pn, the S magnet pole Ms, the N magnet pole Mn, . . . are repeated clockwise in this order. In addition, the magnet pole Mn and the salient pole Pn that form the N-pole of the rotor 221 are alternately arranged in a manner that circumferential center positions thereof are arranged at equal angular intervals (90° intervals). In the same manner, the magnet pole Ms and the salient pole Ps that form the S-pole of the rotor 221 are also alternately arranged in a manner that circumferential center positions thereof are arranged at equal angular intervals (90° intervals).

Four slit holes 227 extending in the radial direction of the rotation shaft 224 are formed in the rotor core 222. The slit holes 227 are arranged at 90° intervals in the circumferential direction. The slit hole 227 is arranged on the boundary between the salient poles Pn and Ps that are adjacent to each other in the circumferential direction. The slit hole 227 is also arranged on the boundary between the magnet poles Mn and Mn that are adjacent to each other in the circumferential direction. Each slit hole 227 extends from a position near a fixing hole 222a of the rotor core 222 having the rotation shaft 224 fixed thereto to a position near the permanent magnet 223 or the projection 226 in the radial direction. In the present embodiment, each slit hole 227 passes through the rotor core 222 in the axial direction. Each slit hole 227 is hollow and thus the magnetic resistance of the slit hole 227 is larger than that of the rotor core 222 made of a magnetic metal. The magnetic flux of each permanent magnet 223 flowing in the rotor core 222 is thus appropriately guided to the adjacent salient pole Pn or Ps by each slit hole 227 (see broken arrows shown in FIG. 21A).

That is, the rotor 221 includes the magnet poles Mn and Ms functioning as the first pole and the salient poles Pn and Ps functioning as the second pole.

The operation of the present embodiment will now be described.

When three-phase drive currents (AC) with a phase difference of 120° are supplied from a drive circuit (not shown) to U-phase windings U1 to U4, V-phase windings V1 to V4, and W-phase windings W1 to W4, the windings U1 to W4 are excited at the same timing for each phase, a rotational magnet field is generated in the stator 11, and the rotor 221 is rotated by the rotational magnet field. At this time, poles formed in the stator 11 by supplying a three-phase drive current to the stator 11 are the same in the windings U1 to W4 for each phase.

As described above, the number of pole pairs of the rotor 221 (that is, the number of N-poles and the number of S-poles) is set to be equal to the number of the windings U1 to W4 of each phase ("4" in the present embodiment). In rotation of the rotor 221, for example, when one of the N-poles (magnet poles Mn and salient poles Pn) of the rotor 221 radially opposes the U-phase winding U1, other N-poles radially oppose the U-phase windings U2 to U4, respectively (see FIG. 21A).

One-half of the four N-poles of the rotor 221 are formed by the salient poles Pn, which are the projections 226. Each salient pole Pn is a pseudo-pole that functions by the magnetic field of the permanent magnet 223 of the magnet pole Ms adjacent to the salient pole Pn, and thus the magnetic force applied by the salient pole Pn to the stator 11 is weaker than the magnetic force applied by the magnet pole Mn formed by the permanent magnet 223 to the stator 11. The same holds true in the S-poles (salient pole Ps and magnet pole Ms) of the rotor 221.

The flux linkage φy that links the U-phase windings U1 to U4 opposing the salient poles Pn (U-phase windings U2 and U4 in example of FIG. 21A) is thus reduced compared to the flux linkage φx that links the U-phase windings U1 to U4 opposing the magnet poles Mn (U-phase windings U1 and U3 in example of FIG. 21A). Consequently, the induced voltage at the U-phase windings that generate the flux linkage φy (windings opposing salient poles Pn) is less than the induced voltage at the U-phase windings that generate the flux linkage φx (windings opposing magnet poles Mn). A combined induced voltage obtained by combining the induced voltages of the U-phase windings U1 to U4 is thus reduced by a reduction in the induced voltage at a pair of U-phase windings opposing the salient poles Pn (U-phase windings U2 and U4 in FIG. 21A). While a reduction in the combined induced voltage when the U-phase windings U1 to U4 oppose the N-poles (magnet poles Mn and salient poles Pn) of the rotor 221 is described as an example, the combined induced voltage also reduced in the V-phase windings V1 to V4 and the W-phase windings W1 to W4. In addition, the combined induced voltage is also reduced in the S-poles (magnet poles Ms and salient poles Ps) of the rotor 221 by the salient pole Ps.

The advantages of the present embodiment will now be described.

(6) The windings 13 of the stator 11 are formed by four U-phase windings U1 to U4, four V-phase windings V1 to V4, and four W-phase windings W1 to W4 according to a three-phase drive current to be supplied, and four windings of each phase are connected in series. That is, the windings 13 of the stator 11 include at least two series-connected windings (first winding and second winding) in each phase.

The N-poles of the rotor 221 include the magnet pole Mn formed by the permanent magnet 223 and the salient pole Pn formed by the projection 226 of the rotor core 222. The N-pole of the rotor 221 is set in a manner that at the rotation position of the rotor 221 where the magnet pole Mn opposes the first winding of any of the U, V, and W phases (for example, U-phase winding U1 or U3), the salient pole Pn opposes the second winding of the same phase (for example, U-phase winding U2 or U4). In the same manner, the S-poles of the rotor 221 include the magnet pole Ms formed by the permanent magnet 223 and the salient pole Ps formed by the projection 226 of the rotor core 222. The S-pole of the rotor 221 is set in a manner that at the rotation position of the rotor 221 where the magnet pole Ms opposes the first winding of any of the U, V, and W phases (for example, U-phase winding U1 or U3), the salient pole Ps opposes the second winding of the same phase (for example, U-phase winding U2 or U4).

According to such a configuration, the magnetic force of all N-poles (or all S-poles) of the rotor 221 opposing the windings 13 of the same phase is not reduced. Instead, the magnetic force of part of the N-poles or the S-poles is reduced by using the salient pole Pn (or salient pole Ps). It is thus possible to reduce the combined induced voltage at the windings 13 of the same phase by the poles of the rotor 221, while preventing a reduction in torque. As a result, it is possible to achieve high-speed rotation of the motor 210. The salient poles Pn and Ps formed by the projection 226 of the rotor core 222 are used as poles with less magnetic force than the magnet poles Mn and Ms (that is, a so-called consequent pole rotor configuration is provided), and thus it is possible to prevent a reduction in torque caused by a reduction in the magnetic force of part of poles of the rotor 221.

In the connection state of windings where the windings 13 are connected in series in each phase as in the present embodiment, the combined induced voltage is the sum of induced voltages at the windings of the phases, and thus the combined induced voltage tends to be high. As the salient poles Pn and Ps are provided in the configuration in which the windings 13 are connected in series in each phase as described above, it is possible to more surely obtain an effect of reducing the combined induced voltage, which is more appropriate for high-speed rotation of the motor.

(7) The number of the U-phase windings U1 to U4, the V-phase windings V1 to V4, or the W-phase windings W1 to W4 is 2n (n is an integer of 2 or more and n=2 in the present embodiment), and the number of the magnet poles Mn and Ms or the salient poles Pn and Ps of the rotor 221 is n (that is, 2). That is, the number of the magnet poles Mn and Ms is equal to the number of the salient poles Pn and Ps (half of number of windings of each phase), and thus the magnet pole Mn and the salient pole Pn (magnet pole Ms and salient pole Ps) can be alternately provided at circumferentially equal intervals. As a result, the magnet pole Mn and the salient pole Pn (magnet pole Ms and salient pole Ps) with different magnetic forces and masses are circumferentially arranged in a balanced manner and thus the rotor 221 can be configured in a magnetically and mechanically balanced manner.

(8) The salient pole Pn is adjacent to the magnet pole Ms that is formed by the permanent magnet 223 and has the opposite polarity to the salient pole Pn in the circumferential direction and the salient pole Ps is adjacent to the magnet pole Mn that is formed by the permanent magnet 223 and has the opposite polarity to the salient pole Ps in the circumferential direction. Consequently, for example, the salient pole Pn can appropriately function as the N-pole by the magnetic field of the S magnet pole Ms.

(9) The gap K2 is formed between the salient pole Pn and the magnet pole Ms with different polarities and between the salient pole Ps and the magnet poles Mn with different polarities. Consequently, it is possible to prevent a rapid change in the magnetic flux density of the boundaries between the salient poles Pn and the magnet pole Ms and between the salient pole Ps and the magnet pole Mn, thus contributing to a reduction in torque pulsation.

(10) The N salient pole Pn is adjacent to the S salient pole Ps in the circumferential direction with the gap K1 in between. That is, the gap K1 is formed between the N salient pole Pn and the S salient pole Ps that are adjacent to each other, and thus the amount of magnetic flux of the salient pole Pn, Ps is easily adjusted to a desired value. As a result, it is possible to easily adjust output characteristics of the motor 210.

(11) The slit hole 227 (magnetic adjusting portion) is formed in the rotor core 222 for the purpose of guiding the magnetic flux flowing in the rotor core 222. Such a configuration enables the amount of magnetic flux of the salient pole Pn, Ps that is magnetized by the permanent magnet 223 that is adjacent to the salient pole Pn, Ps in the circumferential direction to be easily adjusted to a desired value. As a result, output characteristics of the motor 210 can be easily adjusted. Specifically, the slit hole 227 that is formed on the boundary between the magnet poles Mn and Mn that are adjacent to each other in the circumferential direction prevents short-circuiting of the magnetic flux between the magnet poles Mn and Ms. It is thus possible to prevent a reduction in the amount of magnetic flux from each magnet pole Mn, Ms to the salient pole Pn, Ps adjacent thereto, thus contributing to high torque.

(12) The magnet poles Mn and Ms are formed by fixing the permanent magnet 223 on the outer circumferential surface of the rotor core 222 (magnet fixing portion 225). That is, as the rotor 221 has a surface permanent magnet configuration (SPM configuration), this contributes to high torque of the motor 210.

The above embodiment may be modified as follows.

Although not particularly described in the above embodiment, field weakening control may be executed during high-speed rotation of the rotor 221. In the above embodiment, as the rotor 221 includes the salient poles Pn and Ps that do not generate magnetic flux by themselves, a field weakening current supplied to the winding 13 can be reduced. As the field weakening current can be reduced, the permanent magnet 223 hardly demagnetizes during the field weakening control and the copper loss of the winding 13 can be also reduced. That is to say, the amount of flux linkage that can be reduced by the same amount of the field weakening current is increased, and thus it is possible to achieve more effectively high-speed rotation by the field weakening control.

Figure 22:
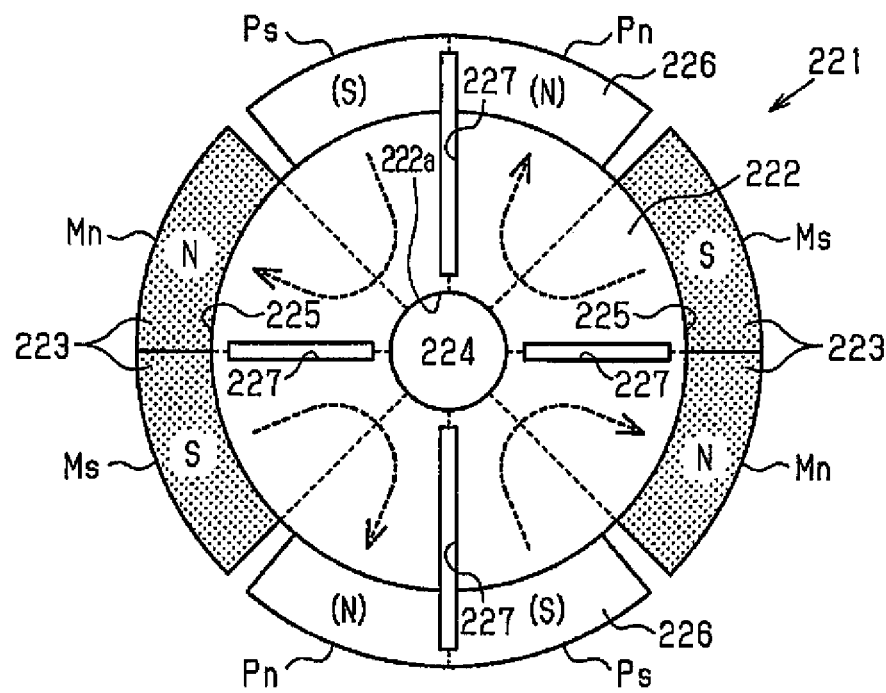
FIG. 22 is a plan view of a rotor according to another example of the third embodiment.

While two projections 226 are provided in the rotor core 222 between the magnet fixing portions 225 in the circumferential direction in the above embodiment, for example, as shown in FIG. 22, one projection 226 may be provided between the magnet fixing portions 225 in the circumferential direction. As shown in FIG. 22, in terms of allowing the magnetic flux of the permanent magnet 223 to flow to the salient poles Pn and Ps, it is more preferable that the slit hole 227 on the boundary between the salient poles Pn and Ps adjacent to each other in the circumferential direction extends to the projection 226.

The configuration of the slit hole 227 formed in the rotor core 222 such as the arrangement or shape thereof is not limited to the above embodiment and the example of FIG. 22, and for example, configurations of FIGS. 23 to 26 may be employed. While FIGS. 23 to 26 exemplify the rotor of the type described in the above embodiment (rotor in which projection 226 is divided into two), the present invention may be applied to the rotor of the type in which the projection 226 is not divided as shown in the example of FIG. 22.

Figure 23:
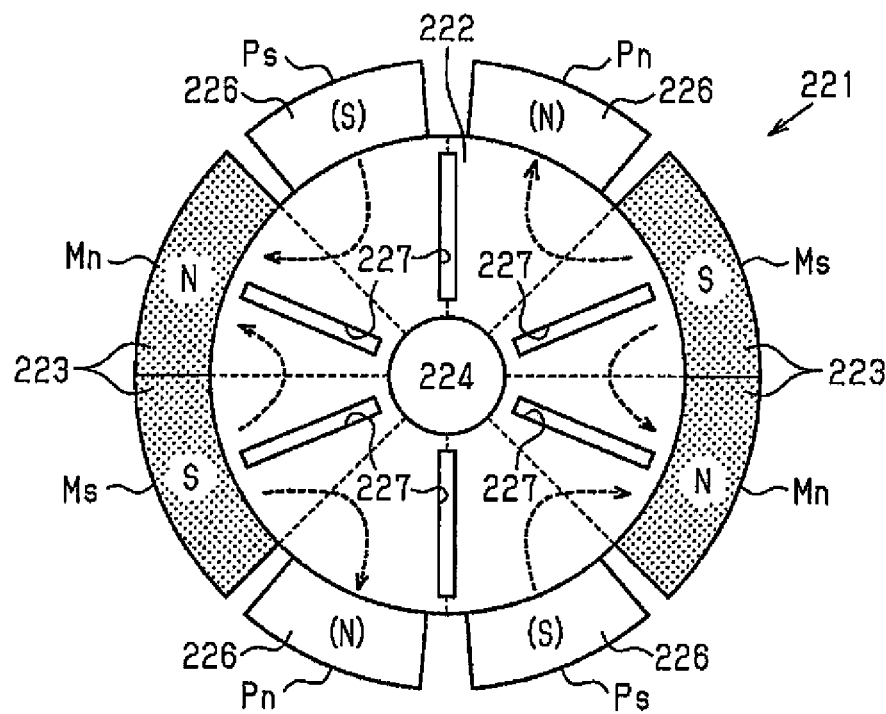
FIG. 23 is a plan view of a rotor according to a further example of the third embodiment.

In the example of FIG. 23, the slit hole 227 is arranged at a position that is radially inward of the permanent magnet 223 and corresponds to the circumferential center of the permanent magnet 223. As the slit hole 227 is arranged radially inward of the permanent magnet 223 as described above, the magnetic flux of the permanent magnet 223 flowing in the rotor core 222 is branched to circumferentially both sides of the slit hole 227 (see broken arrows in FIG. 23). The amount of magnetic flux between the permanent magnet 223 and the projection 226 adjacent to the permanent magnet 223 (salient poles Pn and Ps) and the amount of magnetic flux between the adjacent permanent magnets 223 (magnet poles Mn and Ms) can be determined depending on the circumferential position of the slit hole 227 that is radially inward of the permanent magnet 223. Consequently, it is possible to more appropriately adjust output characteristics of the motor 210.

Figure 24:
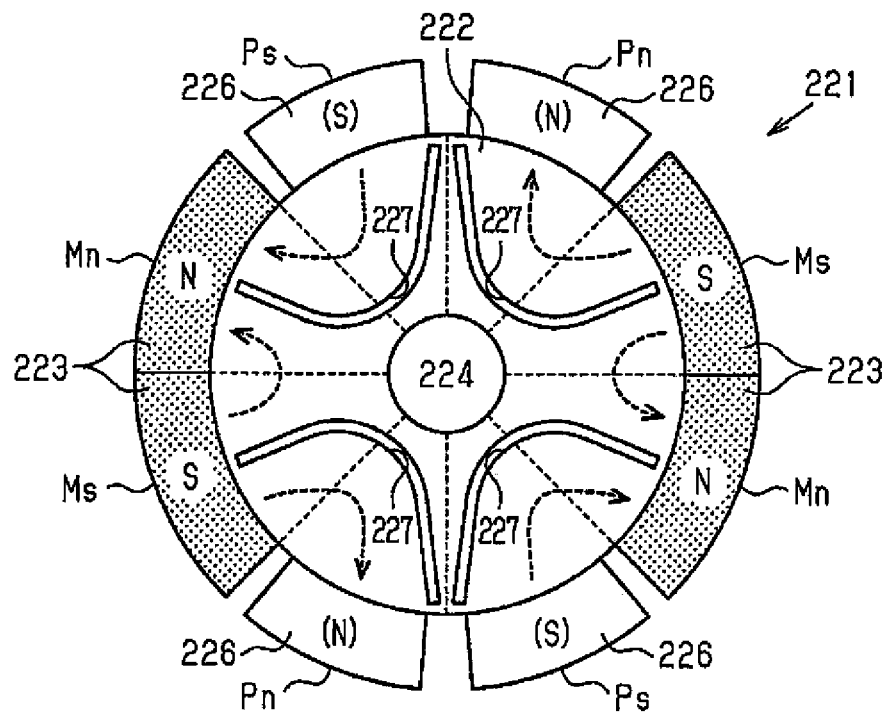
FIG. 24 is a plan view of a rotor according to a further example of the third embodiment.

In the example of FIG. 24, each slit hole 227 is formed in a curved shape projecting radially inward. Specifically, each slit hole 227 extends from a position that is radially inward of the permanent magnet 223 and corresponds to the circumferential center of the permanent magnet 223 toward the inner circumference side, curves toward the projection 226 adjacent to the permanent magnet 223, and extends approximately to the boundary between the salient poles Pn and Ps. Such a configuration also achieves substantially similar effects to the example of FIG. 23.

Figure 25:
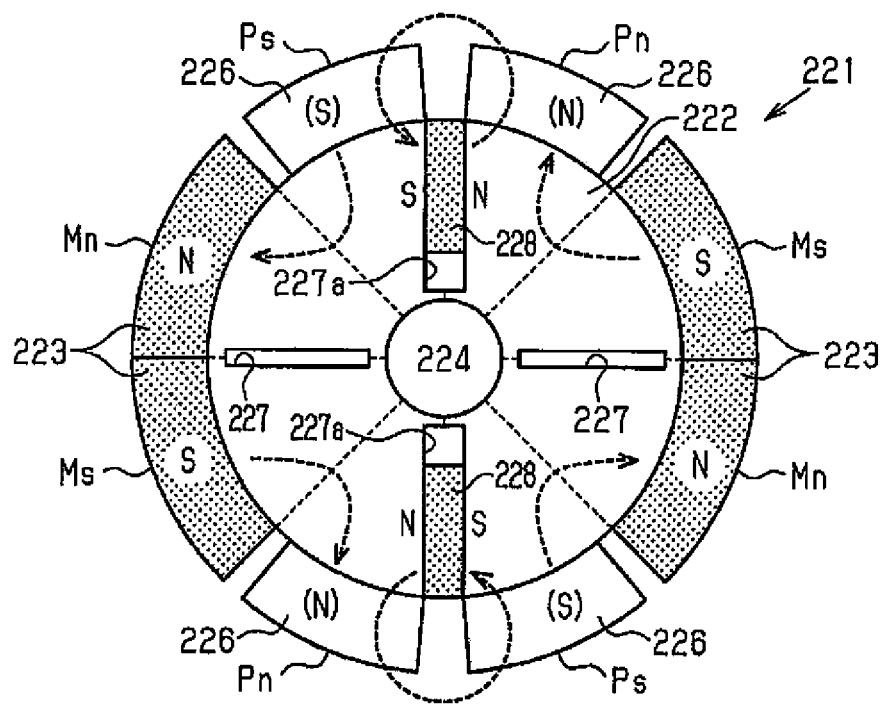
FIG. 25 is a plan view of a rotor according to a further example of the third embodiment.

For example, as shown in FIG. 25, an auxiliary magnet 228 may be fitted into the slit hole 227. In this configuration, the slit hole 227 and the auxiliary magnet 228 form a magnetic adjusting portion. The auxiliary magnet 228 may be, for example, a neodymium magnet, a samarium-cobalt (SmCo) magnet, a SmFeN magnet, a ferrite magnet, or an Al—Ni—Co magnet. In addition, the auxiliary magnet 228 may be a sintered magnet or a bonded magnet.

In the example of FIG. 25, the auxiliary magnet 228 is provided in a slit (slit hole 227a in FIG. 25) on the boundary between the salient poles Pn and Ps that are adjacent to each other in the circumferential direction. That is, the auxiliary magnet 228 is provided on the boundary between the N salient pole Pn and the S salient pole Ps. The auxiliary magnet 228 has the magnetic orientation substantially along the circumferential direction of the rotor 221 and is magnetized in a manner that the surface near the salient magnet pole Pn in the circumferential direction is the N-pole and the surface near the salient pole Ps in the circumferential direction is the S-pole.

According to such a configuration, not only the magnetic flux of the permanent magnet 223 but also the magnetic flux of the auxiliary magnet 228 flows in the salient poles Pn and Ps, and thus the magnetic flux flowing in the salient poles Pn and Ps is increased. As a result, this contributes to high torque of the motor 210. Also in this case, the magnetic force applied by the salient poles Pn and Ps of the rotor 221 to the stator 11 is preferably set to be weaker than the magnetic force applied by the magnet poles Mn and Ms of the rotor 221 to the stator 11.

In this example, it is possible to easily adjust output characteristics of the motor 210 by causing magnetic characteristics (residual magnetic flux density and coercive force) of the auxiliary magnet 228 to be different from those of the permanent magnet 223. The auxiliary magnet 228 is hardly affected by an external magnetic field because the auxiliary magnet 228 is embedded in the rotor core 222. It is thus possible to set the coercive force to be small (or set the residual magnetic flux density to be high).

Figure 26:
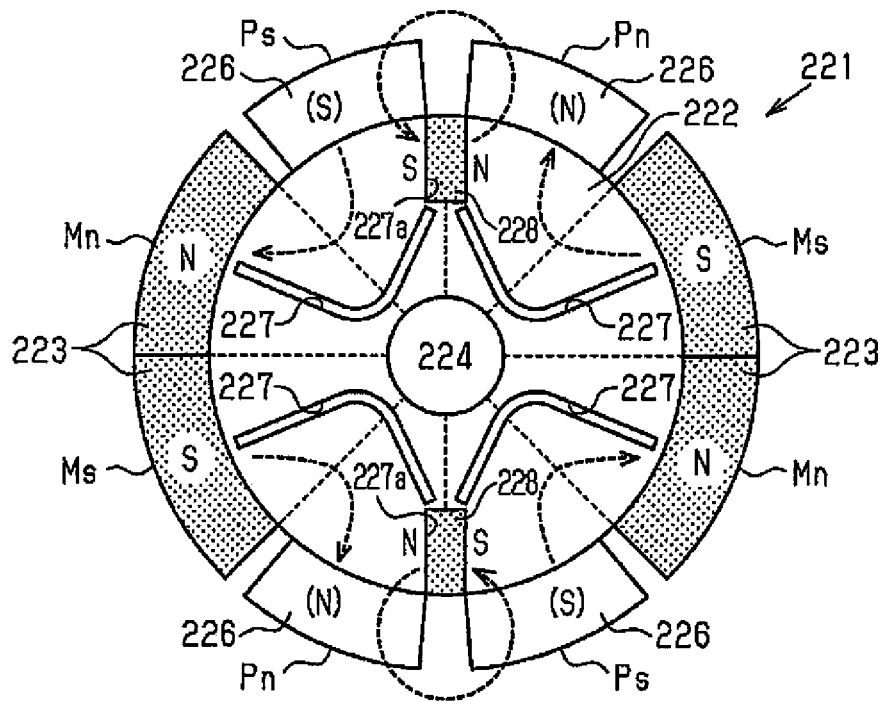
FIG. 26 is a plan view of a rotor according to a further example of the third embodiment.

The slit hole 227 identical to that of FIG. 23 or 24 may be applied to the configuration having the auxiliary magnet 228. FIG. 26 shows a configuration obtained by applying the slit hole 227 that is identical to that of FIG. 24 to the configuration having the auxiliary magnet 228.

In the rotor 221 according to the above embodiment, the N magnet poles Mn are opposed to each other at 180° in the circumferential direction and the N salient poles Pn are opposed to each other at 180° in the circumferential direction. In the same manner, the S magnet poles Ms are opposed to each other at 180° in the circumferential direction and the S salient poles Ps are opposed to each other at 180° in the circumferential direction. That is, while the magnet pole Mn and the salient pole Pn are alternately arranged in the circumferential direction, and the magnet pole Ms and the salient pole Ps are also alternately arranged in the circumferential direction, the present invention is not particularly limited thereto. For example, the N salient pole Pn may be opposed to the N magnet pole Mn at 180°. In the same manner, the S salient pole Ps may be opposed to the S magnet pole Ms at 180°.

While in the N-pole of the rotor 221, for example, the number of the magnet poles Mn is equal to the number of the salient poles Pn (half of number of the windings 13 of each phase, namely, two) in the above embodiment, these numbers do not need to be equal. For example, three magnet poles Mn (or magnet pole Mn) may be provided and a salient pole Pn (or three salient poles Pn) may be provided. Such a modification is possible in the S-pole (magnet pole Ms and salient pole Ps) of the rotor.

While the salient pole Pn and the salient pole Ps are included in both the N-pole and the S-pole of the rotor 221 in the above embodiment, the present invention is not particularly limited thereto. For example, a salient pole may be included in only one of poles of the rotor 221 and the other pole may include only a pole.

While windings of each phase, that is, the U-phase windings U1 to U4, the V-phase windings V1 to V4, or the W-phase windings W1 to W4 are connected in series in the above embodiment, the present invention is not particularly limited thereto, and the connection state of windings may be appropriately changed.

Figure 27:
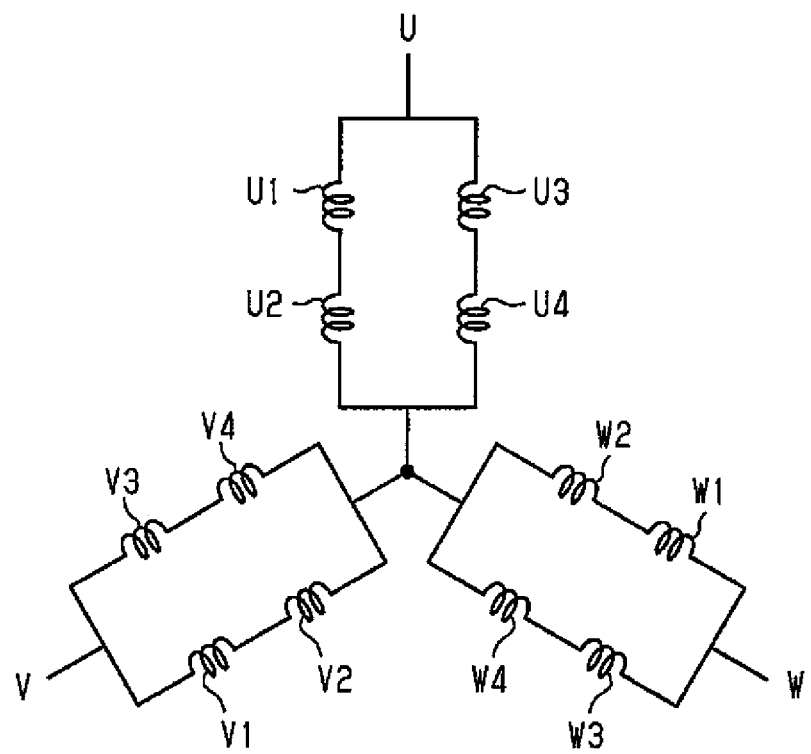
FIG. 27 is an electrical circuit diagram showing the connection state of windings according to another example of the third embodiment.

In an example of FIG. 27, in the U-phase, the windings U1 and U2 are connected in series, the windings U3 and U4 are connected in series, and a series-connected pair of the windings U1 and U2 is connected in parallel to a series-connected pair of the windings U3 and U4. In the same manner, in the V-phase, the windings V1 and V2 are connected in series, the windings V3 and V4 are connected in series, and a series-connected pair of the windings V1 and V2 is connected in parallel to a series-connected pair of the windings V3 and V4. In addition, in the W-phase, the windings W1 and W2 are connected in series, the windings W3 and W4 are connected in series, and a series-connected pair of the windings W1 and W2 is connected in parallel to a series-connected pair of the windings W3 and W4.

If the connection state of windings shown in FIG. 27 is applied to the configuration of the rotor 221 according to the above embodiment (see FIG. 21), for example in the U-phase, the induced voltage at the winding U1 is equal to the induced voltage at the winding U3, and the induced voltage at the winding U2 is equal to the induced voltage at the winding U4. The combined induced voltage at the series-connected pair of the windings U1 and U2 is thus substantially equal to the combined induced voltage at the series-connected pair of the windings U3 and U4. Consequently, there is always a reduction in the induced voltage by the salient poles Pn and Ps in both the series-connected pair of the windings U1 and U2 and the series-connected pair of the windings U3 and U4. The series-connected pair of the windings U1 and U2 is connected in parallel to the series-connected pair of the windings U3 and U4, and thus the combined induced voltage at the overall U-phase windings is substantially equal to the combined induced voltage at the series-connected pair of the windings U1 and U2 (or combined induced voltage at series-connected pair of windings U3 and U4). The combined induced voltage at the overall U-phase windings can thus be reduced effectively.

It is assumed that the winding U2 is replaced by the winding U3 in the example of FIG. 27, that is, the windings U1 and U3 with the same induced voltage are connected in series and the windings U2 and U4 with the same induced voltage are connected in series. In this case, there is a reduction in the induced voltage by the salient poles Pn and Ps in only one of the series-connected pair of the windings U2 and U4 and the series-connected pair of the windings U1 and U3, and there is no reduction in the induced voltage in the other series-connected pair. In addition, the series-connected pair of the windings U1 and U3 is connected in parallel to the series-connected pair of the windings U2 and U4, and thus it is disadvantage in effectively reducing the combined induced voltage at the overall U-phase windings. Also in a case where the U-phase windings U1 to U4 are connected in parallel, it is disadvantage in effectively reducing the combined induced voltage at the overall U-phase windings.

As described above, when windings are connected in series in each phase, a winding that opposes the magnet pole Mn (or magnet pole Ms) is connected in series to a winding that opposes the salient pole Pn (or salient pole Ps) (for example, U-phase winding U1 is connected in series to U-phase winding U2) at a predetermined rotation position of the rotor 221. The combined induced voltage is thus obtained by adding a weak induced voltage at windings of the same phase to a strong induced voltage at windings of the same phase, and the combined induced voltage of each phase can be effectively reduced.

While the windings U1 and U2 form a series-connected pair and the windings U3 and U4 form a series-connected pair in the U-phase in the example of FIG. 27, similar effects can be obtained if the windings U1 and U4 form a series-connected pair and the windings U2 and U3 form a series-connected pair. Such a modification can also be made in the V-phase and the W-phase.

While the series-connected pair of the windings U1 and U2 is connected in parallel to the series-connected pair of the windings U3 and U4 in the U-phase in the example of FIG. 27, the present invention is not particularly limited thereto. The series-connected pair of the windings U1 and U2 and the series-connected pair of the windings U3 and U4 may be separated from each other and paired inverters may be provided in the separated series-connected pairs, for the purpose of supplying a U-phase drive current to the separated series-connected pairs. Such a configuration also achieves similar effects. Such a modification can also be made in the V-phase and the W-phase.

While the connection state of windings is star connection in the above embodiment (see FIG. 2) and the example of FIG. 27, the present invention is not limited thereto and for example, delta connection may be employed.

Figure 28:
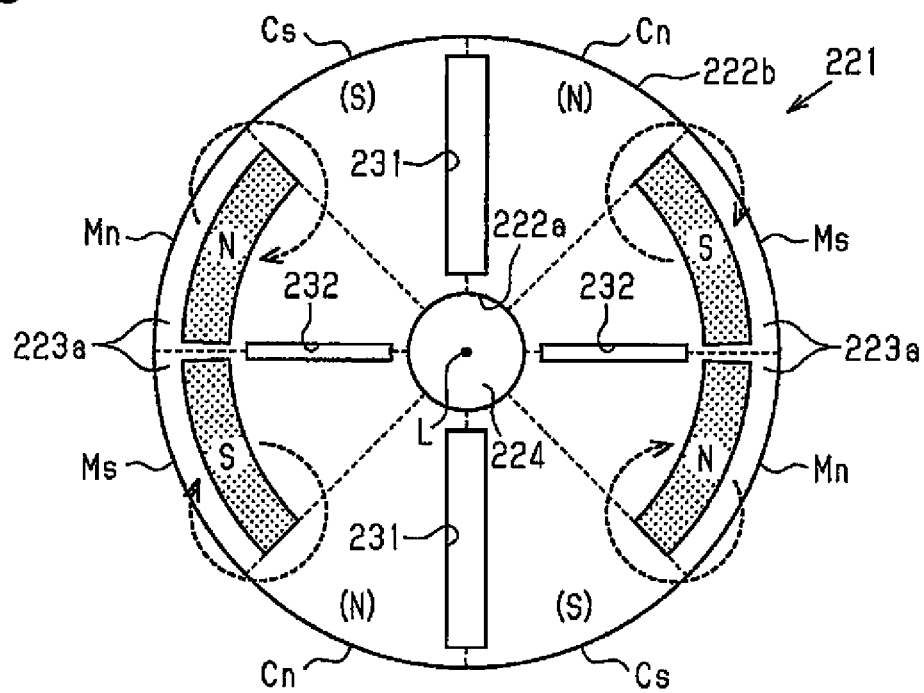
FIG. 28 is a plan view of a rotor according to a further example of the third embodiment.

While the rotor 221 according to the above embodiment has a surface permanent magnet configuration (SPM configuration) in which the permanent magnet 223 forming the magnet poles Mn and Ms is fixed on the circumferential surface (magnet fixing portion 225) of the rotor core 222, the rotor 221 may have an interior permanent magnet configuration (IPM configuration) in which as shown in FIG. 28, for example, a permanent magnet 223a is embedded inside of an outer circumferential surface 222b of the rotor core 222.

In the example of FIG. 28, the outer circumferential surface 222b of the rotor core 222 is circular as viewed in the axial direction, and radially outer and inner side surfaces of the permanent magnets 223a that form the magnet poles Mn and Ms are formed in an arc shape about the central axis of the rotor core 222 (axis L of rotation shaft 224) as viewed in the axial direction.

As in the above embodiment, the rotor 221 shown in FIG. 28 is configured as an eight-pole rotor in which the N-pole and the S-pole are alternately set on an outer circumferential surface 222b at circumferentially equal intervals (45° intervals). Specifically, a pole that is adjacent to the N magnet pole Mn in the circumferential direction (pole that is opposite to magnet pole Ms with magnet pole Mn located in between) is configured as a core pole Cs formed by part of the rotor core 222. The core pole Cs functions as an S pole by the magnetic field of the permanent magnet 223a of the magnet pole Mn. In the same manner, a pole that is adjacent to the S magnet pole Ms in the circumferential direction (pole that is opposite to magnet pole Mn with magnet pole Ms located in between) is configured as a core pole Cn formed by part of the rotor core 222. The core pole Cn functions as an N pole by the magnetic field of the permanent magnet 223a of the magnet pole Ms.

That is, poles on the outer circumferential surface of the rotor 221 are arranged in the clockwise direction in the order of the N magnet pole Mn, the S core pole Cs, the N core pole Cn, the S magnet pole Ms, the N magnet pole Mn, and so on. In addition, the magnet pole Mn and the core pole Cn that form the N-pole of the rotor 221 are alternately arranged in a manner that circumferential center positions thereof are arranged at equal angular intervals (90° intervals). In the same manner, the magnet pole Ms and the core pole Cs that form the S-pole of the rotor 221 are also alternately arranged in a manner that circumferential center positions thereof are arranged at equal angular intervals (90° intervals).

Paired slit holes 231 radially extending on the boundary between the core poles Cn and Cs that are adjacent to each other in the circumferential direction are formed in the rotor core 222. In addition, paired slit holes 232 radially extending on the boundary between the magnet poles Mn and Ms that are adjacent to each other in the circumferential direction are also formed in the rotor core 222. These slit holes 231 and 232 are alternately formed at circumferentially equal intervals (90° intervals).

The slit holes 231 and 232 are hollow and thus these slits axially extend through the rotor core 222. Each of the slit holes 231 and 232 is formed in a rectangular shape as viewed in the axial direction. The slit hole 231 between the core poles Cn and Cs extends from a position near the fixing hole 222a to a position near the outer circumferential surface 222b of the rotor core 222 in the radial direction. The slit hole 232 between the magnet poles Mn and Ms extends from a position near the fixing hole 222a to a position near the permanent magnet 223a in the radial direction.

The slit holes 231 and 232 are hollow and thus the magnetic resistance of the slit holes 231 and 232 is larger than that of the rotor core 222 made of a magnetic metal. The magnetic flux of each permanent magnet 223a flowing in the rotor core 222 is thus appropriately guided to the adjacent core pole Cn or Cs by each of the slit holes 231 and 232 (see broken arrows shown in FIG. 28).

In the SPM rotor 221 as in the above embodiment, the permanent magnet 223 fixed on the outer circumferential surface of the rotor core 222 directly opposes the stator 11 and thus high torque is obtained, but the permanent magnet 223 is easily demagnetized during field weakening control.

In contrast thereto, in the IPM rotor 221, the permanent magnets 223a forming the magnet poles Mn and Ms are embedded in the rotor core 222, and thus it is possible to prevent the demagnetization of the permanent magnet 223 during field weakening control.

The slit holes 231 and 232 (magnetic adjusting portions) are formed in the rotor core 222 for the purpose of guiding the magnetic flux flowing in the rotor core 222. Such a configuration enables the amount of magnetic flux of the core poles Cn and Cs that is magnetized by the permanent magnet 223a that is adjacent to the core poles Cn and Cs in the circumferential direction to be easily adjusted to a desired value. As a result, output characteristics of the motor can be easily adjusted. In the example of FIG. 28, the slit hole 231 between the core poles Cn and Cs may be omitted.

That is, the rotor 221 shown in FIG. 28 includes the magnet poles Mn and Ms functioning as the first pole and the core poles Cn and Cs functioning as the second pole.

Figure 29:
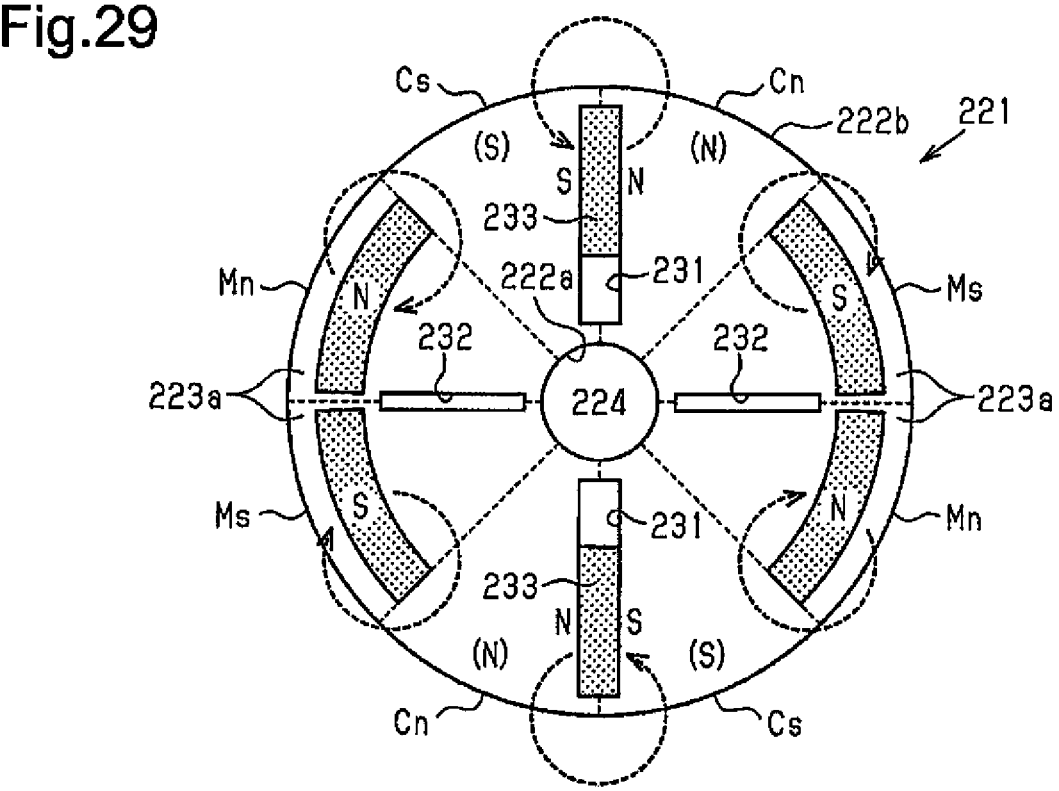
FIG. 29 is a plan view of a rotor according to a further example of the third embodiment.

The rotor 221 shown in FIG. 29 is obtained by further changing the configuration of FIG. 28, and an auxiliary magnet 233 (magnetic adjusting portion) is provided in each slit hole 231 between the core poles Cn and Cs. Each auxiliary magnet 233 is magnetized in a manner that the surface near the core magnet pole Cn in the circumferential direction is the N-pole and the surface near the core pole Cs in the circumferential direction is the S-pole. The auxiliary magnet 233 may be, for example, a neodymium magnet, a samarium-cobalt (SmCo) magnet, a SmFeN magnet, a ferrite magnet, or an Al—Ni—Co magnet. In addition, the auxiliary magnet 233 may be a sintered magnet or a bonded magnet.

According to such a configuration, not only the magnetic flux of the permanent magnet 223a but also the magnetic flux of the auxiliary magnet 233 flows in the core poles Cn and Cs, and thus the magnetic flux flowing in the core poles Cn and Cs is increased. As a result, this contributes to high torque of the motor. Also in this case, the magnetic force applied by the core poles Cn and Cs of the rotor 221 to the stator 11 is preferably set to be weaker than the magnetic force applied by the magnet poles Mn and Ms of the rotor 221 to the stator 11.

Figure 30:
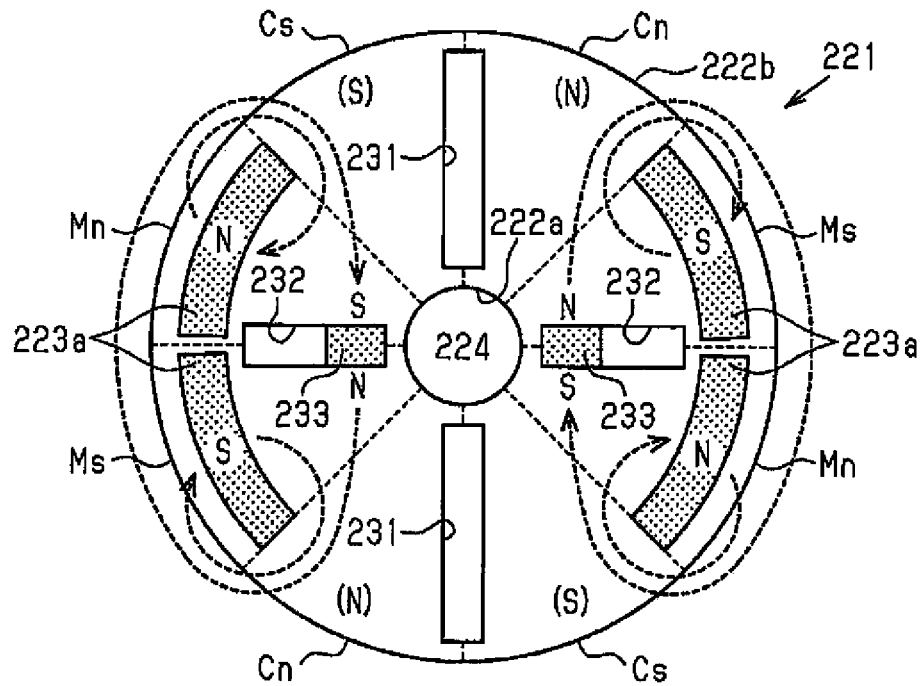
FIG. 30 is a plan view of a rotor according to a further example of the third embodiment.

The arrangement position of the auxiliary magnet 233 is not limited to the slit hole 231 between the core poles Cn and Cs, and as shown in FIG. 30, the auxiliary magnet 233 may be provided in the slit hole 232 between the magnet poles Mn and Ms. In this case, each auxiliary magnet 233 is preferably magnetized in a manner that the surface near the magnet pole Ms in the circumferential direction is the N-pole and the surface near the magnet pole Mn in the circumferential direction is the S-pole. The configuration of FIG. 30 can also increase the magnetic flux flowing in the core poles Cn and Cs, thus contributing to high torque of the motor. While the auxiliary magnet 233 is provided in a radially inward end portion of the slit hole 232 in the configuration of FIG. 30, the arrangement position of the slit auxiliary magnet 233 in the slit hole 232 is not limited to the position in the configuration of FIG. 30 and may be appropriately changed according to the configuration.

Figure 31:
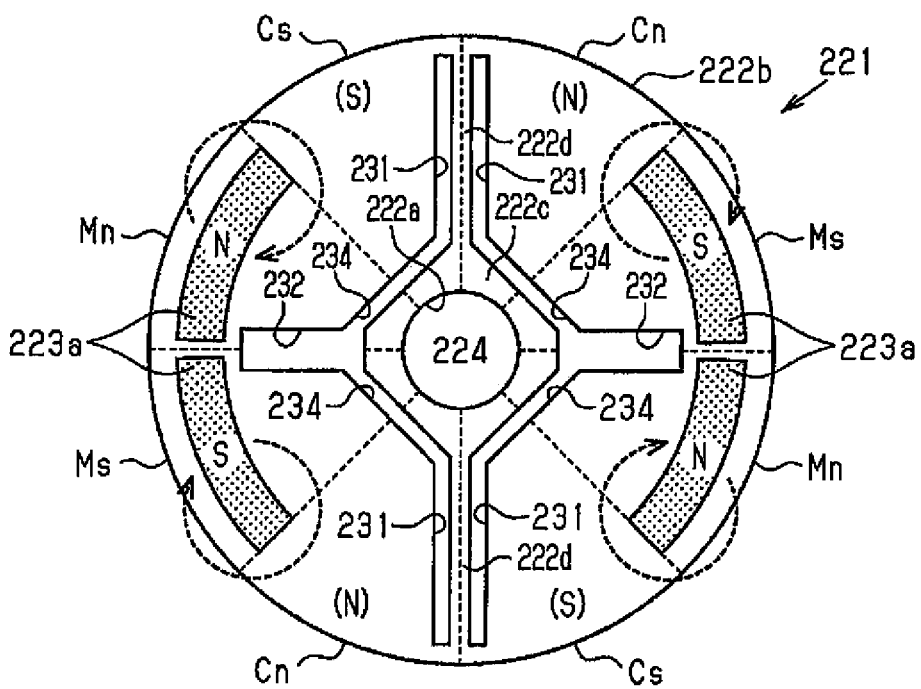
FIG. 31 is a plan view of a rotor according to a further example of the third embodiment.

The rotor 221 shown in FIG. 31 is obtained by changing the configuration of FIG. 28, and includes a communicating portion 234 through which inner ends of the slit hole 231 and the slit hole 232 are in communicate with each other. According to the example of FIG. 31, in the rotor core 222, paired supports 222d that support a center portion 222c having the fixing hole 222a are formed on the boundary between the core poles Cn and Cs so as to divide the slit hole 231. The communicating portion 234 functions as the magnetic resistance between the adjacent core poles Cn and Cs and between the adjacent magnet poles Mn and Ms at radially inward end portions of the slit holes 231 and 232. According to such a configuration, the communicating portion 234 can reduce short-circuit magnetic flux that may be generated between the permanent magnets 223a forming the magnet poles Mn and Ms, and thus the magnetic flux flowing in the core poles Cn and Cs is increased. As a result, this contributes high torque of the motor.

Figure 32:
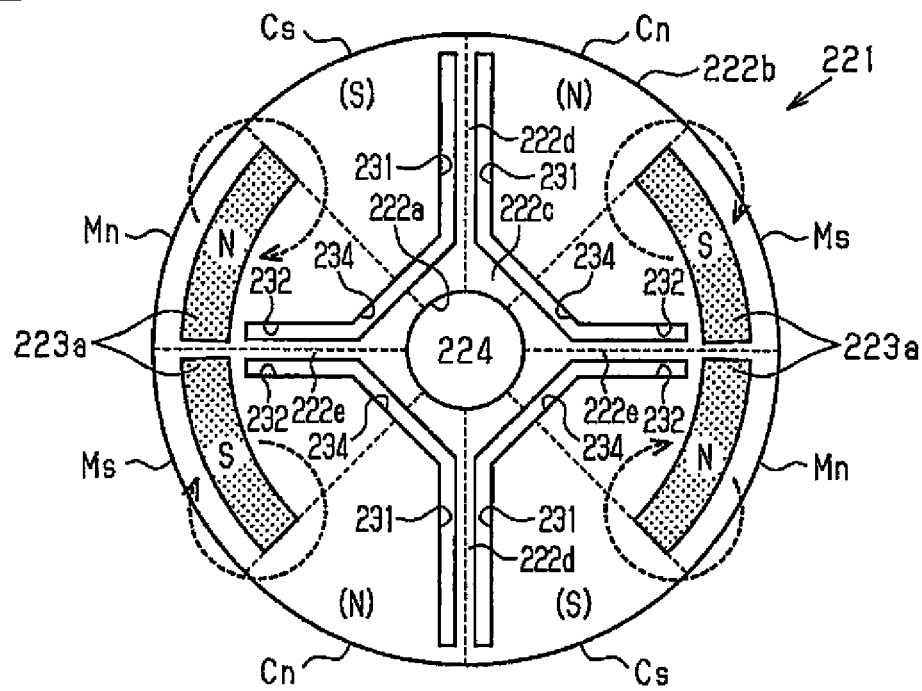
FIG. 32 is a plan view of a rotor according to a further example of the third embodiment.

The rotor 221 shown in FIG. 32 is obtained by changing the configuration of FIG. 31, and in the rotor core 222, paired supports 222e that support the center portion 222c are formed on the boundary between the magnet poles Mn and Ms so as to divide the slit hole 232. With such a configuration, the center portion 222c of the rotor core 222 can be supported stably by the supports 222d and 222e. In the example of FIG. 32, the support 222d may be omitted.

Figure 33:
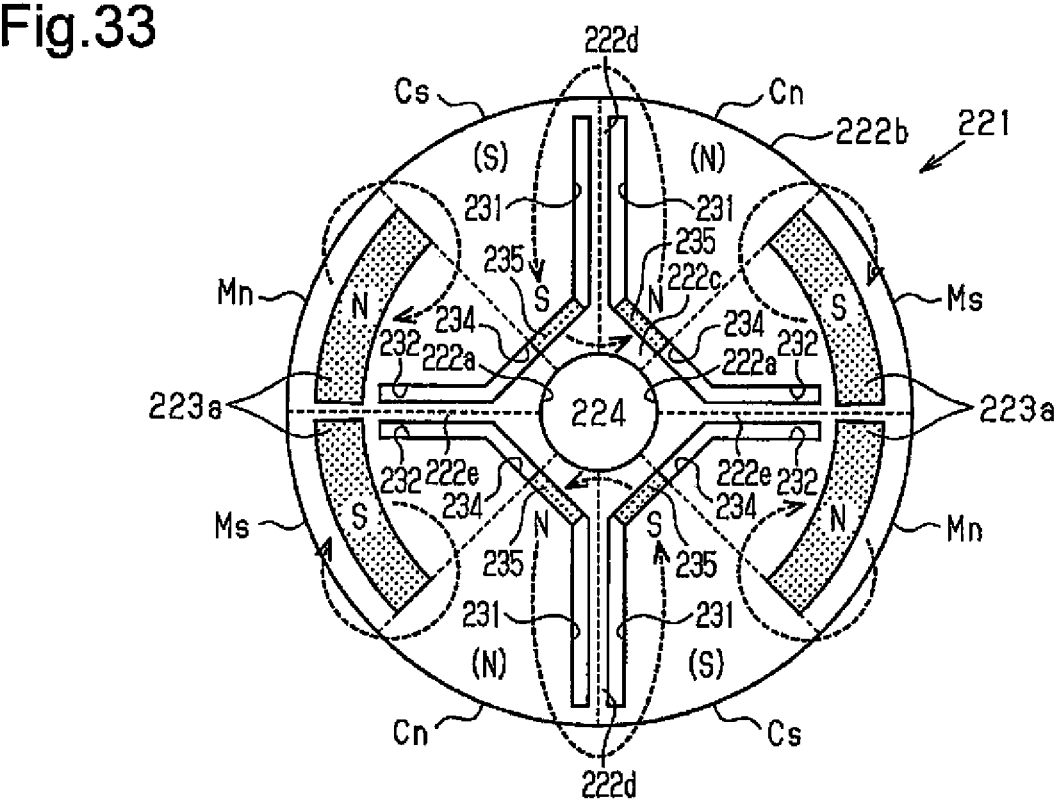
FIG. 33 is a plan view of a rotor according to a further example of the third embodiment.

The rotor 221 shown in FIG. 33 is obtained by changing the configuration of FIG. 32, and an auxiliary magnet 235 (magnetic adjusting portion) is provided in each communicating portion 234. The auxiliary magnet 235 that is provided in the communicating portion 234 extending across the N core pole Cn and the S magnet pole Ms is magnetized in a manner that the radially outer surface is the N-pole. The auxiliary magnet 235 that is provided in the communicating portion 234 extending across the S core pole Cs and the N magnet pole Mn is magnetized in a manner that the radially outer surface is the S-pole. An end portion of each auxiliary magnet 235 (end portion opposite to slit hole 231) is set at the position corresponding to the boundary between the core pole Cn and the magnet pole Ms or between the core pole Cs and the magnet pole Mn. With the configuration of FIG. 33, the magnetic flux flowing in the core poles Cn and Cs can be increased. As a result, this contributes high torque of the motor. While the auxiliary magnet 235 is provided at a position of the communicating portion 234 near the core poles Cn and Cs in the configuration of FIG. 33, the arrangement position of the auxiliary magnet 235 in the communicating portion 234 is not limited to the position in the configuration of FIG. 33 and may be appropriately changed according to the configuration.

While the rotor 221 has 8 poles and the number of the windings 13 of the stator 11 is 12 (that is, an eight-pole-twelve-slot motor) in the above embodiment, the number of poles of the rotor 221 and the number of the windings 13 can be appropriately changed according to the configuration. For example, the number of poles of the rotor 221 and the number of the windings 13 may be appropriately changed so that the relationship between the number of poles of the rotor 221 and the number of the windings 13 is represented by 2n:3n (n is an integer of 2 or more).

In a case of a six-pole-nine-slot configuration or a ten-pole-fifteen-slot configuration (in a case where the greatest common divisor n of the number of poles of the rotor 221 and the number of the windings 13 is an odd number), the number of pole pairs of the rotor 221 is an odd number, that is, the number of N-poles and the number of S-poles are an odd number. Consequently, the number of the magnet poles Mn is not equal to the number of the salient poles Pn, so that a magnetically unbalanced configuration may be obtained. In contrast thereto, when the greatest common divisor n of the number of poles of the rotor 221 and the number of the windings 13 is an even number as in the above embodiment, the number of the magnet poles Mn is equal to the number of the salient poles Pn, so that a magnetically balanced configuration is obtained.

The relationship between the number of poles of the rotor 221 and the number of the windings 13 does not need to be 2n:3n (n is an integer of 2 or more), and for example, a ten-pole-twelve-slot configuration or a fourteen-pole-twelve-slot configuration may be employed.

Figure 34:
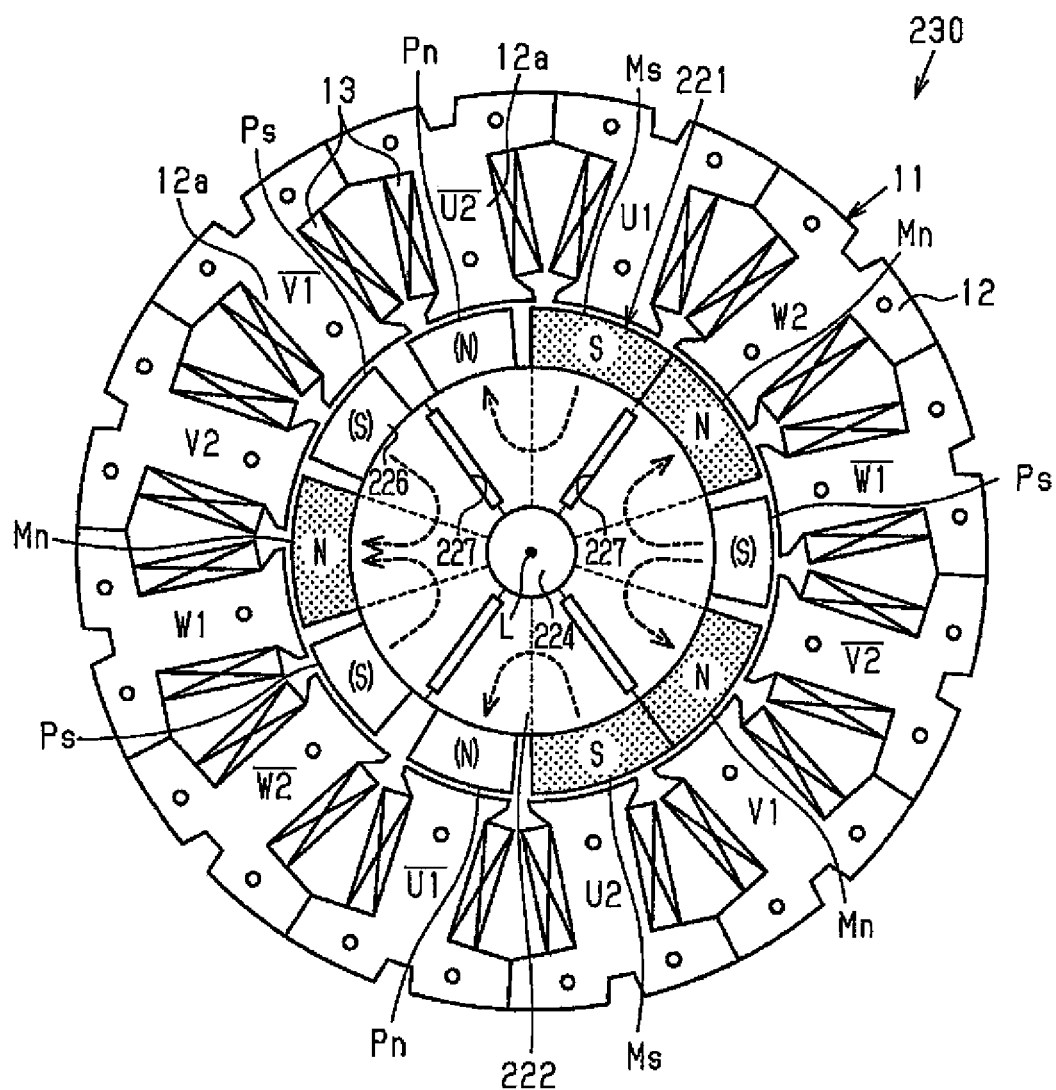
FIG. 34 is a plan view of a motor according to a further example of the third embodiment.

FIG. 34 shows an example of a motor 230, which is a ten-pole-twelve-slot motor. In the example of FIG. 34, same configurations as in the above embodiment are denoted by the same reference numerals, detailed descriptions thereof are omitted, and only different portions are described in detail.

In the motor 230 shown in FIG. 34, twelve windings 13 of the stator 11 are classified according to three-phase drive currents (U-phase, V-phase, and W-phase) to be supplied. In FIG. 34, U1, bar U2, bar V1, V2, W1, bar W2, bar U1, U2, V1, bar V2, bar W1, and W2 are shown counterclockwise in this order. The U-phase windings U1 and U2, the V-phase windings V1 and V2, and the W-phase windings W1 and W2 are normally wound, whereas the U-phase windings bar U1 and bar U2, the V-phase windings bar V1 and bar V2, and the W-phase windings bar W1 and bar W2 are reversely wound. The U-phase winding U1 is opposed to the U-phase winding bar U1 at 180°. In the same manner, the U-phase winding U2 is also opposed to the U-phase winding bar U2 at 180°. The same holds true for other phases (V-phase and W-phase).

The U-phase windings U1, U2, bar U1, and bar U2 are connected in series. In the same manner, the V-phase windings V1, V2, bar V1, and bar V2 are also connected in series, and the W-phase windings W1, W2, bar W1, and bar W2 are also connected in series. A U-phase drive current is supplied to the U-phase windings U1, U2, bar U1, and bar U2. The reversely wound U-phase windings bar U1 and bar U2 are always excited with the reversed polarity (opposite phase) to the normally wound U-phase windings U1 and U2, but these U-phase windings are excited at the same timing. The same holds true for other phases (V-phase and W-phase).

The rotor 221 of the motor 230 is a ten-pole rotor in which an N-pole and an S-pole are alternately set at circumferentially equal intervals (36° intervals), and includes three magnet poles Mn, two magnet poles Ms, two salient poles Pn, and three salient poles Ps. Specifically, poles of the rotor 221 are arranged in a manner that the S magnet pole Ms, the N magnet pole Mn, the S salient pole Ps, N magnet pole Mn, the S magnet pole Ms, the N salient pole Pn, the S salient pole Ps, the N magnet pole Mn, the S salient pole Ps, and the N salient pole Pn are arranged clockwise in this order. That is, the S salient pole Ps is arranged to be opposite to the N magnet pole Mn in the circumferential direction (opposed to each other at 180°) and the N salient pole Pn is arranged to be opposite to the S magnet pole Ms in the circumferential direction (opposed to each other at 180°). In addition, the slit hole 227 that is similar to that according to the above embodiment is formed in the rotor core 222 at a position corresponding to the boundary between the magnet poles Mn and Ms that are adjacent to each other in the circumferential direction and at a position corresponding to the salient poles Pn and Ps that are adjacent to each other in the circumferential direction.

The number of the magnet poles Mn and Ms and the number of the salient poles Pn and Ps are not limited to the numbers in the example of the ten-pole rotor shown in FIG. 34. For example, a rotor may include two magnet poles Mn, three magnet poles Ms, three salient poles Pn, and two salient poles Ps. In addition, the slit hole 227 shown in FIG. 23 or 24 may be added to the rotor 221 of FIG. 34. Alternatively, the configuration of fitting the auxiliary magnet 228 into the slit hole 227a shown in FIG. 25 or 26 may be added to the rotor 221 of FIG. 34.

According to the above configuration, for example, when the S magnet pole Ms radially opposes the U-phase winding U1 during rotation of the rotor 221, the N salient pole Pn that is opposite to the S magnet pole Ms in the circumferential direction radially opposes the U-phase winding bar U1 (see FIG. 34). That is, in poles with different polarities that oppose the windings 13 (for example, U-phase windings U1 and bar U1) that are excited with opposite phases (at the same timing), one of such pole is formed by the magnet pole Ms (magnet pole Mn) and the other one is formed by the salient pole Pn (salient pole Ps). It is thus possible to reduce the combined induced voltage at the windings 13 with the opposite phases by the poles of the rotor 221 (for example, combined induced voltage of U-phase windings U1 and bar U1) while preventing a reduction in torque. As a result, high-speed rotation of the motor 230 can be achieved.

The arrangement of poles of the rotor 221 is not particularly limited to the example of FIG. 34 and may be appropriately changed as long as the salient pole Ps is arranged to be opposite to the magnet pole Mn in the circumferential direction and the salient pole Pn is arranged to be opposite to the magnet pole Ms in the circumferential direction.

In the stator 11, all U-phase windings U1, U2, bar U1, and bar U2 do not need to be connected in series, and the windings U1 and bar U1 may form a series-connected pair and the windings U2 and bar U2 may form a series-connected pair. Such a modification can also be made in the V-phase and the W-phase.

While FIG. 34 shows a ten-pole-twelve-slot configuration, the present invention may be applied to a fourteen-pole-twelve-slot configuration. In addition, the present invention may be applied to configurations in which the number of poles of the rotor and the number of slots in the ten-pole-twelve-slot configuration (or in a fourteen-pole-twelve-slot configuration) are equally multiplied. While FIG. 34 shows a rotor in which the projection 226 is divided into a plurality of parts according to the number of poles, the present invention may be applied to a rotor in which the projection 226 is not divided as shown in FIG. 22.

In the above embodiment, a magnetic flux guide (magnetic adjusting portion) may be formed in the rotor core 222 for the purpose of guiding the magnetic flux of the magnet poles Mn and Ms to a circumferential center CL of the salient pole Pn, Ps (projection 226) (circumferential center of projection 226).

Figure 35:
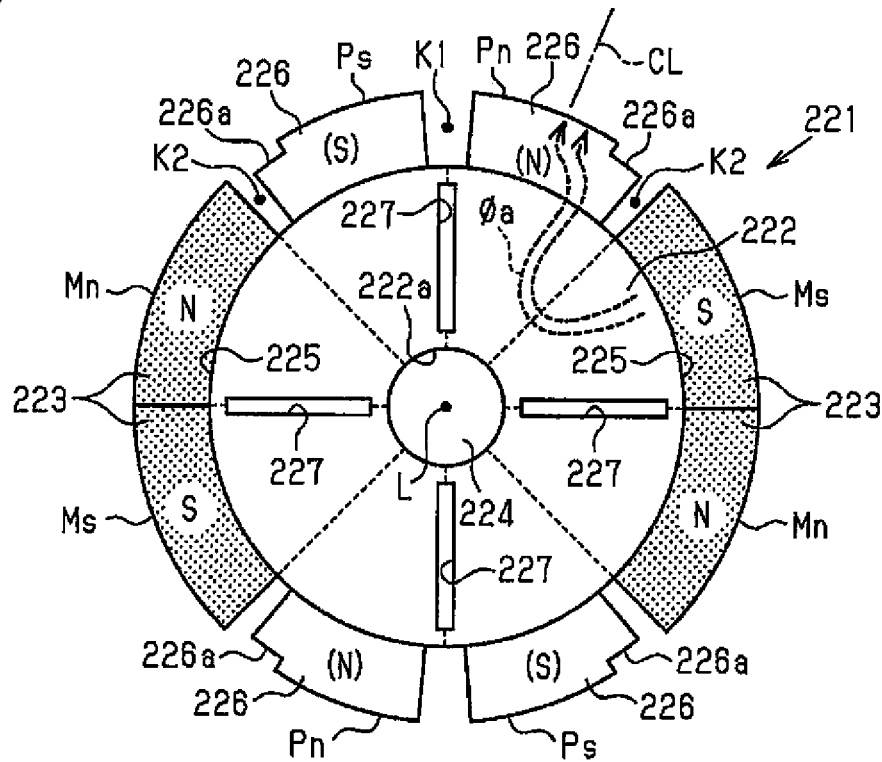
FIG. 35 is a plan view of a rotor according to a further example of the third embodiment.

For example, in a configuration of FIG. 35, a magnetic flux guide recess 226a functioning as the magnetic flux guide is formed in a recessed manner on a radially outer surface of each of the salient poles Pn and Ps. More specifically, the magnetic flux guide recess 226a is formed at an end portion of the radially outer surface of each salient pole Pn (projection 226) near the magnet pole Ms that is adjacent to the salient pole Pn. In the same manner, the magnetic flux guide recess 226a is formed at an end portion of the radially outer surface of each salient pole Ps (projection 226) near the magnet pole Mn that is adjacent to the salient pole Ps. In the example of FIG. 35, the width of each magnetic flux guide recess 226a is set to be approximately ¼ of the circumferential width of the projection 226. The circumferential center CL of the projection 226 and the circumferential center of the permanent magnet 223 are set at circumferentially equal intervals (45° intervals).

According to such a configuration, for example, magnetic flux φa flowing from the magnet pole Ms (permanent magnet 223) through the rotor core 222 into the salient pole Pn adjacent to the magnet pole Ms is guided to the circumferential center CL of the salient pole Pn (projection 226) by the magnetic flux guide recess 226a. The circumferential pole centers (peak positions of the magnetic flux density) of the poles of the rotor 221 (that is, the magnet poles Mn and Ms and the salient poles Pn and Ps) are thus set at circumferentially equal intervals (45° intervals in the example of FIG. 35), and this contributes to high torque.

While the magnetic flux guide (magnetic flux guide recess 226a) is formed on the radially outer surface of the salient pole Pn, Ps in the example of FIG. 35, the position of the magnetic flux guide is not limited thereto, and for example, an opening (space) formed in the salient poles Pn and Ps on the rotor core 222 may function as the magnetic flux guide.

While the present invention is applied to a surface permanent magnet configuration (SPM configuration) in FIG. 35, the present invention may be applied to an interior permanent magnet configuration (IPM configuration).

Figure 36:
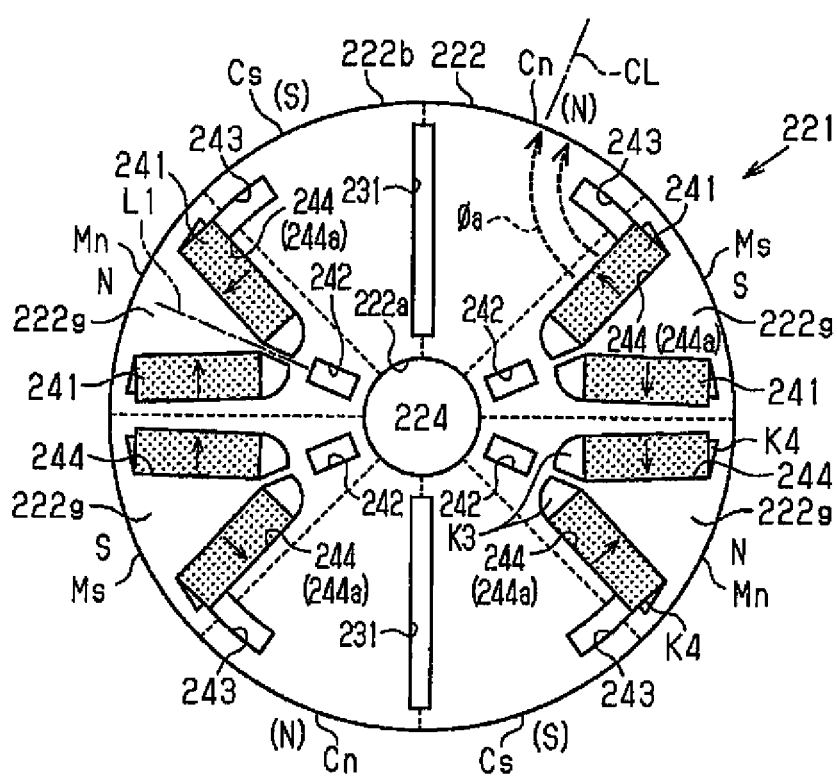
FIG. 36 is a plan view of a rotor according to a further example of the third embodiment.

FIG. 36 shows an example of the rotor 221 that employs the IPM configuration. In the rotor 221 of FIG. 36, the arrangement of poles (circumferential position of each of the magnet poles Mn and Ms and the core poles Cn and Cs) is substantially similar to that of the IPM configuration (for example, see configuration of FIG. 28). That is, the poles of the rotor 221 are arranged in the clockwise direction in the order of the N magnet pole Mn, the S core pole Cs, the N core pole Cn, the S magnet pole Ms, the N magnet pole Mn, and so on.

In the configuration shown in FIG. 36, each of the magnet poles Mn and Ms includes paired permanent magnets 241 embedded in the rotor core 222. In each of the magnet poles Mn and Ms, the paired permanent magnets 241 are arranged in a substantially V-shape, spreading to the outer circumferential side as viewed in the axial direction, and are arranged to be line-symmetrical to each other with respect to a pole center line (see a line L1 in FIG. 36) in the circumferential direction. Each permanent magnet 241 is formed in a rectangular parallelepiped shape. The paired permanent magnets 241 in each of the magnet poles Mn and Ms are arranged to be accommodated within the angle range obtained by equally dividing, in the circumferential direction, the rotor 221 by the number of poles (total number of magnet poles Mn and Ms and core poles Cn and Cs) (range of 45° in this example).

In FIG. 36, solid arrows indicate the magnetization direction of each permanent magnet 241 in the N magnet pole Mn and the S magnet pole Ms, and the distal end of each solid arrow indicates the N-pole, whereas the proximal end of each solid arrow indicates the S-pole. As shown by these arrows, the permanent magnets 241 in the N magnet pole Mn are magnetized in a manner that the N-pole appears on the opposing surfaces (surfaces on the side of the pole center line), so that the outer circumferential surface of the N magnet pole Mn is the N-pole. The permanent magnets 241 in the S magnet pole Ms are magnetized in a manner that the S-pole appears on the opposing surfaces (surfaces on the side of the pole center line), so that the outer circumferential surface of the S magnet pole Ms is the S-pole.

Paired slit holes 231 radially extending on the boundary between the core poles Cn and Cs that are adjacent to each other in the circumferential direction are formed in the rotor core 222. Each slit hole 231 extends from a position near the fixing hole 222a to a position near the outer circumferential surface 222b of the rotor core 222 in the radial direction.

The rotor core 222 includes magnetic resistance holes 242 (magnetic adjusting portions) at positions of the magnet poles Mn and Ms circumferentially inside of the paired permanent magnets 241. Each magnetic resistance hole 242 is a rectangular opening that is radially long as viewed in the axial direction, and is arranged at the circumferential center position of each magnet pole Mn, Ms. That is, in this embodiment, the centers of the magnetic resistance holes 242 of the magnet poles Mn and Ms that are adjacent to each other in the circumferential direction are set to be spaced apart at 45°.

The slit holes 231 and the magnetic resistance holes 242 extend through the rotor core 222 in the axial direction. In addition, the slit holes 231 and the magnetic resistance holes 242 are hollow. Each magnetic resistance hole 242 prevents short-circuiting of magnetic flux between the magnet poles Mn and Ms that are adjacent to each other in the circumferential direction, and each slit hole 231 prevents the magnetic flux of the magnet poles Mn and Ms from short-circuiting through the core poles Cn and Cs. That is, the slit holes 231 and the magnetic resistance holes 242 enable the magnetic flux of the magnet poles Mn and Ms flowing in the rotor core 222 to be appropriately guided to the core poles Cn and Cs respectively adjacent to the magnet poles Ms and Mn.

Gaps K3 and K4 are formed on the inner circumferential side and the outer circumferential side of each permanent magnet 241, respectively. The gaps K3 and K4 are part of a magnet receptacle 244 that is formed in the rotor core 222 and accommodates each permanent magnet 241. The inner circumferential surface of each permanent magnet 241 faces the gap K3 and the inner circumferential surface of each permanent magnet 241 faces the gap K4. That is, the gap K3 is formed between the permanent magnet 241 and a radially inner end portion of the magnet receptacle 244, whereas the gap K4 is formed between the permanent magnet 241 and a radially outer end portion of the magnet receptacle 244.

The magnetic resistance of the gaps K3 and K4 can prevent short-circuiting of magnetic flux of each permanent magnet 241 (short-circuiting of magnetic flux of each permanent magnet 241 between N-pole and S-pole through rotor core 222). That is, the magnetic flux of the magnet poles Mn and Ms is appropriately guided to the core poles Cn and Cs that is adjacent to the magnet poles Mn and Ms by the gaps K3 and K4, and this contributes to high torque.

The rotor core 222 according to this example includes a magnetic flux guide hole 243 (magnetic flux guide) for guiding the magnetic flux of the magnet poles Mn and Ms to the circumferential center CL of the core poles Cn and Cs. Each magnetic flux guide hole 243 is provided at a position of each of the core poles Cn and Cs near the magnet poles Mn and Ms that is adjacent to the core poles Cn and Cs. More specifically, in each of the core poles Cn and Cs, the magnetic flux guide hole 243 communicates with the magnet receptacle 244 (magnet receptacle 244a in FIG. 36) having the permanent magnet 241 near the magnetic flux guide 243 accommodated therein, and is formed to extend from the magnet receptacle 244a to the core poles Cn and Cs in the circumferential direction. In addition, each magnetic flux guide hole 243 is formed at a position corresponding to the radially outer end portion of the permanent magnet 241 near the magnetic flux guide hole 243. The radial width of each magnetic flux guide hole 243 is set to be less than or equal to ¼ of the length of the long side of the permanent magnet 241 as viewed in the axial direction.

According to such a configuration, for example, magnetic flux φa flowing from the magnet pole Ms through the rotor core 222 into the core pole Cn adjacent to the magnet pole Ms is guided to the circumferential center CL of the core pole Cn by the magnetic flux guide hole 243. The circumferential pole centers (peak positions of the magnetic flux density) of the poles of the rotor 221 (that is, the magnet poles Mn and Ms and the core poles Cn and Cs) are thus set at circumferentially equal intervals (45° intervals in the example of FIG. 36), and this contributes to high torque.

According to the configuration of the magnet poles Mn and Ms of this example (arrangement of permanent magnets 241), the volume of the rotor core on the outer circumferential side of the permanent magnet 241 (volume of outer circumferential core portion 22g) can be increased and thus reluctance torque can also be increased. As a result, this contributes to higher torque.

According to this example, the magnetic resistance hole 242 prevents short-circuiting of magnetic flux between the N magnet pole Mn and the S magnet pole Ms that are adjacent to each other in the circumferential direction. It is thus possible to prevent a reduction in the amount of magnetic flux from each magnet pole Mn, Ms to the core poles Cn and Cs adjacent thereto, thus contributing to high torque. In addition, the magnetic resistance hole 242 is provided in the magnet poles Mn and Ms where the paired permanent magnets 241 are arranged in a V-shape so as to be radially inside of the permanent magnet 241. The magnetic resistance hole 242 can thus appropriately prevent short-circuiting of the magnetic flux between the magnet poles Mn and Ms with different polarities that are adjacent to each other in the circumferential direction.

While the core poles Cn and Cs that are adjacent to each other in the circumferential direction are connected at radial-direction end portions of the slit hole 231 in this example, the present invention is not limited thereto. The core poles Cn and Cs may be configured to be connected to each other at one of the radially inner end portion and the radially outer end portion of the slit hole 231. In the example of FIG. 36, each magnetic resistance hole 242 may extend radially inward to the inner circumferential surface of the rotor core 222 (fixing hole 222a).

Figure 37:
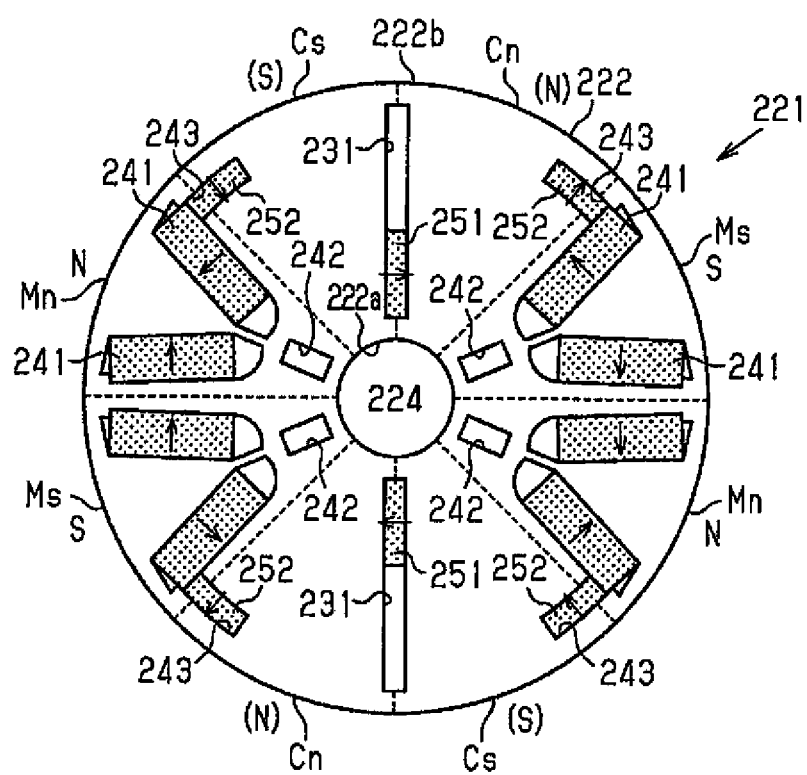
FIG. 37 is a plan view of a rotor according to a further example of the third embodiment.

The configuration shown in FIG. 36 may be modified as follows. The rotor 221 shown in FIG. 37 is obtained by arranging an auxiliary magnet 251 (magnetic adjusting portion) in each slit hole 231 and arranging an auxiliary magnet 252 (magnetic adjusting portion) in each magnetic flux guide hole 243 in the configuration of FIG. 36. Each auxiliary magnet 251 is provided at a radially inner position in each slit hole 231. The radial length of the auxiliary magnet 251 is set to be less than or equal to one-half of the radial length of the slit hole 231.

In FIG. 37, solid arrows indicate the magnetization direction of each of the permanent magnets 241 and the auxiliary magnets 251 and 252, and the distal end of each solid arrow indicates the N-pole, whereas the proximal end of each solid arrow indicates the S-pole. As shown by these arrows, each auxiliary magnet 251 is magnetized in a manner that, in the circumferential direction, the surface near the core pole Cn is the N-pole and the surface near the core pole Cs is the S-pole. In addition, the auxiliary magnet 252 in the magnetic flux guide hole 243 of the N magnet pole Mn is magnetized in a manner that the radially outer surface is the N-pole, and the auxiliary magnet 252 in the magnetic flux guide hole 243 of the S magnet pole Ms is magnetized in a manner that the radially outer surface is the S-pole. Each of the auxiliary magnets 251 and 252 may be, for example, a neodymium magnet, a samarium-cobalt (SmCo) magnet, a SmFeN magnet, a ferrite magnet, or an Al—Ni—Co magnet. In addition, each of the auxiliary magnets 251 and 252 may be a sintered magnet or a bonded magnet.

According to such a configuration, not only the magnetic flux of the magnet poles Mn and Ms adjacent to the core poles Cn and Cs but also the magnetic flux of the auxiliary magnet 251, 252 flows in the core poles Cn and Cs, and thus the magnetic flux flowing in the core poles Cn and Cs is increased. As a result, this contributes to high torque of the motor. Also in this case, the magnetic force applied by the core poles Cn and Cs of the rotor 221 to the stator 11 is preferably set to be weaker than the magnetic force applied by the magnet poles Mn and Ms of the rotor 221 to the stator 11.

While the auxiliary magnet 251 is arranged in the slit hole 231 and the auxiliary magnet 252 is arranged in the magnetic flux guide hole 243 in the example of FIG. 37, one of the auxiliary magnets 251 and 252 may be omitted.

While the permanent magnet 223 is a sintered magnet in the above embodiment, the permanent magnet 223 may be, for example, a bonded magnet.

While the present invention is embodied in the inner rotor motor 210 in which the rotor 221 is arranged on the inner circumferential side of the stator 11 in the above embodiment, the present invention is not particularly limited thereto. The present invention may be embodied in an outer rotor motor in which a rotor is arranged on the outer circumferential side of a stator.

While the present invention is embodied in the radial gap motor 210 in which the stator 11 radially opposes the rotor 221 in the above embodiment, the present invention is not particularly limited thereto. The present invention may be applied to an axial gap motor in which a stator axially opposes a rotor.

The above embodiment and the modifications may be appropriately combined.

A fourth embodiment of a motor will now be described.

Figure 38A:
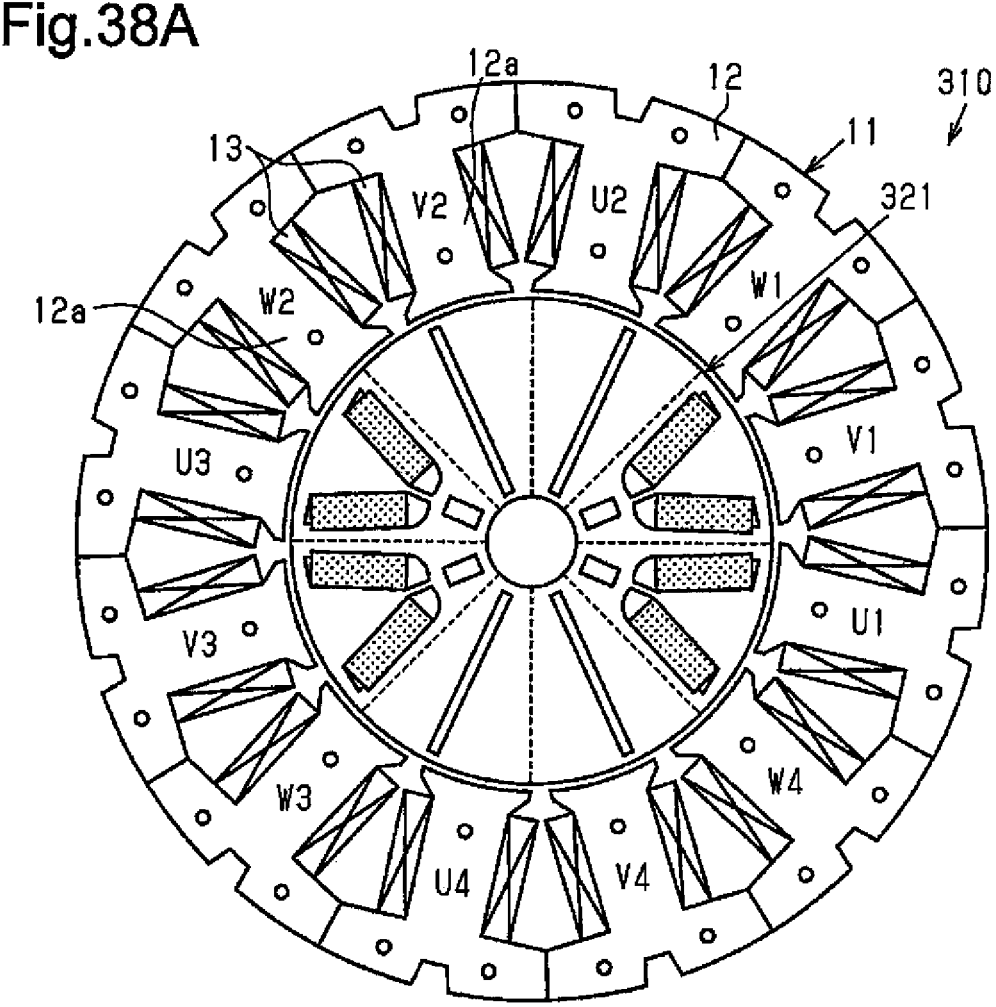
FIG. 38A is a plan view of a motor according to an embodiment.

As shown in FIG. 38A, a motor 310 according to the present embodiment is configured as a brushless motor in which a rotor 321 is arranged inside an annular stator 11. The configuration of the stator 11 is identical to that of the stator 11 according to the first embodiment, and thus detailed descriptions thereof are omitted. The configuration of windings 13 of the stator 11 is also identical to that of the windings 13 according to the first embodiment.

Structure of Rotor

Figure 38B:
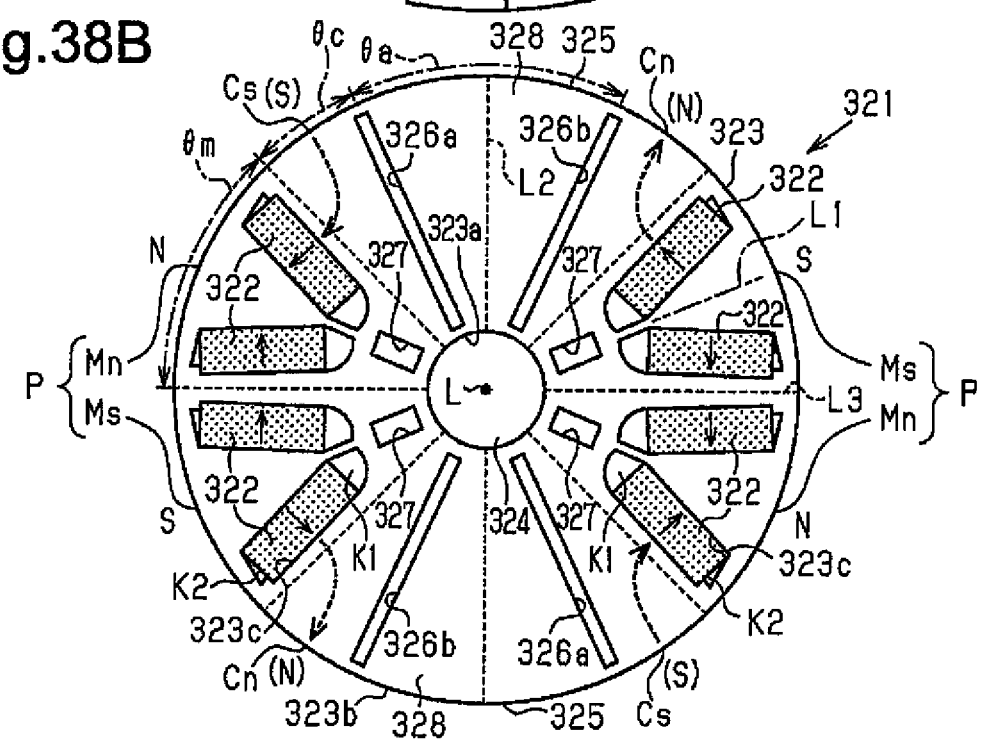
FIG. 38B is a plan view of a rotor.

As shown in FIG. 38B, the rotor 321 has an interior permanent magnet configuration (IPM configuration) in which a permanent magnet 322 forming a pole is embedded in a rotor core 323. The rotor core 323 is formed in a cylindrical shape by axially stacking a plurality of core sheets made of a disc-shaped magnetic metal, and a fixing hole 323a in which a rotation shaft 324 is inserted and fixed is formed at the center of the rotor core 323.

The rotor 321 is configured as an eight-pole rotor in which an N-pole and an S-pole are alternately set on an outer circumferential surface 323b of the rotor core 323. Specifically, the rotor 321 includes a pair of N magnet poles Mn, a pair of S magnet poles Ms, a pair of N core poles Cn, and a pair of S core poles Cs. Each of the magnet poles Mn and Ms is a pole using a permanent magnet 322 and each of the core poles Cn and Cs is a pole using part of the rotor core 323.

Each of the N magnet pole Mn and the S magnet pole Ms includes paired permanent magnets 322 embedded in the rotor core 323. In each of the magnet poles Mn and Ms, the paired permanent magnets 322 are arranged in a substantially V-shape, spreading to the outer circumferential side as viewed in the axial direction, and are arranged to be line-symmetrical to each other with respect to a pole center line (see a line L1 in FIG. 38B) in the circumferential direction. Each permanent magnet 322 is formed in a rectangular parallelepiped shape. The paired permanent magnets 322 in each of the magnet poles Mn and Ms are arranged to be accommodated within the angle range (range of 45° in present embodiment) obtained by equally dividing, in the circumferential direction, the rotor 321 by the number of poles (total number of magnet poles Mn and Ms and core poles Cn and Cs; 8 in present embodiment). Each permanent magnet 322 is, for example, an anisotropic sintered magnet and is made of, for example, a neodymium magnet, a samarium-cobalt (SmCo) magnet, a SmFeN magnet, a ferrite magnet, or an Al—Ni—Co magnet.

In FIG. 38B, solid arrows indicate the magnetization direction of each permanent magnet 322 in the N magnet pole Mn and the S magnet pole Ms, and the distal end of each solid arrow indicates the N-pole, whereas the proximal end of each solid arrow indicates the S-pole. As shown by these arrows, the permanent magnets 322 in the N magnet pole Mn are magnetized in a manner that the N-pole appears on the opposing surfaces (surfaces on the side of the pole center line), so that the outer circumferential surface of the N magnet pole Mn is the N-pole. The permanent magnets 322 in the S magnet pole Ms are magnetized in a manner that the S-pole appears on the opposing surfaces (surfaces on the side of the pole center line), so that the outer circumferential surface of the S magnet pole Ms is the S-pole.

The N magnet pole Mn and the S magnet pole Ms are arranged to be adjacent to each other in a manner that circumferential center positions (pole centers) thereof are spaced apart at 45°. A pair of the N magnet pole Mn and the S magnet pole Ms arranged to be adjacent to each other is referred to as a magnet pole pair P. In the rotor 321 according to the present embodiment, two magnet pole pairs P are opposed to each other at 180° in the circumferential direction. More specifically, the N magnet pole Mn of one magnet pole pair P is opposed to the N magnet pole Mn of the other magnet pole pair P at 180°. In the same manner, the S magnet pole Ms of one magnet pole pair P is opposed to the S magnet pole Ms of the other magnet pole pair P at 180°. That is, the magnet poles Mn and Ms (permanent magnets 322) are arranged to be point-symmetrical with respect to an axis L of the rotor 321 (axis of rotation shaft 324).

An open angle θm (occupying angle) of each of the magnet poles Mn and Ms about the axis L is set to be an angle obtained by equally dividing, in the circumferential direction, the rotor 321 by the number of poles (45° in the present embodiment). That is, the open angle of each of the magnet pole pairs P formed by the magnet poles Mn and Ms adjacent to each other in the circumferential direction is thus approximately 90°.

In the circumferential direction of the rotor core 323, the occupying angle of a pair of the magnet pole pairs P is approximately 180° and the remaining angle range is a part without including any magnet (non-magnet pole 325). That is, a pair of the magnet pole pairs P and a pair of the non-magnet poles 325 are alternately arranged in the rotor core 323 in the circumferential direction at approximately 90°.

Each non-magnet pole 325 includes paired slits 326a and 326b functioning as a magnetic resistance portion. In the present embodiment, each of the slits 326a and 326b extends, in the radial direction, from a position near the fixing hole 323a of the rotor core 323 to a position near the outer circumferential surface 323b of the rotor core 323. Each of the slits 326a and 326b is an opening that passes through the rotor core 323 in the axial direction.

In each non-magnet pole 325, the paired slits 326a and 326b are formed to be line-symmetrical to each other with respect to a circumferential center line L2 of the non-magnet pole 325. A slit near the N magnet pole Mn with respect to the circumferential center line L2 is the slit 326a and a slit near the S magnet pole Ms with respect to the circumferential center line L2 is a slit 326b. In the present embodiment, the angle formed by the circumferential center line L2 and the slit 326a, 326b in the circumferential direction of the rotor 321 is set to approximately 25°. That is, in each non-magnet pole 325, the circumferential angle formed by the paired slits 326a and 326b is set to approximately 50°. The angle formed by the paired slits 326a and 326b in the non-magnet pole 325 is preferably set to be greater than or equal to one-half of the open angle of the non-magnet pole 325 (approximately 90° in the present embodiment). The angle formed by the circumferential center line L2 of the non-magnet pole 325 and a circumferential center line L3 of the magnet pole pair P (boundary between adjacent magnet poles Mn and Ms) is 90°.

The rotor core 323 includes magnetic resistance hole 327 at positions of the magnet poles Mn and Ms circumferentially inside of the paired permanent magnets 322. Each magnetic resistance hole 327 is a rectangular opening that is radially long as viewed in the axial direction, and is arranged at the circumferential center position of each magnet pole Mn, Ms. That is, in the present embodiment, the centers of the magnetic resistance holes 327 of the magnet poles Mn and Ms that are adjacent to each other in the circumferential direction are set to be spaced apart at 45°. Each magnetic resistance hole 327 passes through the rotor core 323 in the axial direction.

Gaps K1 and K2 are formed on the inner circumferential side and the outer circumferential side of each permanent magnet 322, respectively. The gaps K1 and K2 are parts of a magnet receptacle 323c that is formed in the rotor core 323 and accommodates each permanent magnet 322. The inner circumferential surface of each permanent magnet 322 faces the gap K1 and the inner circumferential surface of each permanent magnet 322 faces the gap K2. That is, the gap K1 is formed between the permanent magnet 322 and a radially inner end portion of the magnet receptacle 323c, whereas the gap K2 is formed between the permanent magnet 322 and a radially outer end portion of the magnet receptacle 323c.

Each magnetic resistance hole 327 can prevent short-circuiting of magnetic flux between the magnet poles Mn and Ms in each magnet pole pair P. In addition, the gaps K1 and K2 prevent short-circuiting of magnetic flux of each permanent magnet 322. The magnetic flux (magnet magnetic flux) of the permanent magnets 322 in the magnet poles Mn and Ms is efficiently guided to the outer circumferential side of the magnet poles Mn and Ms and to the non-magnet pole 325 in the circumferential direction.

Each non-magnet pole 325 of the rotor core 323 is divided into three areas by the paired slits 326a and 326b. The area that is adjacent to the N magnet pole Mn in the circumferential direction (area between slit 326a and magnet pole Mn) is configured as an S core pole Cs. The area that is adjacent to the S magnet pole Ms in the circumferential direction (area between slit 326b and magnet pole Ms) is configured as an N core pole Cn.

More specifically, the magnet magnetic flux flowing from the N magnet pole Mn to the non-magnet pole 325 (portion that is not adjacent to magnet pole Ms) in the circumferential direction is guided to the outer circumferential surface 323b of the rotor core 323 by the magnetic resistance of the slit 326a. The area adjacent to the N magnet pole Mn in the non-magnet pole 325 thus functions as the S core pole Cs (pseudo-pole) by the magnet magnetic flux of the magnet pole Mn.

The magnet magnetic flux flowing from the S magnet pole Ms to the non-magnet pole 325 (portion that is not adjacent to magnet pole Mn) in the circumferential direction is also guided to the outer circumferential surface 323b of the rotor core 323 by the magnetic resistance of the slit 326b. The area adjacent to the S magnet pole Ms in the non-magnet pole 325 thus functions as the N core pole Cn (pseudo-pole) by the magnet magnetic flux of the magnet pole Ms.

In each non-magnet pole 325, the area between the paired slits 326a and 326b (that is, between the core poles Cn and Cs) (inter-slit core portion 328) is configured to be hardly affected by the magnet magnetic flux of the magnet poles Mn and Ms because of the magnetic resistance of the slits 326a and 326b. That is, the magnet magnetic flux of the magnet poles Mn and Ms (permanent magnet 322) does not form poles in the inter-slit core portion 328 of each non-magnet pole 325.

In the rotor 321 with the above configuration, in the circumferential direction, the N magnet pole Mn, the S core pole Cs, the inter-slit core portion 328, the N core pole Cn, the S magnet pole Ms, the N magnet pole Mn, and so on are arranged in this order in the clockwise direction.

An open angle θa (occupying angle) of each inter-slit core portion 328 about the axis L is substantially equal to the circumferential angle formed by the slits 326a and 326b, that is, approximately 50° in the present embodiment. An open angle θc (occupying angle) of each of the core poles Cn and Cs about the axis L is set to be less than the open angle θm of each of the magnet poles Mn and Ms (45° in the present embodiment) because the inter-slit core portion 328 is formed in each non-magnet pole 325.

The operation of the present embodiment will now be described.

When three-phase drive currents (AC) with a phase difference of 120° are supplied from a drive circuit (not shown) to U-phase windings U1 to U4, V-phase windings V1 to V4, and W-phase windings W1 to W4, the windings U1 to W4 are excited at the same timing for each phase, a rotational magnet field is generated in the stator 11, and the rotor 321 is rotated by the interactive action of the rotational magnet field of the stator 11 and the magnetic flux of poles (magnet poles Mn and Ms and core poles Cn and Cs) of the rotor 321.

Field weakening control in which a field weakening current (d-axis current) is supplied to windings 13 is executed during high-speed rotation of the rotor 321. A magnetic operation by the field weakening control is described with reference to FIGS. 39A and 39B. For convenience of description, FIGS. 39A and 39B show only the U-phase as the configuration of the stator 11 and other phases are omitted.

Figure 39A:
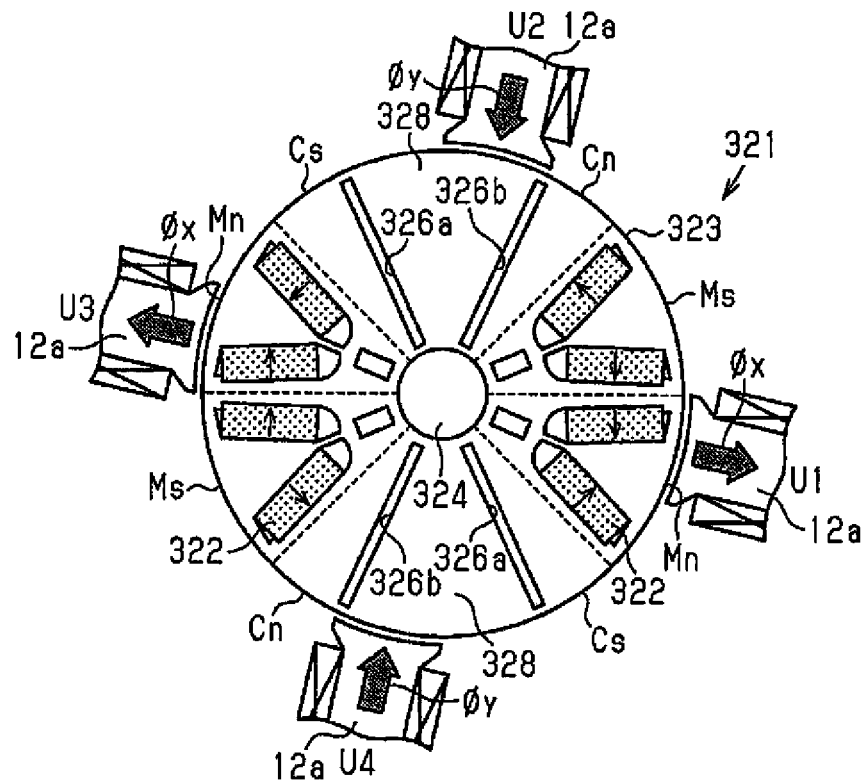
FIGS. 39A and 39B are explanatory diagrams of a magnetic action during field weakening control in the motor according to a fourth embodiment.
Figure 39B:
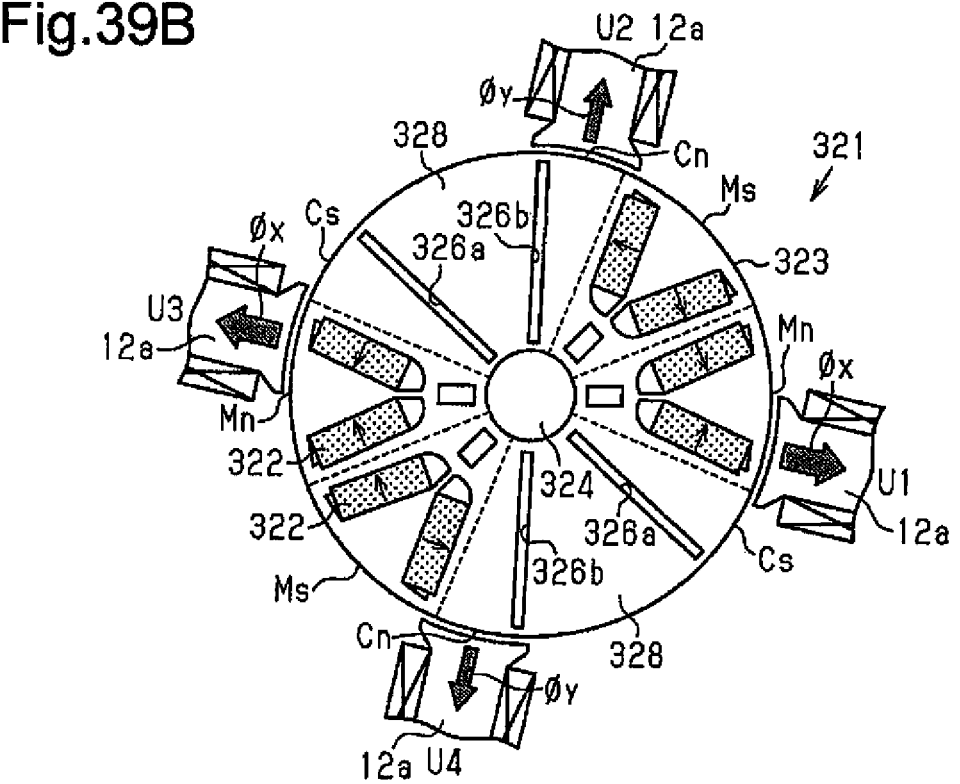

A rotation position of the rotor 321 shown in FIG. 39A during high-speed rotation of the rotor 321 (during field weakening control), that is, a rotation position of the rotor 321 where the N magnet pole Mn radially opposes the U-phase windings U1 and U3 and the inter-slit core portion 328 radially opposes the U-phase windings U2 and U4 is described as an example. At this time, in the U-phase windings U1 and U3, the magnet magnetic flux generated by the N magnet pole Mn opposing the U-phase windings U1 and U3 (radially outward magnetic flux) exceeds flux linkage by the field weakening current (radially inward flux linkage), so that flux linkage φx flows in the U-phase windings U1 and U3 radially outward.

In the U-phase windings U2 and U4, the part of the rotor 321 that opposes the U-phase windings U2 and U4 is not a pole but the inter-slit core portion 328 that is hardly affected by the magnet magnetic flux. Consequently, d-axis magnetic flux generated by supplying the field weakening current (d-axis current) flows in the inter-slit core portion 328 (rotor core 323) with being hardly affected by the magnet magnetic flux of the rotor 321. Flux linkage φy, which is generated by the field weakening current, thus flows in the U-phase windings U2 and U4 radially inward without being cancelled by the poles of the rotor 321. That is, the flux linkage φy with the phase opposite to the flux linkage φx generated in the U-phase windings U1 and U3 by the magnet pole Mn is generated in the U-phase windings U2 and U4.

At this time, an induced voltage is generated at each of the U-phase windings U1 to U4 by the flux linkage φx, φy. As described above, the phase of the flux linkage φx is opposite to the phase of the flux linkage φy, and thus the induced voltage at the U-phase windings U2 and U4 by the flux linkage φy and the induced voltage at the U-phase windings U1 and U3 by the flux linkage φx have opposite polarities (opposite phases). A combined induced voltage obtained by combining the induced voltages of the U-phase windings U1 to U4 is thus effectively reduced.

The operation described above is also performed when the S magnet pole Ms opposes, for example, the U-phase windings U1 and U3. That is, when the S magnet pole Ms opposes the U-phase windings U1 and U3, the inter-slit core portion 328 opposes the U-phase windings U2 and U4. Consequently, the induced voltage at the U-phase windings U1 and U3 and the induced voltage at the U-phase windings U2 and U4 have the opposite phases and thus the combined induced voltage at the U-phase windings U1 to U4 is effectively reduced.

While the combined induced voltage at the U-phase windings U1 to U4 is described above as an example, the combined induced voltage at the V-phase windings V1 to V4 or the W-phase windings W1 to W4 is also reduced by the inter-slit core portion 328 in the rotor core 323.

Next, a description is given of a magnetic operation when the rotor 321 is at a rotation position shown in FIG. 39B, that is, when the N magnet pole Mn radially opposes the U-phase windings U1 and U3 and the N core pole Cn radially opposes the U-phase windings U2 and U4 during high-speed rotation of the rotor 321 (during field weakening control).

Also in this case, in the U-phase windings U1 and U3, the magnet magnetic flux generated by the N magnet pole Mn opposing the U-phase windings U1 and U3 (radially outward magnetic flux) exceeds flux linkage by the field weakening current (radially inward flux linkage), so that flux linkage φx flows in the U-phase windings U1 and U3 radially outward.

The core pole Cn opposing the U-phase windings U2 and U4 is a pseudo-pole that does not include a magnet and thus the magnetic force applied by the core pole Cn to the stator 11 is weaker than the magnetic force applied by the magnet pole Mn to the stator 11. Consequently, the flux linkage φy of the U-phase windings U2 and U4 opposing the core pole Cn is less than the flux linkage φx of the U-phase windings U1 and U3 opposing the magnet pole Mn and thus the induced voltage at the U-phase windings U2 and U4 is less than the induced voltage at the U-phase windings U1 and U3. A combined induced voltage obtained by combining the induced voltages of the U-phase windings U1 to U4 is thus reduced by a reduction in the induced voltage at the U-phase windings U2 and U4. When the N magnet pole Mn radially opposes the U-phase windings U1 and U3, the combined induced voltage at the U-phase windings U1 to U4 is reduced even if the part of the rotor 321 that radially opposes the U-phase windings U2 and U4 is the N core pole Cn.

While a reduction in the combined induced voltage when the U-phase windings U1 to U4 oppose N-poles of the rotor 321 is described above as an example, the same holds true for the V-phase windings V1 to V4 and the W-phase windings W1 to W4. The combined induced voltage is also reduced in S-poles of the rotor 321 by the inter-slit core portion 328 or the core pole Cs.

In the connection state of windings where the windings 13 are connected in series in each phase as in the present embodiment, the combined induced voltage is the sum of induced voltages at the windings 13 of the phases, and thus the combined induced voltage tends to be high. As the inter-slit core portion 328 and the core poles Cn and Cs are provided in the configuration in which the windings 13 are connected in series in each phase as described above, it is possible to more surely obtain an effect of reducing the combined induced voltage, which is more appropriate for high-speed rotation of the motor 310.

It is possible to reduce a field weakening current supplied to the winding 13 by the inter-slit core portion 328 or the core poles Cn and Cs. As the field weakening current can be reduced, the permanent magnet 322 hardly demagnetizes during the field weakening control and the copper loss of the winding 13 can be also reduced. That is to say, the amount of flux linkage that can be reduced by the same amount of the field weakening current is increased, and thus it is possible to achieve more effectively high-speed rotation by the field weakening control.

The advantages of the present embodiment will now be described.

(13) The windings 13 of the stator 11 are formed by four U-phase windings U1 to U4, four V-phase windings V1 to V4, and four W-phase windings W1 to W4 according to a three-phase drive current to be supplied, and four windings of each phase are connected in series. That is, the windings 13 of the stator 11 include at least two series-connected windings (first winding and second winding) in each phase.

The rotor 321 includes the magnet poles Mn and Ms including the permanent magnet 322 and the non-magnet pole 325 of the rotor core 323 that opposes the U-phase windings U2 and U4 at the rotation position of the rotor 321 where the magnet pole Mn (or magnet pole Ms) opposes, for example, the U-phase windings U1 and U3. The non-magnet pole 325 of the rotor core 323 is formed by the core poles Cn and Cs functioning as a pole with the opposite pole to the magnet poles Mn and Ms by the magnetic flux of the magnet poles Mn and Ms and the inter-slit core portion 328 (magnetic flux toleration portion) that permits field weakening flux (flux linkage φy) to be generated in the winding 13 opposing the inter-slit core portion 328.

According to such a configuration, the core poles Cn and Cs is a pseudo-pole that does not include a magnet and the magnetic force applied by the core poles Cn and Cs to the stator 11 is weaker than the magnetic force applied by the magnet poles Mn and Ms to the stator 11. It is thus possible to reduce the combined induced voltage at the windings 13 of each phase. The inter-slit core portion 328 permits the field weakening flux (flux linkage φy) to be generated in the winding 13 opposing the inter-slit core portion 328, and thus the induced voltage at the winding 13 opposing the inter-slit core portion 328 by the flux linkage φy has the opposite polarity to the induced voltage at the winding 13 opposing the magnet poles Mn and Ms. As a result, it is possible to further reduce the combined induced voltage at the windings 13 of the phases. With such an operation of the core poles Cn and Cs and the inter-slit core portion 328 in the non-magnet pole 325, high-speed rotation of the motor 310 is achieved.

Assuming that the non-magnet pole 325 of the rotor core 323 includes only the core poles Cn and Cs (only a slit is provided in each non-magnet pole 325), high torque is achieved but the magnetic force of the core poles Cn and Cs hinders generation of the field weakening flux, which is disadvantageous in achieving high-speed rotation. If the inter-slit core portion 328 and the core poles Cn and Cs are formed in the non-magnet pole 325 as in the present embodiment, high-speed rotation is achieved while preventing a reduction in torque.

According to the present embodiment, output characteristics (torque and the number of rotations) of the motor 310 can be adjusted by changing the configuration of the paired slits 326a and 326b formed in each of the non-magnet poles 325.

For example, as the angle formed by the paired slits 326a and 326b in each non-magnet pole 325 is increased, the open angle θa of the inter-slit core portion 328 is also increased, but the open angle θc of the core poles Cn and Cs is reduced. The field weakening flux generated in the winding 13 during field weakening control is thus increased, which is advantageous in achieving high-speed rotation. Meanwhile, as the angle formed by the paired slits 326a and 326b in each non-magnet pole 325 is reduced, the open angle θa of the inter-slit core portion 326 is also reduced, but the open angle θc of the core poles Cn and Cs is increased, which is advantageous in achieving high torque. Consequently, it is possible to obtain desired motor characteristics by setting the angle between the slits 326a and 326b.

(14) The inter-slit core portion 328 is provided between the N core pole Cn and the S core pole Cs in the circumferential direction of the rotor 321. The N core pole Cn and the S core pole Cs are configured to adjacent to the magnet pole Ms with the opposite polarity to the N core pole Cn and the magnet pole Mn with the opposite polarity to the S core pole Cs, respectively at portions thereof opposite to the inter-slit core portion 328 in the circumferential direction. According to such a configuration, the core pole Cn is interposed between the inter-slit core portion 328 and the magnet pole Ms and the core pole Cs is interposed between the inter-slit core portion 328 and the magnet pole Mn in the circumferential direction, and thus the inter-slit core portion 328 is hardly affected by the magnetic flux of the magnet poles Mn and Ms. It is thus more appropriate for the inter-slit core portion 328 to permit generation of the field weakening flux (flux linkage φy).

(15) The open angle θm of the surface of the magnet poles Mn and Ms opposing the stator 11 (outer circumferential surface of magnet pole Mn, Ms) is set to be greater than the open angle θc of the surface of the core poles Cn and Cs opposing the stator 11 (outer circumferential surface of core pole Cn, Cs). The magnetic force of the core poles Cn and Cs functioning as a pseudo-pole is surely obtained by the magnetic force of the magnet poles Mn and Ms and the magnetic flux of the magnet poles Mn and Ms, and a reduction in torque is appropriately prevented.

(16) The open angle θa of the surface of the inter-slit core portion 328 opposing the stator 11 (outer circumferential surface of inter-slit core portion 328) is set to be greater than the open angle θc of the outer circumferential surface of the core poles Cn and Cs, and thus it is possible to obtain a configuration more appropriate for high-speed rotation.

(17) The rotor core 323 includes the slit 326a functioning as a magnetic resistance portion between the inter-slit core portion 328 and the core pole Cs that are adjacent to each other and the slit 326b functioning as a magnetic resistance portion between the inter-slit core portion 328 and the core pole Cn that are adjacent to each other, and thus it is possible to prevent the magnetic flux of the magnet poles Mn and Ms flowing in the core poles Cn and Cs from flowing into the inter-slit core portion 328.

The magnetic resistance portion between the inter-slit core portion 328 and the core pole Cs is the slit 326a formed in the rotor core 323 and the magnetic resistance portion between the inter-slit core portion 328 and the core pole Cn is the slit 326b formed in the rotor core 323, and thus the magnetic resistance portion can be easily formed in the rotor core 323.

The above embodiment may be modified as follows.

The configuration of the slits 326a and 326b in each non-magnet pole 325 is not limited to the configuration described in the above embodiment, and may be appropriately changed as long as a magnetic flux toleration portion that permits generation of field weakening flux in each non-magnet pole 325 and the core poles Cn and Cs are formed.

Figure 40:
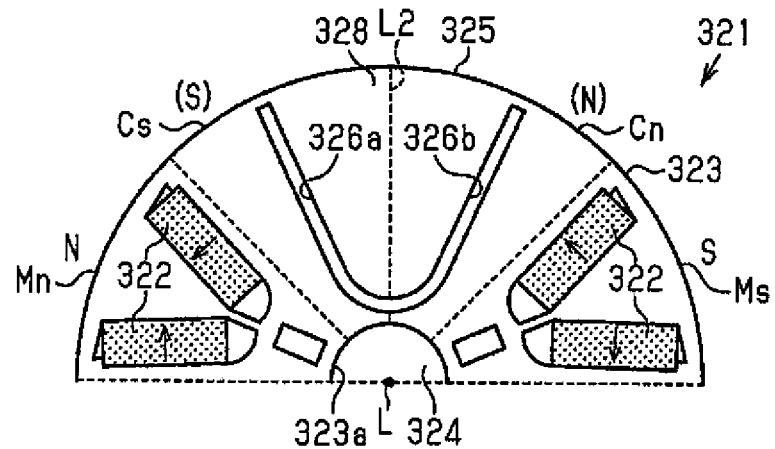
FIG. 40 is a plan view of a rotor according to another example of the fourth embodiment.

For example, as shown in FIG. 40, the slits 326a and 326b according to the above embodiment may be connected to each other at inner circumferential end portions thereof. Such a configuration can prevent appropriately the magnetic flux of the magnet poles Mn and Ms flowing in the core poles Cn and Cs from flowing into the inter-slit core portion 328.

Figure 41:
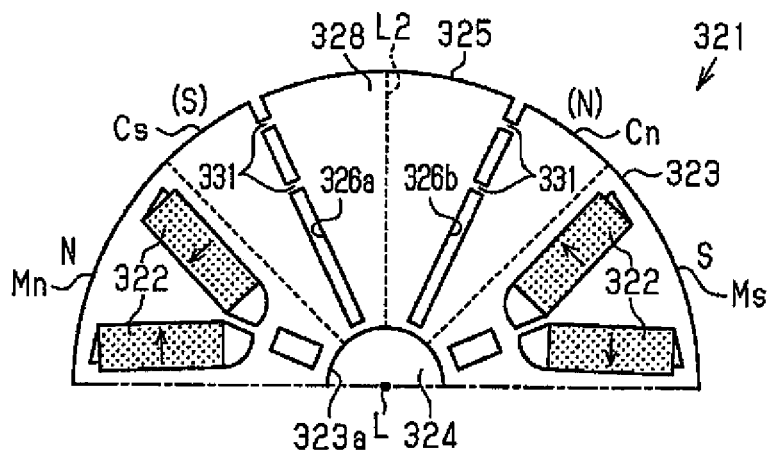
FIG. 41 is a plan view of a rotor according to a further example of the fourth embodiment.

In addition, as shown in FIG. 41, for example, a plurality of bridges 331 may be formed at a radially intermediate portion of each of the slits 326a and 326b. Each bridge 331 is formed in the rotor core 323 and is configured to connect paired side surfaces of the slits 326a and 326b that are opposed to each other in the circumferential direction. In the configuration of FIG. 41, each of the slits 326a and 326b is open to the radially outward. According to such a configuration, it is possible to easily adjust output characteristics (torque and the number of rotations) of the motor 310 and the rigidity of the rotor core 323 by changing the configuration of the bridge 331 (number of bridges 331 and axial direction or radial size).

Figure 42:
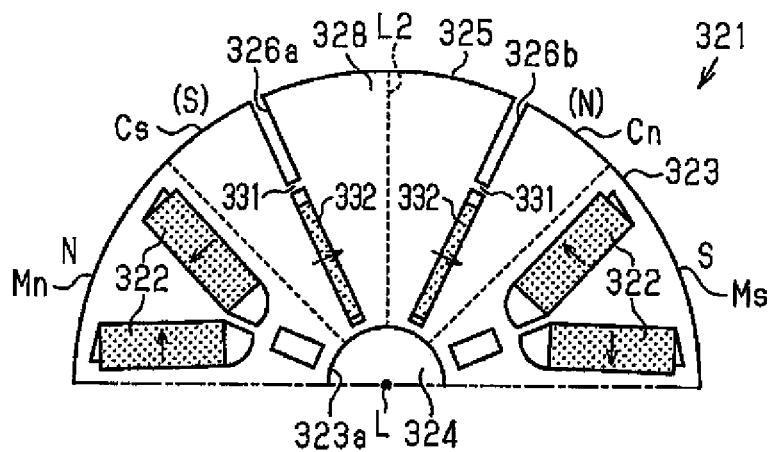
FIG. 42 is a plan view of a rotor according to a further example of the fourth embodiment.

For example, as shown in FIG. 42, an auxiliary magnet 332 may be provided in each of the slits 326a and 326b. In FIG. 42, solid arrows indicate the magnetization direction of each permanent magnet 322 and each auxiliary magnet 332, and the distal end of each solid arrow indicates the N-pole, whereas the proximal end of each solid arrow indicates the S-pole. Each auxiliary magnet 332 is a permanent magnet formed in a rectangular parallelepiped shape and has a magnetization direction corresponding to the core poles Cn and Cs that is adjacent to the auxiliary magnet 332 in the circumferential direction. That is, the auxiliary magnet 332 provided in the slit 326a is magnetized in a manner that the surface near the core pole Cs that is adjacent to the auxiliary magnet 332 in the circumferential direction is the S-pole. The auxiliary magnet 332 provided in the slit 326b is magnetized in a manner that the surface near the core pole Cn that is adjacent to the auxiliary magnet 332 in the circumferential direction is the N-pole. According to such a configuration, it is possible to increase the amount of magnetic flux of the core poles Cn and Cs by the auxiliary magnet 332 provided in each of the slits 326a and 326b, and thus a reduction in torque can be prevented more appropriately.

In the configuration of FIG. 42, the bridge 331 formed in each of the slits 326a and 326b is used for radial positioning of the auxiliary magnet 332. The bridge 331 prevents the auxiliary magnet 332 from being removed radially outward from the slit 326a, 326b. In the configuration of FIG. 42, the auxiliary magnet 332 is provided to be near the inner circumferential side of each of the slits 326a and 326b, and thus the magnetic flux of the auxiliary magnet 332 hardly flows to the outer circumferential side of the inter-slit core portion 328 (that is, the magnetic path side of field weakening flux). The magnetic flux of the auxiliary magnet 332 prevents the field weakening flux from hardly flowing into the inter-slit core portion 328 (that is, from hindering high-speed rotation).

Figure 43:
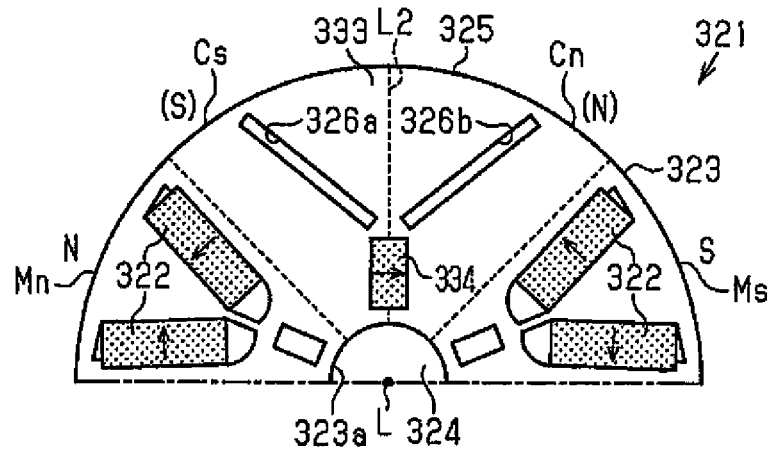
FIG. 43 is a plan view of a rotor according to a further example of the fourth embodiment.

While the slits 326a and 326b are formed in the non-magnet pole 325 along the radial direction of the rotor 321 in the above embodiment, the present invention is not limited thereto, and as shown in FIG. 43, for example, the slits 326a and 326b may be formed not along the radial direction of the rotor 321.

In the configuration of FIG. 43, the slits 326a and 326b are formed from the substantial radial center of the non-magnet pole 325 toward the outer circumferential side. It is configured so that the inner circumferential side end portions of the slits 326a and 326b are close to each other at the substantial radial center of the non-magnet pole 325. The inter-slit core portion 333 on the outer circumferential side of the slits 326a and 326b in the non-magnet pole 325 functions as a magnetic flux toleration portion.

In the configuration of FIG. 43, an auxiliary magnet 334 is embedded in a portion of the non-magnet pole 325 that is located radially inward from the inter-slit core portion 333 (slits 326a and 326b). The auxiliary magnet 334 is arranged on a circumferential center line L2 of the non-magnet pole 325. In addition, the auxiliary magnet 334 is formed in a rectangular shape that is radially long as viewed in the axial direction. The auxiliary magnet 334 is magnetized in a manner that the portion near the core pole Cn in the circumferential direction (portion closer to magnet pole Ms than slit 326b in non-magnet pole 325) is the N-pole and the portion near the core pole Cs (portion closer to magnet pole Mn than slit 326a in non-magnet pole 325) is the S-pole (see solid arrows in FIG. 43).

According to such a configuration, it is possible to increase the amount of magnetic flux of the core poles Cn and Cs by the auxiliary magnet 334, and thus a reduction in torque can be prevented more appropriately. In addition, the auxiliary magnet 334 is located radially inward from the slits 326a and 326b in this configuration. The slits 326a and 326b thus prevent the magnetic flux of the auxiliary magnet 334 from flowing into the inter-slit core portion 333. Consequently, it is possible to prevent the magnetic flux of the auxiliary magnet 332 from hindering high-speed rotation.

Figure 44:
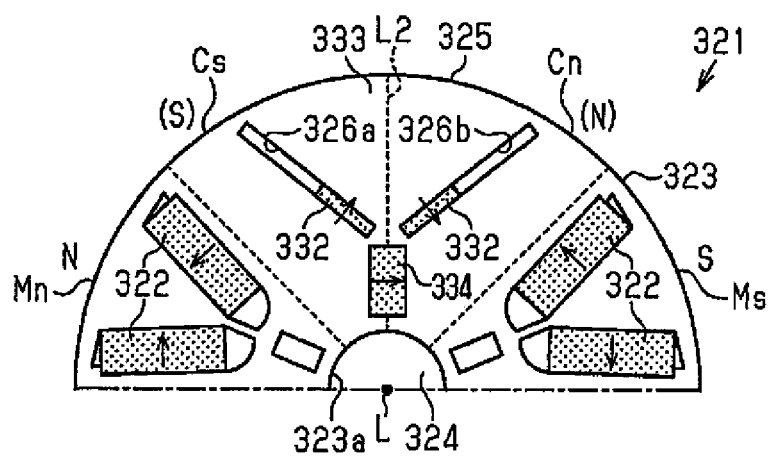
FIG. 44 is a plan view of a rotor according to a further example of the fourth embodiment.

If it is intended to further increase torque in the configuration of FIG. 43, as shown in FIG. 44, for example, the auxiliary magnet 332 may be provided in each of the slits 326a and 326b. Also in this configuration, the auxiliary magnet 332 is preferably provided to be near the inner circumferential side of each of the slits 326a and 326b to prevent interference with the magnetic path of field weakening flux.

Each of the auxiliary magnets 332 and 334 in the above configuration may be, for example, a neodymium magnet, a samarium-cobalt (SmCo) magnet, a SmFeN magnet, a ferrite magnet, or an Al—Ni—Co magnet. In addition, each of the auxiliary magnets 332 and 334 may be a sintered magnet or a bonded magnet.

While the slits 326a and 326b extend through the rotor core 323 in the axial direction in the above embodiment, the present invention is not limited thereto. The slits 326a and 326b may be openings that do not extend through the rotor core 323 in the axial direction. By changing the axial length of the slits 326a and 326b, output characteristics (torque and the number of rotations) of the motor 310 may be adjusted.

While the slits 326a and 326b are formed as magnetic resistance portions between the inter-slit core portion 328 and the core poles Cn and Cs that are adjacent to each other in the rotor core 323 according to the above embodiment, the present invention is not limited thereto. For example, the magnetic resistance portion may be formed between the inter-slit core portion 328 and the core poles Cn and Cs by partially demagnetizing the rotor core 323 through laser irradiation.

Figure 45:
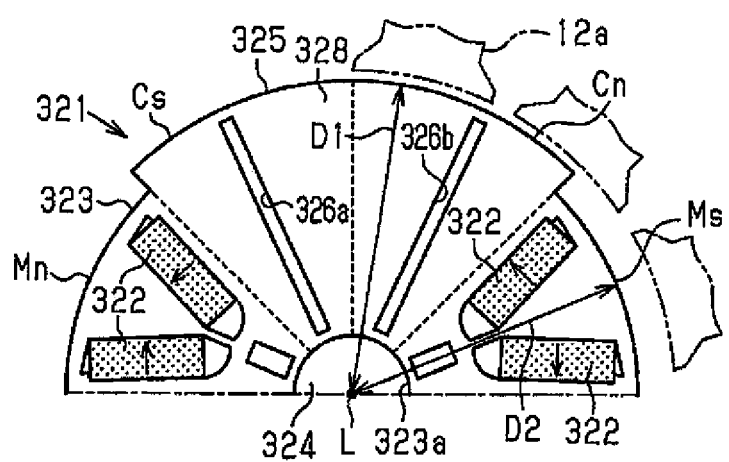
FIG. 45 is a plan view of a rotor according to a further example of the fourth embodiment.

As shown in FIG. 45, an outer diameter D1 of the non-magnet pole 325 (that is, the outer diameter of each of the core poles Cn and Cs and the outer diameter of the inter-slit core portion 328) may be set to be larger than an outer diameter D2 of each of the magnet poles Mn and Ms.

According to such a configuration, the air gap (space) between the non-magnet pole 325 and an inner circumferential surface of teeth 12a of a stator is smaller than the air gap between the magnet poles Mn and Ms and the inner circumferential surface of the teeth 12a of the stator. That is, the inter-slit core portion 328 and the core poles Cn and Cs in the non-magnet pole 325 are closer to the inner circumferential surface of the teeth 12a, and thus field weakening flux easily flows into the inter-slit core portion 328 and the core poles Cn and Cs. As a result, it is possible to further reduce the combined induced voltage of phases and this contributes to higher-speed rotation.

In the rotor 321 according to the above embodiment, the magnetic flux toleration portion (inter-slit core portion 328) in the non-magnet pole 325 is integrally formed with the rotor core 323. That is, while the rotor core 323 is configured as an integral component including the magnetic flux toleration portion (inter-slit core portion 328), the present invention is not limited thereto, and at least part of the portion that forms the magnetic flux toleration portion may be configured as a separate component.

Figure 46:
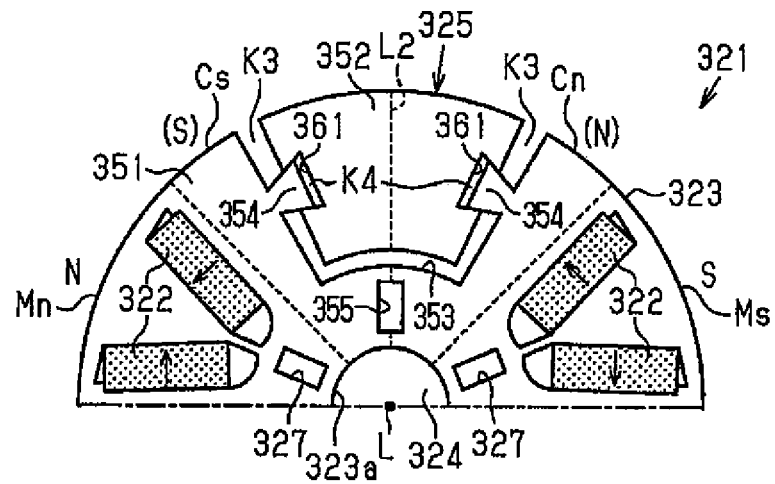
FIG. 46 is a plan view of a rotor according to a further example of the fourth embodiment.

For example, in a configuration of FIG. 46, the rotor core 323 includes a core main body 351 including the magnet pole pair P and the core poles Cn and Cs, which are identical to those of the above embodiment, and a separate core member 352 connected to the core main body 351.

The core main body 351 is made of, for example, a steel material such as a cold-rolled steel sheet (SPCC) in a substantially cylindrical shape, and a rotation shaft 324 is fixed to the center portion thereof. The core main body 351 includes an accommodating recess 353 in the non-magnet pole 325 of the rotor core 323. The accommodating recess 353 is recessed radially inward from the outer circumferential surface of the core main body 351. Circumferential end surfaces of the accommodating recess 353 are flat along the radial direction, and a connecting projection 354 that circumferentially projects into the accommodating recess 353 is formed on each of the end surfaces. Each connecting projection 354 is formed in a tapered shape that the width in the radial direction of the rotor 321 is gradually increased toward the projecting distal end (circumferential distal end).

In the core main body 351, the N core pole Cn is formed between the accommodating recess 353 and the S magnet pole Ms in the circumferential direction, whereas the S core pole Cs is formed between the accommodating recess 353 and the N magnet pole Mn in the circumferential direction.

A magnetic resistance hole 355 that passes through the core main body 351 in the direction of the axis L is formed in the core main body 351 to be radially inside of the accommodating recess 353. The magnetic resistance hole 355 limits short-circuiting of magnetic flux between the magnet poles Mn and Ms located at opposite sides of the non-magnet pole 325 in the circumferential direction.

The separate core member 352 that is formed in a sector about the axis L of the rotation shaft 324 is accommodated in the accommodating recess 353 of the core main body 351. The separate core member 352 is made of a material with higher magnetic permeability than the core main body 351 (for example, steel material) (for example, amorphous metal, permalloy, and the like). The outer circumferential surface of the separate core member 352 is formed in an arc shape about the axis L of the rotation shaft 324 as viewed in the axial direction. In addition, the outer circumferential surface of the separate core member 352 and the outer circumferential surface of the core main body 351 are configured to be on the same circle about the axis L.

The circumferential end surfaces of the separate core member 352 are flat along the radial direction and oppose the circumferential end surfaces of the accommodating recess 353, respectively. That is, the separate core member 352 is arranged between the N core pole Cn and the S core pole Cs in the circumferential direction. A connecting recess 361 into which a connecting projection 354 of the core main body 351 is fitted is formed in the circumferential end surfaces of the separate core member 352. As the connecting projections 354 are fitted into the connecting recesses 361, respectively, the separate core member 352 is fixed in the accommodating recess 353.

In a state where the separate core member 352 is fixed in the accommodating recess 353, a gap K3 is formed between each circumferential end surface of the separate core member 352 and each circumferential end surface of the accommodating recess 353 and between the radially inner surface of the separate core member 352 and the radially inner surface of the accommodating recess 353. In addition, a gap K4 is formed, in the circumferential direction, between each connecting recess 361 and each connecting projection 354 fitted into the connecting recess 361. That is, the separate core member 352 contacts the core main body 351 (connecting projections 354) only at the radial side surfaces of the connecting recesses 361.

The separate core member 352 is configured to be line-symmetrical with respect to a circumferential center line L2 of the non-magnet pole 325. The open angle (occupying angle) of the separate core member 352 about the axis L is set to be equal to the open angle θa of the inter-slit core portion 328 according to the above embodiment. While the inner diameter of the separate core member 352 is approximately one-half of the outer diameter of the rotor core 323 (outer diameter of core main body 351) in the configuration of FIG. 46, the present invention is not limited thereto, and the inner diameter of the separate core member 352 may be set to be larger than or equal to one-half of the outer diameter of the rotor core 323, or be smaller than or equal to one-half of the outer diameter of the rotor core 323.

According to such a configuration, the separate core member 352 functions as a magnetic flux toleration portion that permits generation of field weakening flux, substantially similarly to the inter-slit core portion 328 according to the above embodiment, and thus it is possible to achieve high-speed rotation of the motor 310. In this configuration, the separate core member 352 is configured to be separated from the core main body 351 that includes the magnet poles Mn and Ms and the core poles Cn and Cs. It is thus possible to prevent interfere between the magnetic path (d-axis magnetic path) of field weakening flux in the separate core member 352 and the magnetic path of magnetic flux of the magnet poles Mn and Ms in the core main body 351. The field weakening flux easily flows in the separate core member 352, and thus this contributes to higher-speed rotation.

In addition, as the separate core member 352 is made of a material with higher magnetic permeability than the core main body 351 in this configuration, the field weakening flux more easily flows in the separate core member 352, so that this contributes to higher-speed rotation. Among the components of the rotor core 323, at least the separate core member 352 is made of a high permeable material and the core main body 351 is made of an inexpensive steel material, so that high-speed rotation can be achieved while reducing the manufacturing costs.

The core pole Cn is interposed between the separate core member 352 and the magnet pole Ms in the circumferential direction and the core pole Cs is interposed between the separate core member 352 and the magnet pole Mn in the circumferential direction, and thus the separate core member 352 is hardly affected by the magnetic flux of the magnet poles Mn and Ms. The gap K3 is formed between the separate core member 352 and the core pole Cn and between the separate core member 352 and the core pole Cs in the circumferential direction, and thus it is possible to reliably prevent the interference of the magnetic flux of the magnet poles Mn and Ms with the field weakening flux flowing in the separate core member 352.

While the separate core member 352 is connected to the core main body 351 by the connecting projection 354 that is integrally formed with the core main body 351 in the configuration of FIG. 46, the present invention is not limited thereto. For example, as shown in FIG. 47, the core main body 351 may be connected to the separate core member 352 by a connection member 362 that is separate from the core main body 351 and the separate core member 352.

On the circumferential sides of the separate core member 352, the connection member 362 is formed to extend across the separate core member 352 and the core main body 351. The circumferential ends of each connection member 362 are fitted into connecting recesses 363 and 364. The connecting recess 363 is formed in the circumferential end surfaces of the separate core member 352 and the connecting recess 364 is formed in the circumferential end surfaces of the accommodating recess 353. The arrangement position of the connection member 362 in the radial direction is set to be the radial center position of the separate core member 352. Each connection member 362 is formed in a tapered shape that the radial width is gradually increased from the circumferential center portion toward the circumferential ends. The connection member 362 connects the core main body 351 (accommodating recess 353) to the separate core member 352 in a manner that the core main body 351 does not contact the separate core member 352. The connection member 362 is made of a material with higher magnetic resistance than the core main body 351 and the separate core member 352 (for example, resin, stainless steel, brass, and the like).

Such a configuration enables the core main body 351 to be connected to the separate core member 352 only by the connection member 362. In addition, as a material with higher magnetic resistance than the core main body 351 and the separate core member 352 is used as the material of the connection member 362, it is possible to prevent the magnetic flux of the magnet poles Mn and Ms in the core main body 351 from flowing through the connection member 362 into the separate core member 352. As a result, it is possible to reliably prevent the interference of the magnetic flux of the magnet poles Mn and Ms with the field weakening flux flowing in the separate core member 352. While the gap K3 is formed between the accommodating recess 353 of the core main body 351 and the separate core member 352 in the configuration of FIG. 47, the present invention is not limited thereto. For example, a filler such as resin may be filled in the gap K3 and the filler may function as a connection member that connects the core main body 351 to the separate core member 352.

Figure 47:
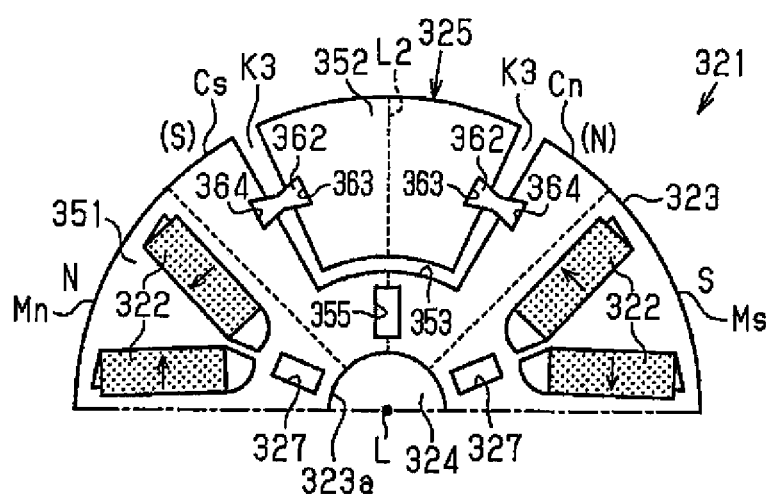
FIG. 47 is a plan view of a rotor according to a further example of the fourth embodiment.

In the configurations of FIGS. 46 and 47, the separate core member 352 is preferably made of a material having an easy-magnetization axis (easily-magnetized crystal orientation) mainly in the circumferential direction. The field weakening flux thus easily flows in the d-axis magnetic path in the separate core member 352. As a result, this contributes to higher-speed rotation.

A cylindrical cover member that covers the outer circumferential surface of the rotor 321 may be provided in the configurations of FIGS. 46 and 47. Such a cover member prevents the separate core member 352 from being removed from the core main body 351.

While windings of each phase, that is, the U-phase windings U1 to U4, the V-phase windings V1 to V4, or the W-phase windings W1 to W4 are connected in series in the above embodiment, the present invention is not particularly limited thereto, and the connection state of windings may be appropriately changed. A modification is described by using the U-phase as an example. The windings U1 and U2 are connected in series, the windings U3 and U4 are connected in series, and a series-connected pair of the windings U1 and U2 is connected in parallel to a series-connected pair of the windings U3 and U4.

While the rotor 321 has 8 poles and the number of the windings 13 of the stator 11 is 12 (that is, an eight-pole-twelve-slot motor) in the above embodiment, the number of poles of the rotor 321 and the number of the windings 13 can be appropriately changed according to the configuration.

While in the N-pole of the rotor 321, for example, the number of the magnet poles Mn is equal to the number of the core poles Cn (two) in the above embodiment, these numbers do not need to be equal. For example, three magnet poles Mn (or magnet pole Mn) may be provided and a core pole Cn (or three core poles Cn) may be provided. Such a modification is possible in the S-pole of the rotor (magnet pole Ms and core pole Cs).

While the core pole Cn and the core pole Cs are included in both the N-pole and the S-pole of the rotor 321 in the above embodiment, the present invention is not particularly limited thereto. For example, a core pole may be included in only one of poles of the rotor 321 and the other pole may include only a magnet pole.

Paired permanent magnets 322 embedded in the rotor core 323 are arranged in each of the magnet poles Mn and Ms in a substantially V-shape, spreading to the outer circumferential side as viewed in the axial direction in the above embodiment, the present invention is not particularly limited thereto, and the configuration of permanent magnets in the magnet poles Mn and Ms may be appropriately modified. For example, a permanent magnet may be included in each of the magnet poles Mn and Ms.

While the rotor 321 according to the above embodiment has an interior permanent magnet configuration (IPM configuration) in which the permanent magnet 322 forming the magnet poles Mn and Ms is embedded in the rotor core 323, the rotor 321 may have a surface permanent magnet configuration (SPM configuration) in which the permanent magnet forming the magnet poles Mn and Ms is fixed on the circumferential surface of the rotor core 323.

While the permanent magnet 322 is a sintered magnet in the above embodiment, the permanent magnet 322 may be, for example, a bonded magnet.

While the rotor core 323 is configured by stacking core sheets in the above embodiment, the rotor core 323 may be a green compact core or may be an integrated block molded by forging (cold forging) or cutting.

While the present invention is embodied in the inner rotor motor 310 in which the rotor 321 is arranged on the inner circumferential side of the stator 11 in the above embodiment, the present invention is not particularly limited thereto. The present invention may be embodied in an outer rotor motor in which a rotor is arranged on the outer circumferential side of a stator.

While the present invention is embodied in the radial gap motor 310 in which the stator 11 radially opposes the rotor 321 in the above embodiment, the present invention is not particularly limited thereto. The present invention may be applied to an axial gap motor in which a stator axially opposes a rotor.

The embodiments described above and the modifications may be appropriately combined.

The invention claimed is:

1. A motor comprising:
a stator including windings; and
a rotor rotated by a rotational magnet field generated when drive currents are supplied to the windings,
wherein the windings include a first winding and a second winding, in which the first winding and the second winding are synchronously excited by a drive current and connected in series;
the rotor includes
first pole, and
second pole that opposes the second winding at a rotation position of the rotor where the first pole opposes the first winding, wherein the second pole applies a weaker magnetic force to the stator than the first pole;
the first and second poles each include a permanent magnet;
an outer circumferential surface of the second pole is located radially inward from an outer circumferential surface of the first pole;
an inner circumference of the permanent magnet forms an arc about an axis, which is a rotational axis of the rotor,
the axis, which is a center of the inner circumference of the permanent magnet is located at the same position as an axis, which is a center of an outer circumference of the permanent magnet, and
an absolute value of an extremum of a sum of flux linkage in a plurality of windings connected in series in each phase that changes with the rotation of the rotor is equal in all phases.

2. The motor according to claim 1, wherein
the windings include a 2n number of U-phase windings, a 2n number of V-phase windings, and a 2n number of W-phase windings in correspondence with drive currents of three phases that are supplied, where n is an integer of 2 or greater, and
the first and second poles each amount to n in number.

3. The motor according to claim 2, wherein the first pole and the second pole are alternately arranged in a circumferential direction at equal intervals.

4. The motor according to claim 1, wherein
the first and second poles each include a permanent magnet, and
a residual magnetic flux density of the permanent magnet of the second pole is less than a residual magnetic flux density of the permanent magnet of the first pole.

5. The motor according to claim 1, wherein the motor is configured to allow for execution of field weakening control.

6. The motor according to claim 1, wherein
an open angle of the permanent magnet of the second pole about an axis of the rotor is smaller than an open angle of the permanent magnet of the first pole about the axis of the rotor.

7. The motor according to claim 1, wherein
a radial thickness of the permanent magnet of the second pole is less than a radial thickness of the permanent magnet of the first pole.

* * * * *